United States Patent
Konda

(10) Patent No.: US 9,374,322 B2
(45) Date of Patent: Jun. 21, 2016

(54) OPTIMIZATION OF MULTI-STAGE HIERARCHICAL NETWORKS FOR PRACTICAL ROUTING APPLICATIONS

(71) Applicant: Konda Technologies Inc., San Jose, CA (US)

(72) Inventor: Venkat Konda, San Jose, CA (US)

(73) Assignee: Konda Technologies Inc., San Jose, CA (US)

(*) Notice: Subject to any disclaimer, the term of this patent is extended or adjusted under 35 U.S.C. 154(b) by 125 days.

(21) Appl. No.: 14/199,168

(22) Filed: Mar. 6, 2014

(65) Prior Publication Data

US 2014/0313930 A1    Oct. 23, 2014

(51) Int. Cl.
*H04L 12/933*    (2013.01)

(52) U.S. Cl.
CPC ................................. *H04L 49/1515* (2013.01)

(58) Field of Classification Search
CPC .................................................. H04L 49/1515
USPC ......................................................... 370/254
See application file for complete search history.

(56) References Cited

U.S. PATENT DOCUMENTS

| | | | | |
|---|---|---|---|---|
| 5,654,695 A * | 8/1997 | Olnowich | .......... | H04Q 11/0478 340/2.23 |
| 6,091,723 A * | 7/2000 | Even | .................. | H04L 49/1507 340/2.21 |
| 6,335,930 B1 * | 1/2002 | Lee | ........................ | H04L 49/101 370/387 |
| 6,469,540 B2 * | 10/2002 | Nakaya | ............ | H03K 19/17728 326/38 |
| 7,440,449 B2 * | 10/2008 | Carson | ...................... | G06T 7/20 257/499 |
| 2003/0117946 A1 * | 6/2003 | Fontana | ................ | H04L 12/437 370/216 |
| 2011/0037498 A1 * | 2/2011 | Konda | ................ | G06F 17/5077 326/41 |
| 2012/0269190 A1 * | 10/2012 | Konda | .................. | G06F 17/509 370/388 |

* cited by examiner

*Primary Examiner* — Rasheed Gidado

(57) ABSTRACT

Significantly optimized multi-stage networks, useful in wide target applications, with VLSI layouts using only horizontal and vertical links to route large scale sub-integrated circuit blocks having inlet and outlet links, and laid out in an integrated circuit device in a two-dimensional grid arrangement of blocks are presented. The optimized multi-stage networks in each block employ several rings of stages of switches with inlet and outlet links of sub-integrated circuit blocks connecting to rings from either left-hand side only, or from right-hand side only, or from both left-hand side and right-hand side; and employ shuffle exchange links where outlet links of cross links from switches in a stage of a ring in one sub-integrated circuit block are connected to either inlet links of switches in the another stage of a ring in the same or another sub-integrated circuit block.

20 Claims, 19 Drawing Sheets

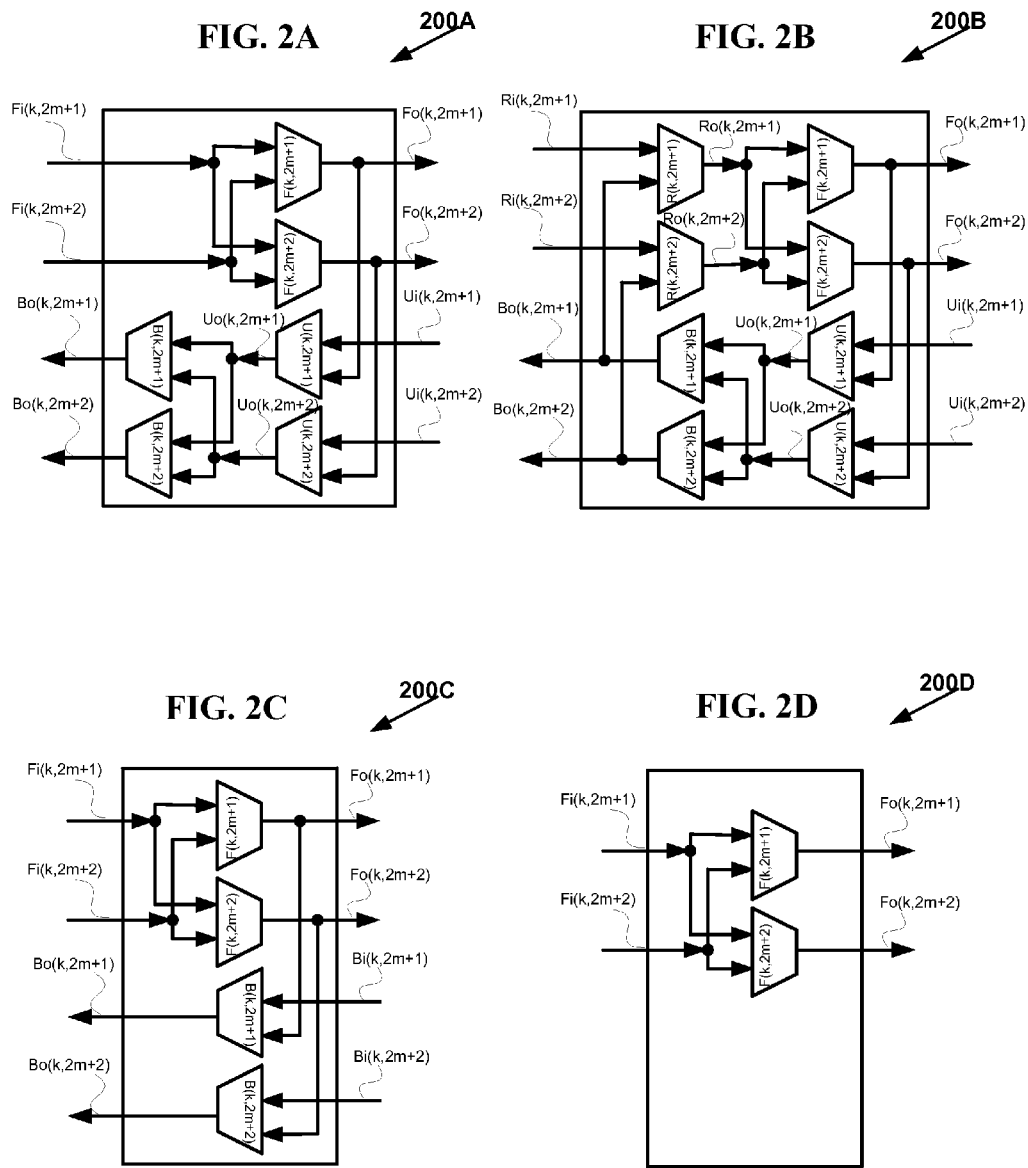

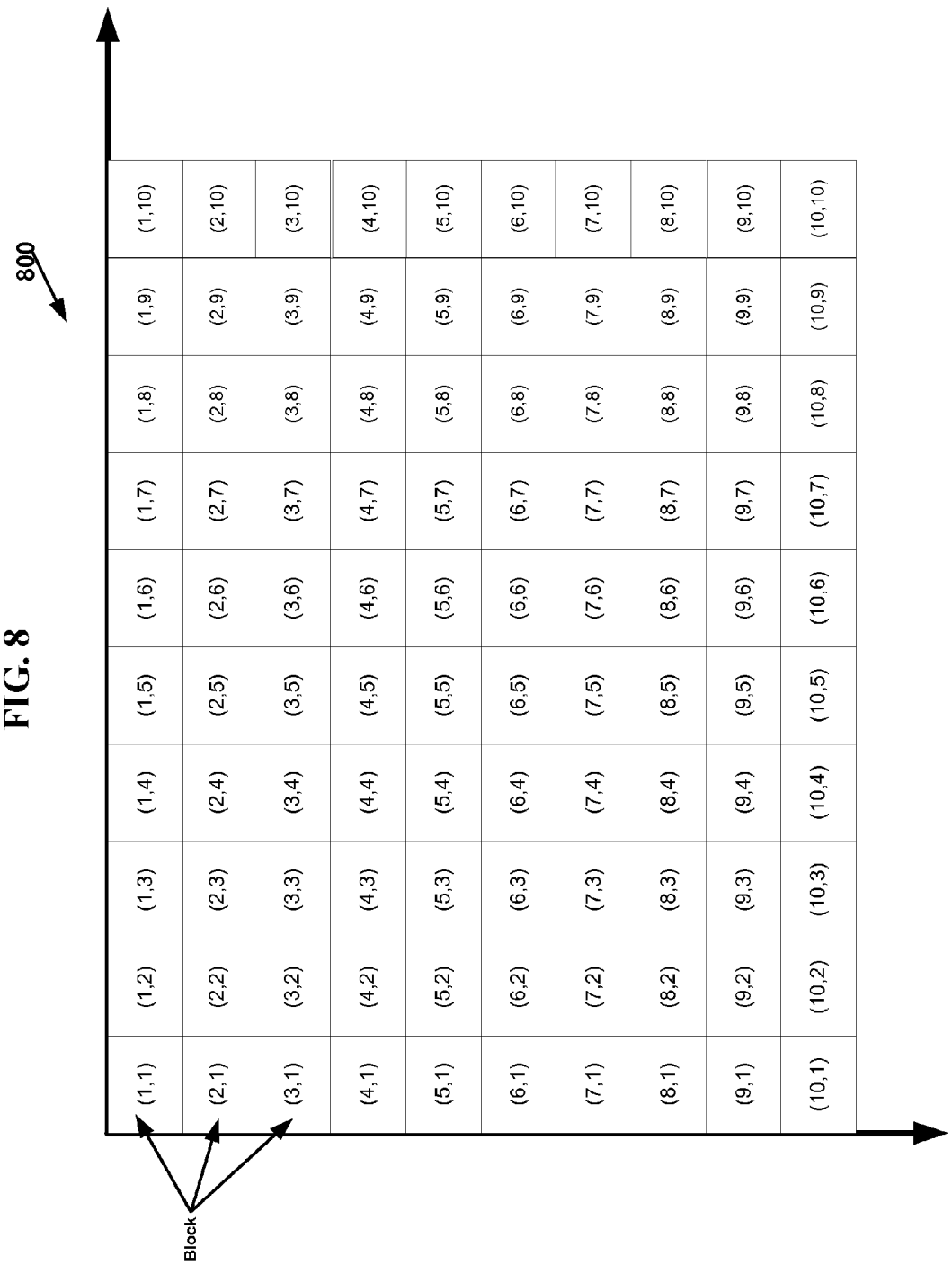

FIG. 16A
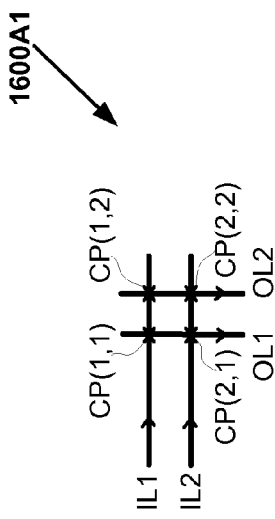
FIG. 16A1 (Prior Art)
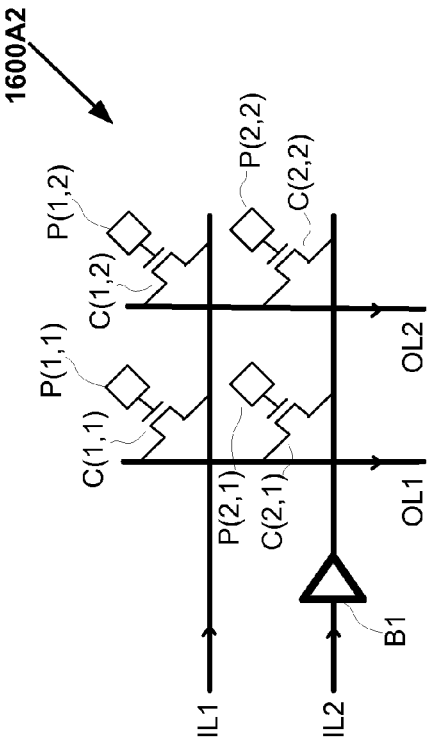
FIG. 16A2 (Prior Art)
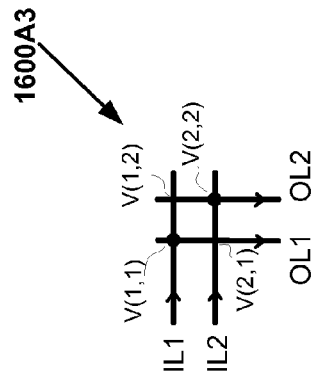
FIG. 16A3 (Prior Art)
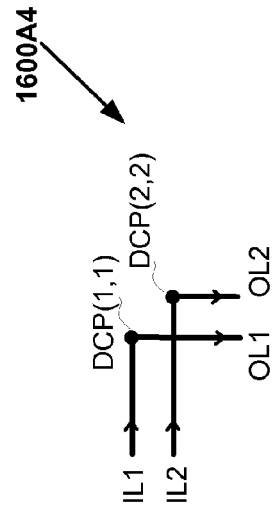
FIG. 16A4 (Prior Art)

OPTIMIZATION OF MULTI-STAGE HIERARCHICAL NETWORKS FOR PRACTICAL ROUTING APPLICATIONS

CROSS REFERENCE TO RELATED APPLICATIONS

This application is related to and claims priority of the PCT Application Serial No. PCT/US12/53814 entitled "OPTIMIZATION OF MULTI-STAGE HIERARCHICAL NETWORKS FOR PRACTICAL ROUTING APPLICATIONS" by Venkat Konda assigned to the same assignee as the current application, filed Sep. 6, 2012 and the U.S. Provisional Patent Application Ser. No. 61/531,615 entitled "OPTIMIZATION OF MULTI-STAGE HIERARCHICAL NETWORKS FOR PRACTICAL ROUTING APPLICATIONS" by Venkat Konda assigned to the same assignee as the current application, filed Sep. 7, 2011.

This application is related to and incorporates by reference in its entirety the U.S. Pat. No. 8,270,400 entitled "FULLY CONNECTED GENERALIZED MULTI-STAGE NETWORKS" by Venkat Konda assigned to the same assignee as the current application, issued Sep. 18, 2012, the PCT Application Serial No. PCT/U08/56064 entitled "FULLY CONNECTED GENERALIZED MULTI-STAGE NETWORKS" by Venkat Konda assigned to the same assignee as the current application, filed Mar. 6, 2008, the U.S. Provisional Patent Application Ser. No. 60/905,526 entitled "LARGE SCALE CROSSPOINT REDUCTION WITH NONBLOCKING UNICAST & MULTICAST IN ARBITRARILY LARGE MULTI-STAGE NETWORKS" by Venkat Konda assigned to the same assignee as the current application, filed Mar. 6, 2007, and the U.S. Provisional Patent Application Ser. No. 60/940,383 entitled "FULLY CONNECTED GENERALIZED MULTI-STAGE NETWORKS" by Venkat Konda assigned to the same assignee as the current application, filed May 25, 2007.

This application is related to and incorporates by reference in its entirety the U.S. Pat. No. 8,170,040 entitled "FULLY CONNECTED GENERALIZED BUTTERFLY FAT TREE NETWORKS" by Venkat Konda assigned to the same assignee as the current application, issued May 1, 2012, the PCT Application Serial No. PCT/U08/64603 entitled "FULLY CONNECTED GENERALIZED BUTTERFLY FAT TREE NETWORKS" by Venkat Konda assigned to the same assignee as the current application, filed May 22, 2008, the U.S. Provisional Patent Application Ser. No. 60/940,387 entitled "FULLY CONNECTED GENERALIZED BUTTERFLY FAT TREE NETWORKS" by Venkat Konda assigned to the same assignee as the current application, filed May 25, 2007, and the U.S. Provisional Patent Application Ser. No. 60/940,390 entitled "FULLY CONNECTED GENERALIZED MULTI-LINK BUTTERFLY FAT TREE NETWORKS" by Venkat Konda assigned to the same assignee as the current application, filed May 25, 2007.

This application is related to and incorporates by reference in its entirety the U.S. Pat. No. 8,363,649 entitled "FULLY CONNECTED GENERALIZED MULTI-LINK MULTI-STAGE NETWORKS" by Venkat Konda assigned to the same assignee as the current application, issued Jan. 29, 2013, the PCT Application Serial No. PCT/U08/64604 entitled "FULLY CONNECTED GENERALIZED MULTI-LINK MULTI-STAGE NETWORKS" by Venkat Konda assigned to the same assignee as the current application, filed May 22, 2008, the U.S. Provisional Patent Application Ser. No. 60/940,389 entitled "FULLY CONNECTED GENERALIZED REARRANGEABLY NONBLOCKING MULTI-LINK MULTI-STAGE NETWORKS" by Venkat Konda assigned to the same assignee as the current application, filed May 25, 2007, the U.S. Provisional Patent Application Ser. No. 60/940,391 entitled "FULLY CONNECTED GENERALIZED FOLDED MULTI-STAGE NETWORKS" by Venkat Konda assigned to the same assignee as the current application, filed May 25, 2007 and the U.S. Provisional Patent Application Ser. No. 60/940,392 entitled "FULLY CONNECTED GENERALIZED STRICTLY NONBLOCKING MULTI-LINK MULTI-STAGE NETWORKS" by Venkat Konda assigned to the same assignee as the current application, filed May 25, 2007.

This application is related to and incorporates by reference in its entirety the U.S. Pat. No. 8,269,523 entitled "VLSI LAYOUTS OF FULLY CONNECTED GENERALIZED NETWORKS" by Venkat Konda assigned to the same assignee as the current application, issued Sep. 18, 2012, the PCT Application Serial No. PCT/U08/64605 entitled "VLSI LAYOUTS OF FULLY CONNECTED GENERALIZED NETWORKS" by Venkat Konda assigned to the same assignee as the current application, filed May 22, 2008, and the U.S. Provisional Patent Application Ser. No. 60/940,394 entitled "VLSI LAYOUTS OF FULLY CONNECTED GENERALIZED NETWORKS" by Venkat Konda assigned to the same assignee as the current application, filed May 25, 2007.

This application is related to and incorporates by reference in its entirety the U.S. application Ser. No. 13/502,207 entitled "VLSI LAYOUTS OF FULLY CONNECTED GENERALIZED AND PYRAMID NETWORKS WITH LOCALITY EXPLOITATION" by Venkat Konda assigned to the same assignee as the current application, filed Apr. 16, 2012, the PCT Application Serial No. PCT/US10/52984 entitled "VLSI LAYOUTS OF FULLY CONNECTED GENERALIZED AND PYRAMID NETWORKS WITH LOCALITY EXPLOITATION" by Venkat Konda assigned to the same assignee as the current application, filed Oct. 16, 2010, the U.S. Provisional Patent Application Ser. No. 61/252,603 entitled "VLSI LAYOUTS OF FULLY CONNECTED NETWORKS WITH LOCALITY EXPLOITATION" by Venkat Konda assigned to the same assignee as the current application, filed Oct. 16, 2009, and the U.S. Provisional Patent Application Ser. No. 61/252,609 entitled "VLSI LAYOUTS OF FULLY CONNECTED GENERALIZED AND PYRAMID NETWORKS" by Venkat Konda assigned to the same assignee as the current application, filed Oct. 16, 2009.

BACKGROUND OF INVENTION

Multi-stage interconnection networks such as Benes networks and butterfly fat tree networks are widely useful in telecommunications, parallel and distributed computing. However VLSI layouts, known in the prior art, of these interconnection networks in an integrated circuit are inefficient and complicated.

Other multi-stage interconnection networks including butterfly fat tree networks, Banyan networks, Batcher-Banyan networks, Baseline networks, Delta networks, Omega networks and Flip networks have been widely studied particularly for self-routing packet switching applications. Also Benes Networks with radix of two have been widely studied and it is known that Benes Networks of radix two are shown to be built with back to back baseline networks which are rearrangeably nonblocking for unicast connections.

The most commonly used VLSI layout in an integrated circuit is based on a two-dimensional grid model comprising only horizontal and vertical tracks. An intuitive interconnection network that utilizes two-dimensional grid model is 2D Mesh Network and its variations such as segmented mesh networks. Hence routing networks used in VLSI layouts are typically 2D mesh networks and its variations. However Mesh Networks require large scale cross points typically with a growth rate of $O(N^2)$ where N is the number of computing elements, ports, or logic elements depending on the application.

Multi-stage interconnection network with a growth rate of $O(N \times \log N)$ requires significantly small number of cross points. U.S. Pat. No. 6,185,220 entitled "Grid Layouts of Switching and Sorting Networks" granted to Muthukrishnan et al. describes a VLSI layout using existing VLSI grid model for Benes and Butterfly networks. U.S. Pat. No. 6,940,308 entitled "Interconnection Network for a Field Programmable Gate Array" granted to Wong describes a VLSI layout where switches belonging to lower stage of Benes Network are laid out close to the logic cells and switches belonging to higher stages are laid out towards the center of the layout.

Due to the inefficient and in some cases impractical VLSI layout of Benes and butterfly fat tree networks on a semiconductor chip, today mesh networks and segmented mesh networks are widely used in the practical applications such as field programmable gate arrays (FPGAs), programmable logic devices (PLDs), and parallel computing interconnects. The prior art VLSI layouts of Benes and butterfly fat tree networks and VLSI layouts of mesh networks and segmented mesh networks require large area to implement the switches on the chip, large number of wires, longer wires, with increased power consumption, increased latency of the signals which effect the maximum clock speed of operation. Some networks may not even be implemented practically on a chip due to the lack of efficient layouts.

Fully connected Benes and butterfly fat tree networks are an over kill for certain practical routing applications and need to be optimized to significantly improve area, power and performance of the routing network.

SUMMARY OF INVENTION

Significantly optimized multi-stage networks, useful in wide target applications, with VLSI layouts (or floor plans) using only horizontal and vertical links to route large scale sub-integrated circuit blocks having inlet and outlet links, and laid out in an integrated circuit device in a two-dimensional grid arrangement of blocks, (for example in an FPGA where the sub-integrated circuit blocks are Lookup Tables, or memory blocks, or DSP blocks) are presented. The optimized multi-stage networks in each block employ several rings of stages of switches with inlet and outlet links of sub-integrated circuit blocks connecting to rings from either left-hand side only, or from right-hand side only, or from both left-hand side and right-hand side.

The optimized multi-stage networks with their VLSI layouts employ shuffle exchange links where outlet links of cross links from switches in a stage of a ring in one sub-integrated circuit block are connected to either inlet links of switches in the another stage of a ring in another sub-integrated circuit block or inlet links of switches in the another stage of a ring in the same sub-integrated circuit block so that said cross links are either vertical links or horizontal and vice versa.

The VLSI layouts exploit spatial locality so that different sub-integrated circuit blocks that are spatially nearer are connected with shorter shuffle exchange links compared to the shuffle exchange links between spatially farther sub-integrated circuit blocks. The optimized multi-stage networks provide high routability for broadcast, unicast and multicast connections, yet with the benefits of significantly lower cross points hence smaller area, lower signal latency, lower power and with significant fast compilation or routing time.

The optimized multi-stage networks $V_{Comb}(N_1, N_2, d, s)$ & $V_{D-Comb}(N_1, N_2, d, s)$ according to the current invention inherit the properties of one or more, in addition to additional properties, generalized multi-stage and pyramid networks $V(N_1, N_2, d, s)$ & $V_P(N_1, N_2, d, s)$, generalized folded multi-stage and pyramid networks $V_{fold}(N_1, N_2, d, s)$ & $V_{fold-p}(N_1, N_2, d, s)$, generalized butterfly fat tree and butterfly fat pyramid networks $V_{bft}(N_1, N_2, d, s)$ & $V_{bfp}(N_1, N_2, d, s)$, generalized multi-link multi-stage and pyramid networks $V_{mlink}(N_1, N_2, d, s)$ & $V_{mlink-p}(N_1, N_2, d, s)$, generalized folded multi-link multi-stage and pyramid networks $V_{fold-mlink}(N_1, N_2, d, s)$ & $V_{fold-mlink-p}(N_1, N_2, d, s)$, generalized multi-link butterfly fat tree and butterfly fat pyramid networks $V_{mlink-bft}(N_1, N_2, d, s)$ & $V_{mlink-bfp}(N_1, N_2, d, s)$, generalized hypercube networks $V_{hcube}(N_1, N_2, d, s)$, and generalized cube connected cycles networks $V_{CCC}(N_1, N_2, d, s)$ for s=1, 2, 3 or any number in general.

BRIEF DESCRIPTION OF DRAWINGS

FIG. 2A is a diagram 200A, in an embodiment of, a stage in a ring of multi-stage hierarchical network corresponding to one block.

FIG. 2B is a diagram 200B, in an embodiment of, a stage in a ring of multi-stage hierarchical network corresponding to one block.

FIG. 2C is a diagram 200C, in an embodiment of, a stage in a ring of multi-stage hierarchical network corresponding to one block.

FIG. 2D is a diagram 200D, in an embodiment of, a stage in a ring of multi-stage hierarchical network corresponding to one block.

FIG. 8 is a diagram 800, is an embodiment of 2D-grid of blocks with each block corresponding to a partial multi-stage network to implement an exemplary multi-stage hierarchical network, in accordance with the invention.

FIG. 16A1 is a diagram 1600A1 of an exemplary prior art implementation of a two by two switch; FIG. 16A2 is a diagram 1600A2 for programmable integrated circuit prior art implementation of the diagram 1600A1 of FIG. 16A1; FIG. 16A3 is a diagram 1600A3 for one-time programmable integrated circuit prior art implementation of the diagram 1600A1 of FIG. 16A1; FIG. 16A4 is a diagram 1600A4 for integrated circuit placement and route implementation of the diagram 1600A1 of FIG. 16A1.

DETAILED DESCRIPTION OF THE INVENTION

Figure 1A:
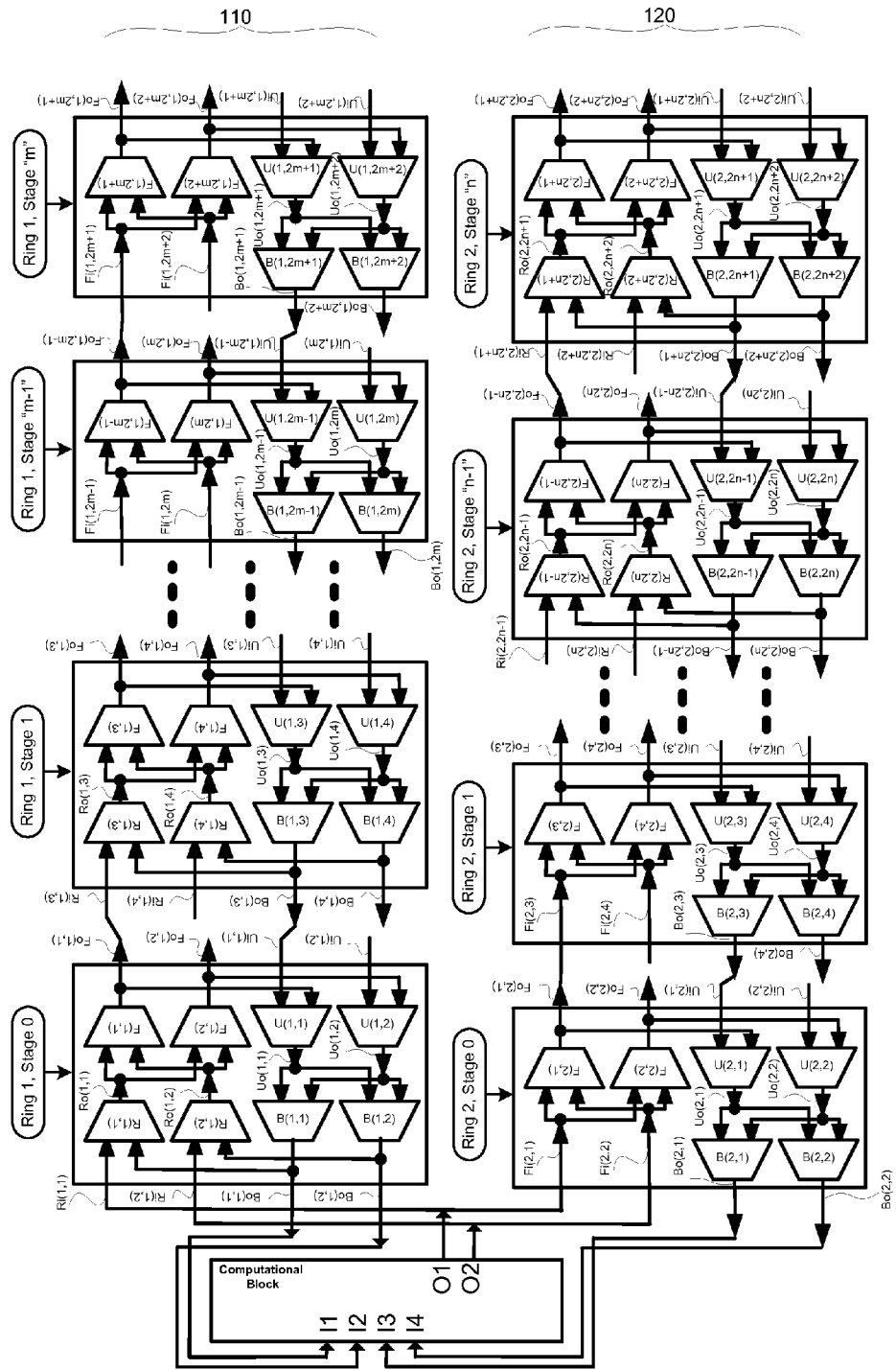
FIG. 1A is a diagram 100A of an exemplary partial multi-stage hierarchical network corresponding to one block with 4 inputs and 2 outputs of a computational block connecting only from left-hand side, to route practical applications such as FPGA routing of hardware designs in accordance with the invention.

Fully connected multi-stage hierarchical networks are an over kill in every dimension such as area, power, and performance for certain practical routing applications and need to be optimized to significantly improve savings in area, power and performance of the routing network. The present invention discloses several embodiments of the optimized multi-stage hierarchical networks for practical routing applications along with their VLSI layout (floor plan) feasibility and simplicity.

The multi-stage hierarchical networks considered for optimization in the current invention include: generalized multi-stage networks $V(N_1, N_2, d, s)$, generalized folded multi-stage networks $V_{fold}(N_1, N_2, d, s)$, generalized butterfly fat tree networks $V_{bft}(N_1, N_2, d, s)$, generalized multi-link multi-stage networks $V_{mlink}(N_1, N_2, d, s)$, generalized folded multi-link multi-stage networks $V_{fold-mlink}(N_1, N_2, d, s)$, generalized multi-link butterfly fat tree networks $V_{mlink-bft}(N_1, N_2, d, s)$, generalized hypercube networks $V_{hcube}(N_1, N_2, d, s)$, and generalized cube connected cycles networks $V_{ccc}(N_1, N_2, d, s)$ for s=1, 2, 3 or any number in general. Alternatively the optimized multi-stage hierarchical networks disclosed in this invention inherit the properties of one or more of these networks, in addition to additional properties that may not be exhibited these networks.

The optimized multi-stage hierarchical networks disclosed are applicable for practical routing applications, with several goals such as: 1) all the signals in the design starting from an inlet link of the network to an outlet link of the network need to be setup without blocking. These signals may consist of broadcast, unicast and multicast connections; Each routing resource may need to be used by only one signal or connection; 2) physical area consumed by the routing network to setup all the signals needs to be small; 3) power consumption of the network needs to be small, after the signals are setup. Power may be both static power and dynamic power; 4) Delay of the signal or a connection needs to be small after it is setup through a path using several routing resources in the path. The smaller the delay of the connections will lead to faster performance of the design. Typically delay of the critical connections determines the performance of the design on a given network; 5) Designs need to be not only routed through the network (i.e., all the signals need to be setup from inlet links of the network to the outlet links of the network), but also the routing needs to be in faster time using efficient routing algorithms; 6) Efficient VLSI layout of the network is also critical and can greatly influence all the other parameters including the area taken up by the network on the chip, total number of wires, length of the wires, delay through the signal paths and hence the maximum clock speed of operation.

The different varieties of multi-stage networks described in various embodiments in the current invention have not been implemented previously on the semiconductor chips. The practical application of these networks includes Field Programmable Gate Array (FPGA) chips. Current commercial FPGA products such as Xilinx's Vertex, Altera's Stratix, Lattice's ECPx implement island-style architecture using mesh and segmented mesh routing interconnects using either full crossbars or sparse crossbars. These routing interconnects consume large silicon area for crosspoints, long wires, large signal propagation delay and hence consume lot of power.

The current invention discloses the optimization of multi-stage hierarchical networks for practical routing applications of numerous types of multi-stage networks. The optimizations disclosed in the current invention are applicable to including the numerous generalized multi-stage networks disclosed in the following patent applications:

1) Strictly and rearrangeably nonblocking for arbitrary fan-out multicast and unicast for generalized multi-stage networks V ($N_1$, $N_2$, d, s) with numerous connection topologies and the scheduling methods are described in detail in the U.S. Pat. No. 8,270,400 that is incorporated by reference above.

2) Strictly and rearrangeably nonblocking for arbitrary fan-out multicast and unicast for generalized butterfly fat tree networks $V_{bft}$ ($N_1$, $N_2$, d, s) with numerous connection topologies and the scheduling methods are described in detail in the U.S. Pat. No. 8,170,040 that is incorporated by reference above.

3) Rearrangeably nonblocking for arbitrary fan-out multicast and unicast, and strictly nonblocking for unicast for generalized multi-link multi-stage networks $V_{mlink}$ ($N_1$, $N_2$, d, s) and generalized folded multi-link multi-stage networks $V_{fold-mlink}$ ($N_1$, $N_2$, d, s) with numerous connection topologies and the scheduling methods are described in detail in the U.S. Pat. No. 8,363,649 that is incorporated by reference above.

4) Strictly and rearrangeably nonblocking for arbitrary fan-out multicast and unicast for generalized multi-link butterfly fat tree networks $V_{mlink-bft}$ ($N_1$, $N_2$, d, s) with numerous connection topologies and the scheduling methods are described in detail in the U.S. Pat. No. 8,170,040 that is incorporated by reference above.

5) Strictly and rearrangeably nonblocking for arbitrary fan-out multicast and unicast for generalized folded multi-stage networks $V_{fold}$ ($N_1$, $N_2$, d, s) with numerous connection topologies and the scheduling methods are described in detail in the U.S. Pat. No. 8,363,649 that is incorporated by reference above.

6) Strictly nonblocking for arbitrary fan-out multicast and unicast for generalized multi-link multi-stage networks $V_{mlink}$ ($N_1$, $N_2$, d, s) and generalized folded multi-link multi-stage networks $V_{fold-mlink}$ ($N_1$, $N_2$, d, s) with numerous connection topologies and the scheduling methods are described in detail in the U.S. Pat. No. 8,363,649 that is incorporated by reference above.

7) VLSI layouts of numerous types of multi-stage networks are described in the U.S. Pat. No. 8,269,523 entitled "VLSI LAYOUTS OF FULLY CONNECTED NETWORKS" that is incorporated by reference above.

8) VLSI layouts of numerous types of multi-stage networks are described in the U.S. application Ser. No. 13/502,207 entitled "VLSI LAYOUTS OF FULLY CONNECTED GENERALIZED AND PYRAMID NETWORKS WITH LOCALITY EXPLOITATION" that is incorporated by reference above.

In addition the optimization with the VLSI layouts disclosed in the current invention are also applicable to generalized multi-stage pyramid networks $V_p$ ($N_1$, $N_2$, d, s), generalized folded multi-stage pyramid networks $V_{fold-p}$ ($N_1$, $N_2$, d, s), generalized butterfly fat pyramid networks $V_{bfp}$ ($N_1$, $N_2$, d, s), generalized multi-link multi-stage pyramid networks $V_{mlink-p}$ ($N_1$, $N_2$, d, s), generalized folded multi-link multi-stage pyramid networks $V_{fold-mlink-p}$ ($N_1$, $N_2$, d, s), generalized multi-link butterfly fat pyramid networks $V_{mlink-bfp}$ ($N_1$, $N_2$, d, s), generalized hypercube networks $V_{hcube}$ ($N_1$, $N_2$, d, s) and generalized cube connected cycles networks $V_{CCC}$ ($N_1$, $N_2$, d, s) for s=1, 2, 3 or any number in general.

Finally the current invention discloses the optimizations and VLSI layouts of multi-stage hierarchical networks $V_{Comb}$ ($N_1$, $N_2$, d, s) and the optimizations and VLSI layouts of multi-stage hierarchical networks $V_{D-Comb}$ ($N_1$, $N_2$, d, s) for practical routing applications (particularly to set up broadcast, unicast and multicast connections), where "Comb" denotes the combination of and "D-Comb" denotes the delay optimized combination of any of the generalized multi-stage networks V ($N_1$, $N_2$, d, s), generalized folded multi-stage networks $V_{fold}$ ($N_1$, $N_2$, d, s), generalized butterfly fat tree networks $V_{bft}$ ($N_1$, $N_2$, d, s), generalized multi-link multi-stage networks $V_{mlink}$ ($N_1$, $N_2$, d, s), generalized folded multi-link multi-stage networks $V_{fold-mlink}$ ($N_1$, $N_2$, d, s), generalized multi-link butterfly fat tree networks $V_{mlink-bft}$ ($N_1$, $N_2$, d, s), generalized multi-stage pyramid networks $V_p$ ($N_1$, $N_2$, d, s), generalized folded multi-stage pyramid networks $V_{fold-p}$ ($N_1$, $N_2$, d, s), generalized butterfly fat pyramid networks $V_{bfp}$ ($N_1$, $N_2$, d, s), generalized multi-link multi-stage pyramid networks $V_{mlink-p}$ ($N_1$, $N_2$, d, s), generalized folded multi-link multi-stage pyramid networks $V_{fold-mlink-p}$ ($N_1$, $N_2$, d, s), generalized multi-link butterfly fat pyramid networks $V_{mlink-bfp}$ ($N_1$, $N_2$, d, s), generalized hypercube networks $V_{hcube}$ ($N_1$, $N_2$, d, s), and generalized cube connected cycles networks $V_{ccc}$ ($N_1$, $N_2$, d, s) for s=1, 2, 3 or any number in general.

Multi-Stage Hierarchical Network $V_{Comb}$ ($N_1$, $N_2$, d, s):

Referring to diagram 100A in FIG. 1A, in one embodiment, an exemplary partial multi-stage hierarchical network $V_{Comb}$ ($N_1$, $N_2$, d, s) where $N_1$=200; $N_2$=400; d=2; and s=1 corresponding to one computational block, with each computational block having 4 inlet links namely I1, I2, I3, and I4; and 2 outlet links namely O1 and O2. And for each computational block the corresponding partial multi-stage hierarchical network $V_{Comb}$ ($N_1$, $N_2$, d, s) 100A consists of two rings 110 and 120, where ring 110 consists of "m+1" stages namely (ring 1, stage 0), (ring 1, stage 1), ... (ring 1, stage "m−1"), and (ring 1, stage "m"), and ring 120 consists of "n+1" stages namely (ring 2, stage 0), (ring 2, stage 1), ... (ring 2, stage "n−1"), and (ring 2, stage "n"), where "m" and "n" are positive integers.

Ring 110 has inlet links Ri(1,1) and Ri(1,2), and has outlet links Bo(1,1) and Bo(1,2). Ring 120 has inlet links Fi(2,1) and Fi(2,2), and outlet links Bo(2,1) and Bo(2,2). And hence the partial multi-stage hierarchical network $V_{Comb}$ ($N_1$, $N_2$, d, s) 100A consists of 4 inlet links and 4 outlet links corresponding to the two rings 110 and 120. Outlet link O1 of the computational block is connected to inlet link Ri(1,1) of ring 110 and also inlet link of Fi(2,1) of ring 120. Similarly outlet link O2 of the computational block is connected to inlet link Ri(1,2) of Ring 110 and also inlet link of Fi(2,2) of Ring 120. And outlet link Bo(1,1) of Ring 110 is connected to inlet link I1 of the computational block. Outlet link Bo(1,2) of Ring 110 is connected to inlet link I2 of the computational block. Similarly outlet link Bo(2,1) of Ring 120 is connected to inlet link I3 of the computational block. Outlet link Bo(2,2) of Ring 120 is connected to inlet link I4 of the computational block. Since in this embodiment outlet link O1 of the computational block is connected to both inlet link Ri(1,1) of ring 110 and inlet link Fi(2,1) of ring 120; and outlet link O2 of the computational block is connected to both inlet link Ri(1,2) of ring 110 and inlet link Fi(2,2) of ring 120, the partial multi-stage hierarchical network $V_{Comb}$ ($N_1$, $N_2$, d, s) 100A consists of 2 inlet links and 4 outlet links.

The two dimensional grid 800 in FIG. 8 illustrates an exemplary arrangement of 100 blocks arranged in 10 rows and 10 columns, in an embodiment. Each row of 2D-grid consisting of 10 block numbers namely the first row consists of the blocks (1,1), (1,2), (1,3), . . . , (1,9), and (1,10). The second row consists of the blocks (2,1), (2,2), (2,3), . . . , (2,9), and (2,10). Similarly 2D-grid 800 consists of 10 rows of each with 10 blocks and finally the tenth row consists of the blocks (10,1), (10,2), (10,3), . . . , (10,9), and (10,10). Each block of 2D-grid 800, in one embodiment, is part of the die area of a semiconductor integrated circuit, so that the complete 2D-grid 800 of 100 blocks represents the complete die of the semiconductor integrated circuit. In one embodiment, each block of 2D-grid 800 consists of one of the partial multi-stage hierarchical network $V_{Comb}$ ($N_1$, $N_2$, d, s) 100A with 2 inlet links and 4 outlet links and the corresponding computational block with 4 inlet links and 2 outlet links. For example block (1,1) of 2D-grid 800 consists of one of the partial multi-stage hierarchical network $V_{Comb}$ ($N_1$, $N_2$, d, s) 100A with 2 inlet links and 4 outlet links and the corresponding computational block with 4 inlet links and 2 outlet links. Similarly each of the 100 blocks of 2D-grid 800 has a separate partial multi-stage hierarchical network $V_{Comb}$ ($N_1$, $N_2$, d, s) 100A with 2 inlet links and 4 outlet links and the corresponding computational block with 4 inlet links and 2 outlet links. Hence the complete multi-stage hierarchical network $V_{Comb}$ ($N_1$, $N_2$, d, s) corresponding to 2D-grid 800 has $N_1$=200 inlet links and $N_2$=400 outlet links. And there are 100 computational blocks each one corresponding to one of the blocks with each computational block having 4 inlet links and 2 outlet links. Also the 2D-grid 800 is organized in the fourth quadrant of the 2D-Plane. In other embodiments the 2D-grid 800 may be organized as either first quadrant, or second quadrant or third quadrant of the 2D-Plane.

Referring to partial multi-stage hierarchical network $V_{Comb}$ ($N_1$, $N_2$, d, s) 100A in FIG. 1A, the stage (ring 1, stage 0) consists of 4 inputs namely Ri(1,1), Ri(1,2), Ui(1,1), and Ui(1,2); and 4 outputs Bo(1,1), Bo(1,2), Fo(1,1), and Fo(1,2). The stage (ring 1, stage 0) also consists of eight 2:1 multiplexers (A multiplexer is hereinafter called a "mux") namely R(1,1), R(1,2), F(1,1), F(1,2), U(1,1), U(1,2), B(1,1), and B(1,2). The 2:1 Mux R(1,1) has two inputs namely Ri(1,1) and Bo(1,1) and has one output Ro(1,1). The 2:1 Mux R(1,2) has two inputs namely Ri(1,2) and Bo(1,2) and has one output Ro(1,2). The 2:1 Mux F(1,1) has two inputs namely Ro(1,1) and Ro(1,2) and has one output Fo(1,1). The 2:1 Mux F(1,2) has two inputs namely Ro(1,1) and Ro(1,2) and has one output Fo(1,2).

The 2:1 Mux U(1,1) has two inputs namely Ui(1,1) and Fo(1,1) and has one output Uo(1,1). The 2:1 Mux U(1,2) has two inputs namely Ui(1,2) and Fo(1,2) and has one output Uo(1,2). The 2:1 Mux B(1,1) has two inputs namely Uo(1,1) and Uo(1,2) and has one output Bo(1,1). The 2:1 Mux B(1,2) has two inputs namely Uo(1,1) and Uo(1,2) and has one output Bo(1,2).

The stage (ring 1, stage 1) consists of 4 inputs namely Ri(1,3), Ri(1,4), Ui(1,3), and Ui(1,4); and 4 outputs Bo(1,3), Bo(1,4), Fo(1,3), and Fo(1,4). The stage (ring 1, stage 1) also consists of eight 2:1 Muxes namely R(1,3), R(1,4), F(1,3), F(1,4), U(1,3), U(1,4), B(1,3), and B(1,4). The 2:1 Mux R(1,3) has two inputs namely Ri(1,3) and Bo(1,3) and has one output Ro(1,3). The 2:1 Mux R(1,4) has two inputs namely Ri(1,4) and Bo(1,4) and has one output Ro(1,4). The 2:1 Mux F(1,3) has two inputs namely Ro(1,3) and Ro(1,4) and has one output Fo(1,3). The 2:1 Mux F(1,4) has two inputs namely Ro(1,3) and Ro(1,4) and has one output Fo(1,4).

The 2:1 Mux U(1,3) has two inputs namely Ui(1,3) and Fo(1,3) and has one output Uo(1,3). The 2:1 Mux U(1,4) has two inputs namely Ui(1,4) and Fo(1,4) and has one output Uo(1,4). The 2:1 Mux B(1,3) has two inputs namely Uo(1,3) and Uo(1,4) and has one output Bo(1,3). The 2:1 Mux B(1,4) has two inputs namely Uo(1,3) and Uo(1,4) and has one output Bo(1,4).

The output Fo(1,1) of the stage (ring 1, stage 0) is connected to the input Ri(1,3) of the stage (ring 1, stage 1) which is called hereinafter an internal connection between two successive stages of a ring. And the output Bo(1,3) of the stage (ring 1, stage 1) is connected to the input Ui(1,1) of the stage (ring 1, stage 0), is another internal connection between stage 0 and stage 1 of the ring 1.

The stage (ring 1, stage "m−1") consists of 4 inputs namely Fi(1,2m−1), Fi(1,2m), Ui(1,2m−1), and Ui(1,2m); and 4 outputs Bo(1,2m−1), Bo(1,2m), Fo(1,2m−1), and Fo(1,2m). The stage (ring 1, stage "m−1') also consists of six 2:1 Muxes namely F(1,2m−1), F(1,2m), U(1,2m−1), U(1,2m), B(1,2m−1), and B(1,2m). The 2:1 Mux F(1,2m−1) has two inputs namely Fi(1,2m−1) and Fi(1,2m) and has one output Fo(1, 2m−1). The 2:1 Mux F(1,2m) has two inputs namely Fi(1, 2m−1) and Fi(1,2m) and has one output Fo(1,2m).

The 2:1 Mux U(1,2m−1) has two inputs namely Ui(1,2m−1) and Fo(1,2m−1) and has one output Uo(1,2m−1). The 2:1 Mux U(1,2m) has two inputs namely Ui(1,2m) and Fo(1,2m) and has one output Uo(1,2m). The 2:1 Mux B(1,2m−1) has two inputs namely Uo(1,2m−1) and Uo(1,2m) and has one output Bo(1,2m−1). The 2:1 Mux B(1,2m) has two inputs namely Uo(1,2m−1) and Uo(1,2m) and has one output Bo(1, 2m).

The stage (ring 1, stage "m") consists of 4 inputs namely Fi(1,2m+1), Fi(1,2m+2), Ui(1,2m+1), and Ui(1,2m+2); and 4 outputs Bo(1,2m+1), Bo(1,2m+2), Fo(1,2m+1), and Fo(1, 2m+2). The stage (ring 1, stage "m") also consists of six 2:1 Muxes namely F(1,2m+1), F(1,2m+2), U(1,2m+1), U(1,2m+ 2), B(1,2m+1), and B(1,2m+2). The 2:1 Mux F(1,2m+1) has two inputs namely Fi(1,2m+1) and Fi(1,2m+2) and has one output Fo(1,2m+1). The 2:1 Mux F(1,2m+2) has two inputs namely Fi(1,2m+1) and Fi(1,2m+2) and has one output Fo(1, 2m+2).

The 2:1 Mux U(1,2m+1) has two inputs namely Ui(1,2m+ 1) and Fo(1,2m+1) and has one output Uo(1,2m+1). The 2:1 Mux U(1,2m+2) has two inputs namely Ui(1,2m+2) and Fo(1,2m+2) and has one output Uo(1,2m+2). The 2:1 Mux B(1,2m+1) has two inputs namely Uo(1,2m+1) and Uo(1, 2m+2) and has one output Bo(1,2m+1). The 2:1 Mux B(1, 2m+2) has two inputs namely Uo(1,2m+1) and Uo(1,2m+2) and has one output Bo(1,2m+2).

The output Fo(1,2m−1) of the stage (ring 1, stage "m−1") is connected to the input Fi(1,2m+1) of the stage (ring 1, stage "m"), is an internal connection between stage "m−1" and stage "m" of the ring 1. And the output Bo(1,2m+1) of the stage (ring 1, stage "m") is connected to the input Ui(1,2m−1) of the stage (ring 1, stage "m−1"), is another internal connection between stage "m−1" and stage "m" of the ring 1

Just the same way the stages (ring 1, stage 0), (ring 1, stage 1), there are also stages (ring 1, stage 2), (ring 1, stage 3), . . . (ring 1, stage "m−1"), (ring 1, stage "m") in that order, where the stages from (ring 1, stage 2), (ring 1, stage 3), . . . , (ring 1, stage "m−2") are not shown in the diagram 100A. Just the same way the two successive stages (ring 1, stage 0) and (ring 1, stage 1) have internal connections between them as described before, any two successive stages have similar internal connections. For example (ring 1, stage 1) and (ring 1, stage 2) have similar internal connections and (ring 1, stage "m−2") and (ring 1, stage "m−1") have similar internal connections.

Stage (ring 1, stage 0) is also called hereinafter the "entry stage" or "first stage" of ring 1, since inlet links and outlet links of the computational block are directly connected to stage (ring 1, stage 0). Also stage (ring 1, stage "m") is hereinafter the "last stage" or "root stage" of ring 1.

The stage (ring 2, stage 0) consists of 4 inputs namely Fi(2,1), Fi(2,2), Ui(2,1), and Ui(2,2); and 4 outputs Bo(2,1), Bo(2,2), Fo(2,1), and Fo(2,2). The stage (ring 2, stage 0) also consists of six 2:1 Muxes namely F(2,1), F(2,2), U(2,1), U(2,2), B(2,1), and B(2,2). The 2:1 Mux F(2,1) has two inputs namely Fi(2,1) and Fi(2,2) and has one output Fo(2,1). The 2:1 Mux F(2,2) has two inputs namely Fi(2,1) and Fi(2,2) and has one output Fo(2,2).

The 2:1 Mux U(2,1) has two inputs namely Ui(2,1) and Fo(2,1) and has one output Uo(2,1). The 2:1 Mux U(2,2) has two inputs namely Ui(2,2) and Fo(2,2) and has one output Uo(2,2). The 2:1 Mux B(2,1) has two inputs namely Uo(2,1) and Uo(2,2) and has one output Bo(2,1). The 2:1 Mux B(2,2) has two inputs namely Uo(2,1) and Uo(2,2) and has one output Bo(2,2).

The stage (ring 2, stage 1) consists of 4 inputs namely Fi(2,3), Fi(2,4), Ui(2,3), and Ui(2,4); and 4 outputs Bo(2,3), Bo(2,4), Fo(2,3), and Fo(2,4). The stage (ring 2, stage 1) also consists of six 2:1 Muxes namely F(2,3), F(2,4), U(2,3), U(2,4), B(2,3), and B(2,4). The 2:1 Mux F(2,3) has two inputs namely Fi(2,3) and Fi(2,4) and has one output Fo(2,3). The 2:1 Mux F(2,4) has two inputs namely Fi(2,3) and Fi(2,4) and has one output Fo(2,4).

The 2:1 Mux U(2,3) has two inputs namely Ui(2,3) and Fo(2,3) and has one output Uo(2,3). The 2:1 Mux U(2,4) has two inputs namely Ui(2,4) and Fo(2,4) and has one output Uo(2,4). The 2:1 Mux B(2,3) has two inputs namely Uo(2,3) and Uo(2,4) and has one output Bo(2,3). The 2:1 Mux B(2,4) has two inputs namely Uo(2,3) and Uo(2,4) and has one output Bo(2,4).

The output Fo(2,1) of the stage (ring 2, stage 0) is connected to the input Fi(2,3) of the stage (ring 2, stage 1), is an internal connection between stage 0 and stage 1 of the ring 2. And the output Bo(2,3) of the stage (ring 2, stage 1) is connected to the input Ui(2,1) of the stage (ring 2, stage 0), is another internal connection between stage 0 and stage 1 of the ring 1.

The stage (ring 2, stage "n−1") consists of 4 inputs namely Ri(2,2n−1), Ri(2,2n), Ui(1,2n−1), and Ui(1,2n); and 4 outputs Bo(1,2n−1), Bo(1,2n), Fo(1,2n−1), and Fo(1,2n). The stage (ring 2, stage "n−1') also consists of eight 2:1 Muxes namely R(2,2n−1), R(2,2n), F(2,2n−1), F(1,2n), U(1,2n−1), U(1,2n), B(1,2n−1), and B(1,2n). The 2:1 Mux R(2,2n−1) has two inputs namely Ri(2,2n−1) and Bo(2,2n−1) and has one output Ro(2,2n−1). The 2:1 Mux R(2,2n) has two inputs namely Ri(2,2n) and Bo(2,2n) and has one output Ro(2,2n). The 2:1 Mux F(2,2n−1) has two inputs namely Ro(2,2n−1) and Ro(2,2n) and has one output Fo(2,2n−1). The 2:1 Mux F(2,2n) has two inputs namely Ro(2,2n−1) and Ro(2,2n) and has one output Fo(2,2n).

The 2:1 Mux U(2,2n−1) has two inputs namely Ui(2,2n−1) and Fo(2,2n−1) and has one output Uo(2,2n−1). The 2:1 Mux U(2,2n) has two inputs namely Ui(2,2n) and Fo(2,2n) and has one output Uo(2,2n). The 2:1 Mux B(2,2n−1) has two inputs namely Uo(2,2n−1) and Uo(2,2n) and has one output Bo(2,2n−1). The 2:1 Mux B(2,2n) has two inputs namely Uo(2,2n−1) and Uo(2,2n) and has one output Bo(2,2n).

The stage (ring 2, stage "n") consists of 4 inputs namely Ri(2,2n+1), Ri(2,2n+2), Ui(2,2n+1), and Ui(2,2n+2); and 4 outputs Bo(2,2n+1), Bo(2,2n+2), Fo(2,2n+1), and Fo(2,2n+2). The stage (ring 2, stage "n") also consists of eight 2:1 Muxes namely R(2,2n+1), R(2,2n+2), F(2,2n+1), F(2,2n+2), U(2,2n+1), U(2,2n+2), B(2,2n+1), and B(2,2n+2). The 2:1 Mux R(2,2n+1) has two inputs namely Ri(2,2n+1) and Bo(2,2n+1) and has one output Ro(2,2n+1). The 2:1 Mux R(2,2n+2) has two inputs namely Ri(2,2n+2) and Bo(2,2n+2) and has one output Ro(2,2n+2). The 2:1 Mux F(2,2n+1) has two inputs namely Ro(2,2n+1) and Ro(2,2n+2) and has one output Fo(2,2n+1). The 2:1 Mux F(2,2n+2) has two inputs namely Ro(2,2n+1) and Ro(2,2n+2) and has one output Fo(2,2n+2).

The 2:1 Mux U(2,2n+1) has two inputs namely Ui(2,2n+1) and Fo(2,2n+1) and has one output Uo(2,2n+1). The 2:1 Mux U(2,2n+2) has two inputs namely Ui(2,2n+2) and Fo(2,2n+2) and has one output Uo(2,2n+2). The 2:1 Mux B(2,2n+1) has two inputs namely Uo(2,2n+1) and Uo(2,2n+2) and has one output Bo(2,2n+1). The 2:1 Mux B(2,2n+2) has two inputs namely Uo(2,2n+1) and Uo(2,2n+2) and has one output Bo(2,2n+2).

The output Fo(2,2n−1) of the stage (ring 2, stage "n−1") is connected to the input Ri(2,2n+1) of the stage (ring 2, stage "n"), is an internal connection between stage "n−1" and stage "n" of the ring 1. And the output Bo(2,2n+1) of the stage (ring 2, stage "n") is connected to the input Ui(2,2n−1) of the stage (ring 2, stage "n−1"), is another internal connection between stage "n−1" and stage "n" of the ring 1.

Each stage of any ring of the partial multi-stage hierarchical network $V_{Comb}(N_1, N_2, d, s)$ 100A consists of 4 inputs and $2*d=4$ outputs. Even though the stages (ring 1, stage 0), (ring 1, stage 1), (ring 2, stage "n−1"), and (ring 2, stage "n") each have eight 2:1 muxes, and the stages (ring 2, stage 0), (ring 2, stage 1), (ring 1, stage "m−1"), and (ring 1, stage "m") each have six 2:1 muxes, in other embodiments any of these stages can be one of the four by four switch diagrams namely 200A of FIG. 2A, 200B of FIG. 2B, 200C of FIG. 2C, and one of the eight by four switch diagrams namely 200E of FIG. 2E.

Figure 1B:
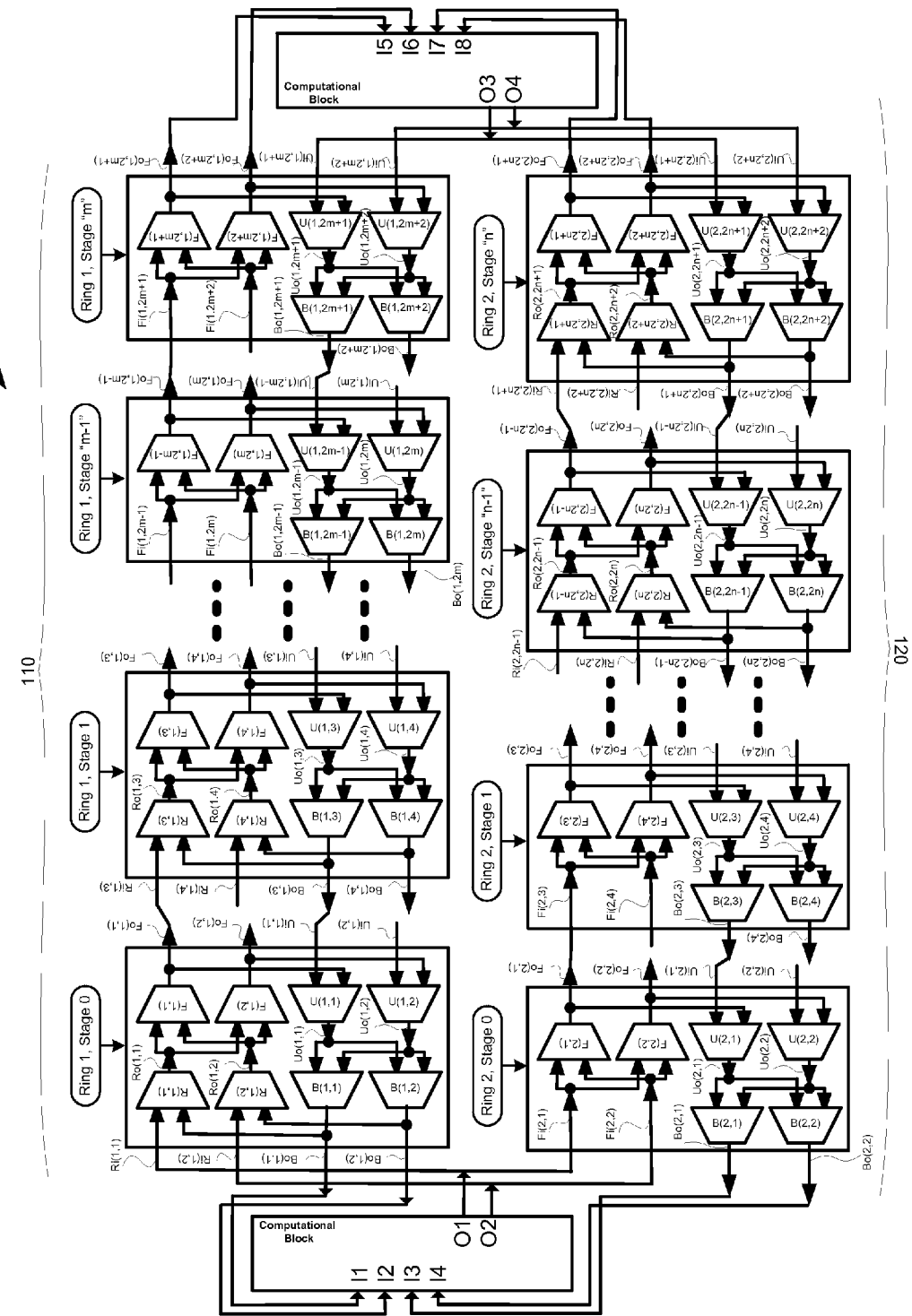
FIG. 1B is a diagram 100B of an exemplary partial multi-stage hierarchical network corresponding to one block with 8 inputs and 4 outputs of a computational block connecting from both left-hand side and right-hand side, to route practical applications such as FPGA routing of hardware designs in accordance with the invention.

Referring to diagram 100B in FIG. 1B, in one embodiment, an exemplary partial multi-stage hierarchical network $V_{Comb}(N_1, N_2, d, s)$ where $N_1=400$; $N_2=800$; $d=2$; and $s=1$ corresponding to one computational block, with each computational block having 8 inlet links namely I1, I2, I3, I4, I5, I6, I7, and I8; and 4 outlet links namely O1, O2, O3, and O4. And for each computational block the corresponding partial multi-stage hierarchical network $V_{Comb}(N_1, N_2, d, s)$ 100B consists of two rings 110 and 120, where ring 110 consists of "m+1" stages namely (ring 1, stage 0), (ring 1, stage 1), ... (ring 1, stage "k−1"), and (ring 1, stage "k"), and ring 120 consists of "n+1" stages namely (ring 2, stage 0), (ring 2, stage 1), ... (ring 2, stage "n−1"), and (ring 2, stage "n"), where "m" and "n" are positive integers.

Ring 110 has inlet links Ri(1,1) and Ri(1,2) from the left-hand side, and has outlet links Bo(1,1) and Bo(1,2) from left-hand side. Ring 110 also has inlet links Ui(1,2m+1) and Ui(1,2m+2) from the right-hand side, and has outlet links Fo(1,2m+1) and Fo(1,2m+2) from right-hand side. Ring 120 has inlet links Fi(2,1) and Fi(2,2) from left-hand side, and outlet links Bo(2,1) and Bo(2,2) from left-hand side. Ring 120 also has inlet links Ui(2,2n+1) and Ui(2,2n+2) from the right-hand side, and has outlet links Fo(2,2n+1) and Fo(2,2n+2) from right-hand side.

And the partial multi-stage hierarchical network $V_{Comb}(N_1, N_2, d, s)$ 100B consists of 8 inlet links and 4 outlet links corresponding to the two rings 110 and 120. From left-hand side, outlet link O1 of the computational block is connected to inlet link Ri(1,1) of ring 110 and also inlet link of Fi(2,1) of ring 120. Similarly from left-hand side, outlet link O2 of the computational block is connected to inlet link Ri(1,2) of Ring 110 and also inlet link of Fi(2,2) of Ring 120. And from left-hand side, outlet link Bo(1,1) of Ring 110 is connected to inlet link I1 of the computational block. From left-hand side, Outlet link Bo(1,2) of Ring 110 is connected to inlet link I2 of the computational block. Similarly from left-hand side, outlet link Bo(2,1) of Ring 120 is connected to inlet link I3 of the computational block. From left-hand side, outlet link Bo(2,2) of Ring 120 is connected to inlet link I4 of the computational block.

From right-hand side, outlet link O3 of the computational block is connected to inlet link Ui(1,2m+1) of ring 110 and also inlet link of Ui(2,2n+1) of ring 120. Similarly from right-hand side, outlet link O4 of the computational block is connected to inlet link Ui(1,2m+2) of Ring 110 and also inlet link of Ui(2,2n+2) of Ring 120. And from right-hand side, outlet link Fo(1,2m+1) of Ring 110 is connected to inlet link I5 of the computational block. From right-hand side, outlet link Fo(1,2m+2) of Ring 110 is connected to inlet link I6 of the computational block. Similarly from right-hand side, outlet link Fo(2,2n+1) of Ring 120 is connected to inlet link I7 of the computational block. From right-hand side, outlet link Fo(2,2n+2) of Ring 120 is connected to inlet link I8 of the computational block.

Since in this embodiment outlet link O1 of the computational block is connected to both inlet link Ri(1,1) of ring 110 and inlet link Fi(2,1) of ring 120; outlet link O2 of the computational block is connected to both inlet link Ri(1,2) of ring 110 and inlet link Fi(2,2) of ring 120; outlet link O3 of the computational block is connected to both inlet link Ui(1,2m+1) of ring 110 and inlet link Ui(2,2n+1) of ring 120; and outlet link O4 of the computational block is connected to both inlet link Ui(1,2m+2) of ring 110 and inlet link Ui(2,2n+2) of ring 120, the partial multi-stage hierarchical network $V_{Comb}$ ($N_1$, $N_2$, d, s) 100B consists of 4 inlet links and 8 outlet links.

Referring to two dimensional grid 800 in FIG. 8 illustrates, in another embodiment, each block of 2D-grid 800 consists of one of the partial multi-stage hierarchical network $V_{Comb}$ ($N_1$, $N_2$, d, s) 100B with 4 inlet links and 8 outlet links and the corresponding computational block with 8 inlet links and 4 outlet links. For example block (1,1) of 2D-grid 800 consists of one of the partial multi-stage hierarchical network $V_{Comb}$ ($N_1$, $N_2$ d, s) 100B with 4 inlet links and 8 outlet links and the corresponding computational block with 8 inlet links and 4 outlet links. Similarly each of the 100 blocks of 2D-grid 800 has a separate partial multi-stage hierarchical network $V_{Comb}$ ($N_1$, $N_2$, d, s) 100B with 4 inlet links and 8 outlet links and the corresponding computational block with 8 inlet links and 4 outlet links. Hence the complete multi-stage hierarchical network $V_{Comb}$ ($N_1$, $N_2$, d, s) corresponding to 2D-grid 800 has $N_1$=400 inlet links and $N_2$=800 outlet links. Since there are 100 computational blocks each one corresponding to one of the blocks with each computational block having 8 inlet links and 4 outlet links. Also the 2D-grid 800 is organized in the fourth quadrant of the 2D-Plane. In other embodiments the 2D-grid 800 may be organized as either first quadrant, or second quadrant or third quadrant of the 2D-Plane.

Referring to partial multi-stage hierarchical network $V_{Comb}$ ($N_1$, $N_2$, d, s) 100B in FIG. 1B, the stage (ring 1, stage 0) consists of 4 inputs namely Ri(1,1), Ri(1,2), Ui(1,1), and Ui(1,2); and 4 outputs Bo(1,1), Bo(1,2), Fo(1,1), and Fo(1,2). The stage (ring 1, stage 0) also consists of eight 2:1 multiplexers (A multiplexer is hereinafter called a "mux") namely R(1,1), R(1,2), F(1,1), F(1,2), U(1,1), U(1,2), B(1,1), and B(1,2). The 2:1 Mux R(1,1) has two inputs namely Ri(1,1) and Bo(1,1) and has one output Ro(1,1). The 2:1 Mux R(1,2) has two inputs namely Ri(1,2) and Bo(1,2) and has one output Ro(1,2). The 2:1 Mux F(1,1) has two inputs namely Ro(1,1) and Ro(1,2) and has one output Fo(1,1). The 2:1 Mux F(1,2) has two inputs namely Ro(1,1) and Ro(1,2) and has one output Fo(1,2).

The 2:1 Mux U(1,1) has two inputs namely Ui(1,1) and Fo(1,1) and has one output Uo(1,1). The 2:1 Mux U(1,2) has two inputs namely Ui(1,2) and Fo(1,2) and has one output Uo(1,2). The 2:1 Mux B(1,1) has two inputs namely Uo(1,1) and Uo(1,2) and has one output Bo(1,1). The 2:1 Mux B(1,2) has two inputs namely Uo(1,1) and Uo(1,2) and has one output Bo(1,2).

The stage (ring 1, stage 1) consists of 4 inputs namely Ri(1,3), Ri(1,4), Ui(1,3), and Ui(1,4); and 4 outputs Bo(1,3), Bo(1,4), Fo(1,3), and Fo(1,4). The stage (ring 1, stage 1) also consists of eight 2:1 Muxes namely R(1,3), R(1,4), F(1,3), F(1,4), U(1,3), U(1,4), B(1,3), and B(1,4). The 2:1 Mux R(1,3) has two inputs namely Ri(1,3) and Bo(1,3) and has one output Ro(1,3). The 2:1 Mux R(1,4) has two inputs namely Ri(1,4) and Bo(1,4) and has one output Ro(1,4). The 2:1 Mux F(1,3) has two inputs namely Ro(1,3) and Ro(1,4) and has one output Fo(1,3). The 2:1 Mux F(1,4) has two inputs namely Ro(1,3) and Ro(1,4) and has one output Fo(1,4).

The 2:1 Mux U(1,3) has two inputs namely Ui(1,3) and Fo(1,3) and has one output Uo(1,3). The 2:1 Mux U(1,4) has two inputs namely Ui(1,4) and Fo(1,4) and has one output Uo(1,4). The 2:1 Mux B(1,3) has two inputs namely Uo(1,3) and Uo(1,4) and has one output Bo(1,3). The 2:1 Mux B(1,4) has two inputs namely Uo(1,3) and Uo(1,4) and has one output Bo(1,4).

The output Fo(1,1) of the stage (ring 1, stage 0) is connected to the input Ri(1,3) of the stage (ring 1, stage 1) which is called hereinafter an internal connection between two successive stages of a ring. And the output Bo(1,3) of the stage (ring 1, stage 1) is connected to the input Ui(1,1) of the stage (ring 1, stage 0), is another internal connection between stage 0 and stage 1 of the ring 1.

The stage (ring 1, stage "m−1") consists of 4 inputs namely Fi(1,2m−1), Fi(1,2m), Ui(1,2m−1), and Ui(1,2m); and 4 outputs Bo(1,2m−1), Bo(1,2m), Fo(1,2m−1), and Fo(1,2m). The stage (ring 1, stage "m−1') also consists of six 2:1 Muxes namely F(1,2m−1), F(1,2m), U(1,2m−1), U(1,2m), B(1,2m−1), and B(1,2m). The 2:1 Mux F(1,2m−1) has two inputs namely Fi(1,2m−1) and Fi(1,2m) and has one output Fo(1,2m−1). The 2:1 Mux F(1,2m) has two inputs namely Fi(1,2m−1) and Fi(1,2m) and has one output Fo(1,2m).

The 2:1 Mux U(1,2m−1) has two inputs namely Ui(1,2m−1) and Fo(1,2m−1) and has one output Uo(1,2m−1). The 2:1 Mux U(1,2m) has two inputs namely Ui(1,2m) and Fo(1,2m) and has one output Uo(1,2m). The 2:1 Mux B(1,2m−1) has two inputs namely Uo(1,2m−1) and Uo(1,2m) and has one output Bo(1,2m−1). The 2:1 Mux B(1,2m) has two inputs namely Uo(1,2m−1) and Uo(1,2m) and has one output Bo(1,2m).

The stage (ring 1, stage "m") consists of 4 inputs namely Fi(1,2m+1), Fi(1,2m+2), Ui(1,2m+1), and Ui(1,2m+2); and 4 outputs Bo(1,2m+1), Bo(1,2m+2), Fo(1,2m+1), and Fo(1,2m+2). The stage (ring 1, stage "m") also consists of six 2:1 Muxes namely F(1,2m+1), F(1,2m+2), U(1,2m+1), U(1,2m+2), B(1,2m+1), and B(1,2m+2). The 2:1 Mux F(1,2m+1) has two inputs namely Fi(1,2m+1) and Fi(1,2m+2) and has one output Fo(1,2m+1). The 2:1 Mux F(1,2m+2) has two inputs namely Fi(1,2m+1) and Fi(1,2m+2) and has one output Fo(1,2m+2).

The 2:1 Mux U(1,2m+1) has two inputs namely Ui(1,2m+1) and Fo(1,2m+1) and has one output Uo(1,2m+1). The 2:1 Mux U(1,2m+2) has two inputs namely Ui(1,2m+2) and Fo(1,2m+2) and has one output Uo(1,2m+2). The 2:1 Mux B(1,2m+1) has two inputs namely Uo(1,2m+1) and Uo(1, 2m+2) and has one output Bo(1,2m+1). The 2:1 Mux B(1, 2m+2) has two inputs namely Uo(1,2m+1) and Uo(1,2m+2) and has one output Bo(1,2m+2).

The output Fo(1,2m−1) of the stage (ring 1, stage "m−1") is connected to the input Fi(1,2m+1) of the stage (ring 1, stage "m"), is an internal connection between stage "m−1" and stage "m" of the ring 1. And the output Bo(1,2m+1) of the stage (ring 1, stage "m") is connected to the input Ui(1,2m−1) of the stage (ring 1, stage "m−1"), is another internal connection between stage "m−1" and stage "m" of the ring 1

Just the same way the stages (ring 1, stage 0), (ring 1, stage 1), there are also stages (ring 1, stage 2), (ring 1, stage 3), ... (ring 1, stage "m−1"), (ring 1, stage "m") in that order, where the stages from (ring 1, stage 2), (ring 1, stage 3), ..., (ring 1, stage "m−2") are not shown in the diagram 100B. Just the same way the two successive stages (ring 1, stage 0) and (ring 1, stage 1) have internal connections between them as described before, any two successive stages have similar internal connections. For example (ring 1, stage 1) and (ring 1, stage 2) have similar internal connections and (ring 1, stage "m−2") and (ring 1, stage "m−1") have similar internal connections.

Stage (ring 1, stage 0) is also called hereinafter the "entry stage" or "first stage" of ring 1, since inlet links and outlet links of the computational block are directly connected to stage (ring 1, stage 0). Also stage (ring 1, stage "m") is hereinafter the "last stage" or "root stage" of ring 1.

The stage (ring 2, stage 0) consists of 4 inputs namely Fi(2,1), Fi(2,2), Ui(2,1), and Ui(2,2); and 4 outputs Bo(2,1), Bo(2,2), Fo(2,1), and Fo(2,2). The stage (ring 2, stage 0) also consists of six 2:1 Muxes namely F(2,1), F(2,2), U(2,1), U(2,2), B(2,1), and B(2,2). The 2:1 Mux F(2,1) has two inputs namely Fi(2,1) and Fi(2,2) and has one output Fo(2,1). The 2:1 Mux F(2,2) has two inputs namely Fi(2,1) and Fi(2,2) and has one output Fo(2,2).

The 2:1 Mux U(2,1) has two inputs namely Ui(2,1) and Fo(2,1) and has one output Uo(2,1). The 2:1 Mux U(2,2) has two inputs namely Ui(2,2) and Fo(2,2) and has one output Uo(2,2). The 2:1 Mux B(2,1) has two inputs namely Uo(2,1) and Uo(2,2) and has one output Bo(2,1). The 2:1 Mux B(2,2) has two inputs namely Uo(2,1) and Uo(2,2) and has one output Bo(2,2).

The stage (ring 2, stage 1) consists of 4 inputs namely Fi(2,3), Fi(2,4), Ui(2,3), and Ui(2,4); and 4 outputs Bo(2,3), Bo(2,4), Fo(2,3), and Fo(2,4). The stage (ring 2, stage 1) also consists of six 2:1 Muxes namely F(2,3), F(2,4), U(2,3), U(2,4), B(2,3), and B(2,4). The 2:1 Mux F(2,3) has two inputs namely Fi(2,3) and Fi(2,4) and has one output Fo(2,3). The 2:1 Mux F(2,4) has two inputs namely Fi(2,3) and Fi(2,4) and has one output Fo(2,4).

The 2:1 Mux U(2,3) has two inputs namely Ui(2,3) and Fo(2,3) and has one output Uo(2,3). The 2:1 Mux U(2,4) has two inputs namely Ui(2,4) and Fo(2,4) and has one output Uo(2,4). The 2:1 Mux B(2,3) has two inputs namely Uo(2,3) and Uo(2,4) and has one output Bo(2,3). The 2:1 Mux B(2,4) has two inputs namely Uo(2,3) and Uo(2,4) and has one output Bo(2,4).

The output Fo(2,1) of the stage (ring 2, stage 0) is connected to the input Fi(2,3) of the stage (ring 2, stage 1), is an internal connection between stage 0 and stage 1 of the ring 2. And the output Bo(2,3) of the stage (ring 2, stage 1) is connected to the input Ui(2,1) of the stage (ring 2, stage 0), is another internal connection between stage 0 and stage 1 of the ring 1.

The stage (ring 2, stage "n−1") consists of 4 inputs namely Ri(2,2n−1), Ri(2,2n), Ui(1,2n−1), and Ui(1,2n); and 4 outputs Bo(1,2n−1), Bo(1,2n), Fo(1,2n−1), and Fo(1,2n). The stage (ring 2, stage "n−1") also consists of eight 2:1 Muxes namely R(2,2n−1), R(2,2n), F(2,2n−1), F(1,2n), U(1,2n−1), U(1,2n), B(1,2n−1), and B(1,2n). The 2:1 Mux R(2,2n−1) has two inputs namely Ri(2,2n−1) and Bo(2,2n−1) and has one output Ro(2,2n−1). The 2:1 Mux R(2,2n) has two inputs namely Ri(2,2n) and Bo(2,2n) and has one output Ro(2,2n). The 2:1 Mux F(2,2n−1) has two inputs namely Ro(2,2n−1) and Ro(2,2n) and has one output Fo(2,2n−1). The 2:1 Mux F(2,2n) has two inputs namely Ro(2,2n−1) and Ro(2,2n) and has one output Fo(2,2n).

The 2:1 Mux U(2,2n−1) has two inputs namely Ui(2,2n−1) and Fo(2,2n−1) and has one output Uo(2,2n−1). The 2:1 Mux U(2,2n) has two inputs namely Ui(2,2n) and Fo(2,2n) and has one output Uo(2,2n). The 2:1 Mux B(2,2n−1) has two inputs namely Uo(2,2n−1) and Uo(2,2n) and has one output Bo(2, 2n−1). The 2:1 Mux B(2,2n) has two inputs namely Uo(2,2n−1) and Uo(2,2n) and has one output Bo(2,2n).

The stage (ring 2, stage "n") consists of 4 inputs namely Ri(2,2n+1), Ri(2,2n+2), Ui(2,2n+1), and Ui(2,2n+2); and 4 outputs Bo(2,2n+1), Bo(2,2n+2), Fo(2,2n+1), and Fo(2,2n+2). The stage (ring 2, stage "n") also consists of eight 2:1 Muxes namely R(2,2n+1), R(2,2n+2), F(2,2n+1), F(2,2n+2), U(2,2n+1), U(2,2n+2), B(2,2n+1), and B(2,2n+2). The 2:1 Mux R(2,2n+1) has two inputs namely Ri(2,2n+1) and Bo(2, 2n+1) and has one output Ro(2,2n+1). The 2:1 Mux R(2,2n+ 2) has two inputs namely Ri(2,2n+2) and Bo(2,2n+2) and has one output Ro(2,2n+2). The 2:1 Mux F(2,2n+1) has two inputs namely Ro(2,2n+1) and Ro(2,2n+2) and has one output Fo(2,2n+1). The 2:1 Mux F(2,2n+2) has two inputs namely Ro(2,2n+1) and Ro(2,2n+2) and has one output Fo(2, 2n+2).

The 2:1 Mux U(2,2n+1) has two inputs namely Ui(2,2n+1) and Fo(2,2n+1) and has one output Uo(2,2n+1). The 2:1 Mux U(2,2n+2) has two inputs namely Ui(2,2n+2) and Fo(2,2n+2) and has one output Uo(2,2n+2). The 2:1 Mux B(2,2n+1) has two inputs namely Uo(2,2n+1) and Uo(2,2n+2) and has one output Bo(2,2n+1). The 2:1 Mux B(2,2n+2) has two inputs namely Uo(2,2n+1) and Uo(2,2n+2) and has one output Bo(2, 2n+2).

The output Fo(2,2n−1) of the stage (ring 2, stage "n−1") is connected to the input Ri(2,2n+1) of the stage (ring 2, stage "n"), is an internal connection between stage "n−1" and stage "n" of the ring 1. And the output Bo(2,2n+1) of the stage (ring 2, stage "n") is connected to the input Ui(2,2n−1) of the stage (ring 2, stage "n−1"), is another internal connection between stage "n−1" and stage "n" of the ring 1.

Each stage of any ring of the partial multi-stage hierarchical network $V_{Comb}$ ($N_1$, $N_2$, d, s) 100B consists of 4 inputs and 2*d=4 outputs. Even though the stages (ring 1, stage 0), (ring 1, stage 1), (ring 2, stage "n−1"), and (ring 2, stage "n") each have eight 2:1 muxes, and the stages (ring 2, stage 0), (ring 2, stage 1), (ring 1, stage "m−1"), and (ring 1, stage "m") each have six 2:1 muxes, in other embodiments any of these stages can be one of the four by four switch diagrams namely 200A of FIG. 2A, 200B of FIG. 2B, 200C of FIG. 2C, and one of the eight by four switch diagrams namely 200E of FIG. 2E.

In general, any ring of the partial multi-stage hierarchical network $V_{Comb}$ ($N_1$, $N_2$, d, s) may have inputs and outputs connected from computational block from either only from left-hand side as in the partial multi-stage hierarchical network $V_{Comb}$ ($N_1$, $N_2$ d, s) 100A; or only from right-hand side; or from both left-hand and right-hand sides as in the partial multi-stage hierarchical network $V_{Comb}$ ($N_1$, $N_2$ d, s) 100B.

FIG. 2A illustrates a stage (ring "k", stage "m") 200A consists of 4 inputs namely Fi(k,2m+1), Fi(k,2m+2), Ui(k, 2m+1), and Ui(k,2m+2); and 4 outputs Bo(k,2m+1), Bo(k, 2m+2), Fo(k,2m+1), and Fo(k,2m+2). The stage (ring "k", stage "m") also consists of six 2:1 Muxes namely F(k,2m+1), F(k,2m+2), U(k,2m+1), U(k,2m+2), B(k,2m+1), and B(k, 2m+2). The 2:1 Mux F(k,2m+1) has two inputs namely Fi(k, 2m+1) and Fi(k,2m+2) and has one output Fo(k,2m+1). The 2:1 Mux F(k,2m+2) has two inputs namely Fi(k,2m+1) and Fi(k,2m+2) and has one output Fo(k,2m+2).

The 2:1 Mux U(k,2m+1) has two inputs namely Ui(k,2m+ 1) and Fo(k,2m+1) and has one output Uo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely Uo(k,2m+1) and Uo(k, 2m+2) and has one output Bo(k,2m+1). The 2:1 Mux B(k, 2m+2) has two inputs namely Uo(k,2m+1) and Uo(k,2m+2) and has one output Bo(k,2m+2).

FIG. 2B illustrates a stage (ring "k", stage "m") 200B consists of 4 inputs namely Ri(k,2m+1), Ri(k,2m+2), Ui(k, 2m+1), and Ui(k,2m+2); and 4 outputs Bo(k,2m+1), Bo(k, 2m+2), Fo(k,2m+1), and Fo(k,2m+2). The stage (ring "k", stage "m") also consists of eight 2:1 Muxes namely R(k,2m+ 1), R(k,2m+2), F(k,2m+1), F(k,2m+2), U(k,2m+1), U(k,2m+ 2), B(k,2m+1), and B(k,2m+2). The 2:1 Mux R(k,2m+1) has two inputs namely Ri(k,2m+1) and Bo(k,2m+1) and has one output Ro(k,2m+1). The 2:1 Mux R(k,2m+2) has two inputs namely Ri(k,2m+2) and Bo(k,2m+2) and has one output Ro(k,2m+2). The 2:1 Mux F(k,2m+1) has two inputs namely Ro(k,2m+1) and Ro(k,2m+2) and has one output Fo(k,2m+ 1). The 2:1 Mux F(k,2m+2) has two inputs namely Ro(k,2m+ 1) and Ro(k,2m+2) and has one output Fo(k,2m+2).

The 2:1 Mux U(k,2m+1) has two inputs namely Ui(k,2m+ 1) and Fo(k,2m+1) and has one output Uo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely Uo(k,2m+1) and Uo(k, 2m+2) and has one output Bo(k,2m+1). The 2:1 Mux B(k, 2m+2) has two inputs namely Uo(k,2m+1) and Uo(k,2m+2) and has one output Bo(k,2m+2).

FIG. 2C illustrates a stage (ring "k", stage "m") 200C consists of 4 inputs namely Fi(k,2m+1), Fi(k,2m+2), Bi(k, 2m+1), and Bi(k,2m+2); and 4 outputs Bo(k,2m+1), Bo(k, 2m+2), Fo(k,2m+1), and Fo(k,2m+2). The stage (ring "k", stage "m") also consists of four 2:1 Muxes namely F(k,2m+ 1), F(k,2m+2), B(k,2m+1), and B(k,2m+2). The 2:1 Mux F(k,2m+1) has two inputs namely Fi(k,2m+1) and Fi(k,2m+ 2) and has one output Fo(k,2m+1). The 2:1 Mux F(k,2m+2) has two inputs namely Fi(k,2m+1) and Fi(k,2m+2) and has one output Fo(k,2m+2).

The 2:1 Mux B(k,2m+1) has two inputs namely Bi(k,2m+ 1) and Bi(k,2m+2) and has one output Bo(k,2m+1). The 2:1 Mux B(k,2m+2) has two inputs namely Bi(k,2m+1) and Bi(k, 2m+2) and has one output Bo(k,2m+2).

However the stage "m+1" of ring "k" with "m+1" stages of the partial multi-stage hierarchical network $V_{Comb}$ ($N_1$, $N_2$, d, s), in another embodiment, may have 2 inputs and 2 outputs as shown in diagram 200D in FIG. 2D. FIG. 2D illustrates a stage (ring "k", stage "m") 200D consists of 2 inputs namely Fi(k,2m+1) and Fi(k,2m+2); and 2 outputs Fo(k,2m+1) and Fo(k,2m+2). The stage (ring "k", stage "m") also consists of two 2:1 Muxes namely F(k,2m+1), F(k,2m+2). The 2:1 Mux F(k,2m+1) has two inputs namely Fi(k,2m+1) and Fi(k,2m+ 2) and has one output Fo(k,2m+1). The 2:1 Mux F(k,2m+2) has two inputs namely Fi(k,2m+1) and Fi(k,2m+2) and has one output Fo(k,2m+2). A stage with d=2 inputs and d=2 outputs is typically the "last stage" or "root stage" of ring.

Figure 2E:
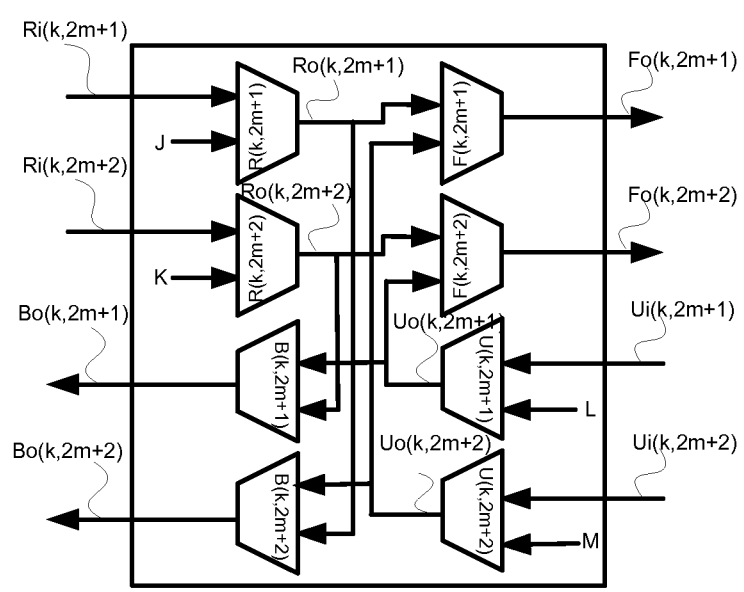
FIG. 2E is a diagram 200E, in an embodiment of, a stage in a ring of multi-stage hierarchical network corresponding to one block.

However the stage "m+1" of ring "k" with "m+1" stages of the partial multi-stage hierarchical network $V_{Comb}$ ($N_1$, $N_2$, d, s), in another embodiment, may have 8 inputs and 2 outputs as shown in diagram 200E in FIG. 2E. FIG. 2E illustrates a stage (ring "k", stage "m") 200E consists of 8 inputs namely Ri(k, 2m+1), Ri(k,2m+2), Ui(k,2m+1), Ui(k,2m+2), J, K, L, and M; and 4 outputs Bo(k,2m+1), Bo(k,2m+2), Fo(k,2m+1), and Fo(k,2m+2). The stage (ring "k", stage "m") also consists of eight 2:1 Muxes namely R(k,2m+1), R(k,2m+2), F(k,2m+1), F(k,2m+2), U(k,2m+1), U(k,2m+2), B(k,2m+1), and B(k, 2m+2). The 2:1 Mux R(k,2m+1) has two inputs namely Ri(k, 2m+1) and J, and has one output Ro(k,2m+1). The 2:1 Mux R(k,2m+2) has two inputs namely Ri(k,2m+2) and K, and has one output Ro(k,2m+2). The 2:1 Mux F(k,2m+1) has two inputs namely Ro(k,2m+1) and Uo(k,2m+2), and has one output Fo(k,2m+1). The 2:1 Mux F(k,2m+2) has two inputs namely Ro(k,2m+2) and Uo(k,2m+1), and has one output Fo(k,2m+2).

The 2:1 Mux U(k,2m+1) has two inputs namely Ui(k,2m+ 1) and L, and has one output Uo(k,2m+1). The 2:1 Mux U(k,2m+2) has two inputs namely Ui(k,2m+2) and M, and has one output Uo(k,2m+2). The 2:1 Mux B(k,2m+1) has two inputs namely Uo(k,2m+1) and Ro(k,2m+2), and has one output Bo(k,2m+1). The 2:1 Mux B(k,2m+2) has two inputs namely Uo(k,2m+2) and Ro(k,2m+1), and has one output Bo(k,2m+2). In different embodiments the inputs J, K, L, and M are connected from any of the outputs of any other stages of any ring of any block of the multi-stage hierarchical network $V_{Comb}$ ($N_1$, $N_2$, d, s).

The number of stages in a ring of any block may not be equal to the number of stages in any other ring of the same of block or any ring of any other block of the multi-stage hierarchical network $V_{Comb}$ ($N_1$, $N_2$, d, s). For example the number of stages in ring 1 of the partial multi-stage hierarchical network $V_{Comb}$ ($N_1$, $N_2$, d, s) 100A or of the partial multi-stage hierarchical network $V_{Comb}$ ($N_1$, $N_2$, d, s) 100B is denoted by "m" and the number of stages in ring 2 of the partial multi-stage hierarchical network is denoted by "n", and so "m" may or may not be equal to "n". Similarly the number of stages in ring 2 corresponding to block (3,3) of 2D-grid 800 may not be equal to the number of stages in ring 2 corresponding to block (6,9) of 2D-grid 800.

Even though the number of inlet links to the computational block is four and the number of outlet links to the computational block is two in the partial multi-stage hierarchical network $V_{Comb}$ ($N_1$, $N_2$, d, s) 100A and the number of inlet links to the computational block is eight and the number of outlet links to the computational block is four in the partial multi-stage hierarchical network $V_{Comb}$ ($N_1$, $N_2$, d, s) 100B, in other embodiments the number of inlet links to the computational block may be any arbitrary number and the number of outlet links to the computational block may also be another arbitrary number. However the number of rings corresponding to the partial multi-stage hierarchical network $V_{Comb}$ ($N_1$, $N_2$, d, s) of a block is generally equal to the number of inlet links to the computational block divided by d=2 if the inputs and outputs are connected either only from left-hand side or only from right-hand side, if the number of inlet links to the computational block is greater than or equal to the number of outlet links to the computational block. In such a case one or more of the outlet links to the computational block are connected to more than one inlet links of the partial multi-stage hierarchical network $V_{Comb}$ ($N_1$, $N_2$, d, s) corresponding to a block. Similarly the number of rings corresponding to the partial multi-stage hierarchical network $V_{Comb}$ ($N_1$, $N_2$, d, s) of a block is generally equal to the number of inlet links to the computational block divided by 2*d=4 if the inputs and outputs are connected from both left-hand side and from right-hand side, if the number of inlet links to the computational block is greater than or equal to the number of outlet links to the computational block.

Otherwise the number of rings corresponding to the partial multi-stage hierarchical network $V_{Comb}$ ($N_1$, $N_2$, d, s) of a block is generally equal to the number of outlet links to the computational block divided by d=2 if the inputs and outputs are connected either only from left-hand side or only from right-hand side, if the number of outlet links to the computational block is greater than the number of inlet links to the computational block. In such a case one or more of the outlet links of the partial multi-stage hierarchical network $V_{Comb}$ ($N_1$, $N_2$, d, s) corresponding to a block are connected to more than one inlet link of the computational block. Similarly the number of rings corresponding to the partial multi-stage hierarchical network $V_{Comb}$ ($N_1$, $N_2$, d, s) of a block is generally equal to the number of outlet links to the computational block divided by 2*d=4 if the inputs and outputs are connected from both left-hand side and from right-hand side, if the number of outlet links to the computational block is greater than or equal to the number of inlet links to the computational block.

In another embodiment, the number of inlet links to the computational block corresponding to a block of 2D-grid of blocks may or may not be equal to the number of inlet links to the computational block corresponding to another block. Similarly the number of outlet links to the computational block corresponding to a block of 2D-grid of blocks may or may not be equal to the number of outlet links to the computational block corresponding to another block. Hence the total number of rings of the partial multi-stage hierarchical network $V_{Comb}$ ($N_1$, $N_2$, d, s) corresponding to a block of 2D-grid of blocks may or may not be equal to the partial multi-stage hierarchical network $V_{Comb}$ ($N_1$, $N_2$, d, s) corresponding to another block. For example the total number of rings corresponding to block (4,5) of 2D-grid 800 may be two and the total number of rings in block (5,4) of 2D-grid 800 may be three.

A multi-stage hierarchical network can be represented with the notation $V_{Comb}$ ($N_1$, $N_2$, d, s), where $N_1$ represents the total number of inlet links of the complete multi-stage hierarchical network and $N_2$ represents the total number of outlet links of the complete multi-stage hierarchical network, d represents the number of inlet links of any ring in any block of the complete multi-stage hierarchical network either from only left-hand side or only right-hand side, or equivalently the number of outlet links of any ring in any block of the complete multi-stage hierarchical network either from only left-hand side or only right-hand side, (in general d≥2), and when the inputs and outputs are connected from left-hand side, s is the ratio of number of outgoing links from each stage 0 of any ring in any block to the number of inlet links of any ring in any block of the complete multi-stage hierarchical network (for example the complete multi-stage hierarchical network corresponding to $V_{Comb}$ ($N_1$, $N_2$, d, s) 100A in FIG. 1A, $N_1$=200, $N_2$=400, d=2, s=1). Also a multi-stage hierarchical network where $N_1$=$N_2$=N is represented as $V_{Comb}$ (N, d, s).

Figure 3A:
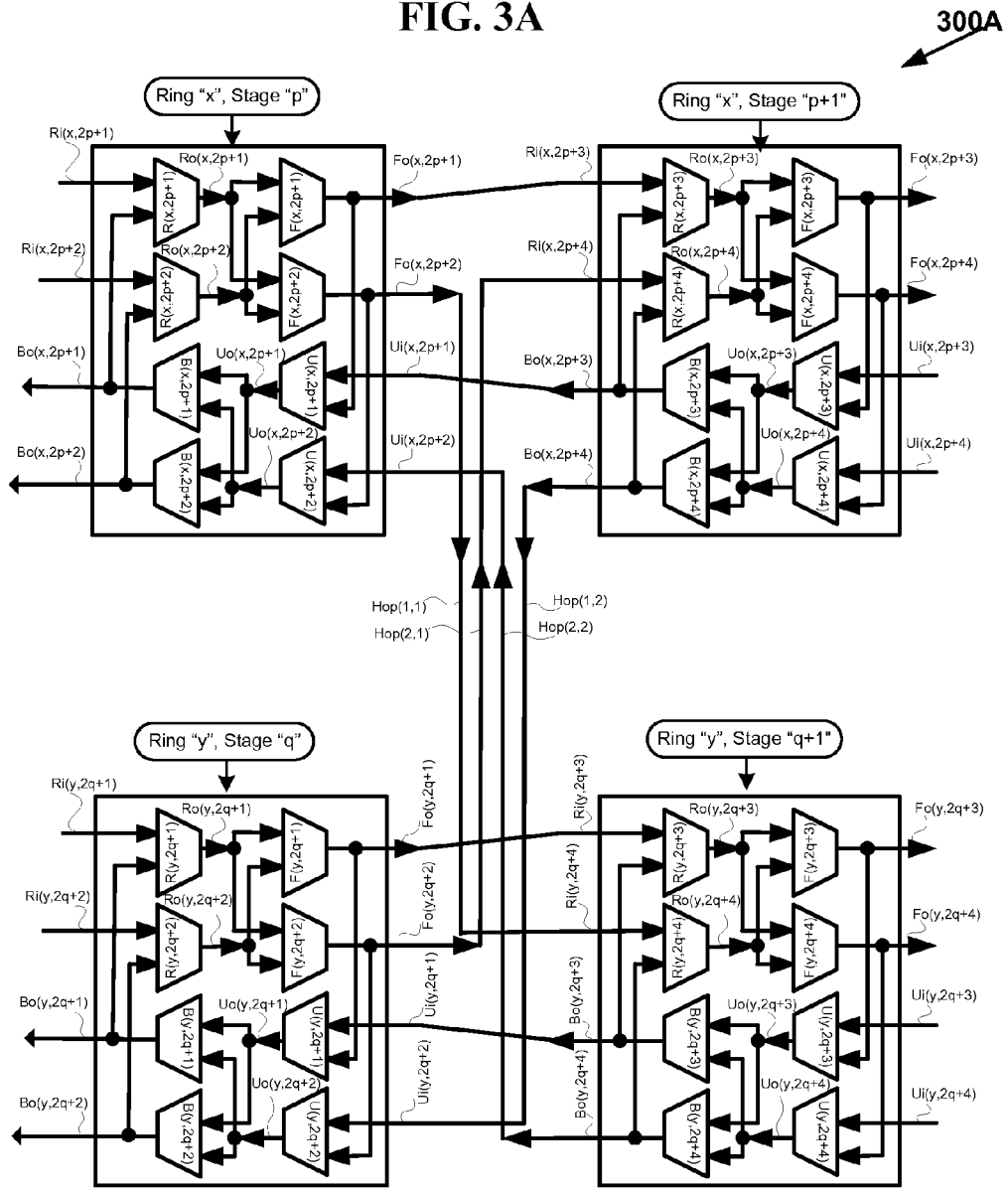
FIG. 3A is a diagram 300A, in an embodiment of, all the connections between two successive stages of two different rings in the same block or in two different blocks of a multi-stage hierarchical network.
Figure 3B:
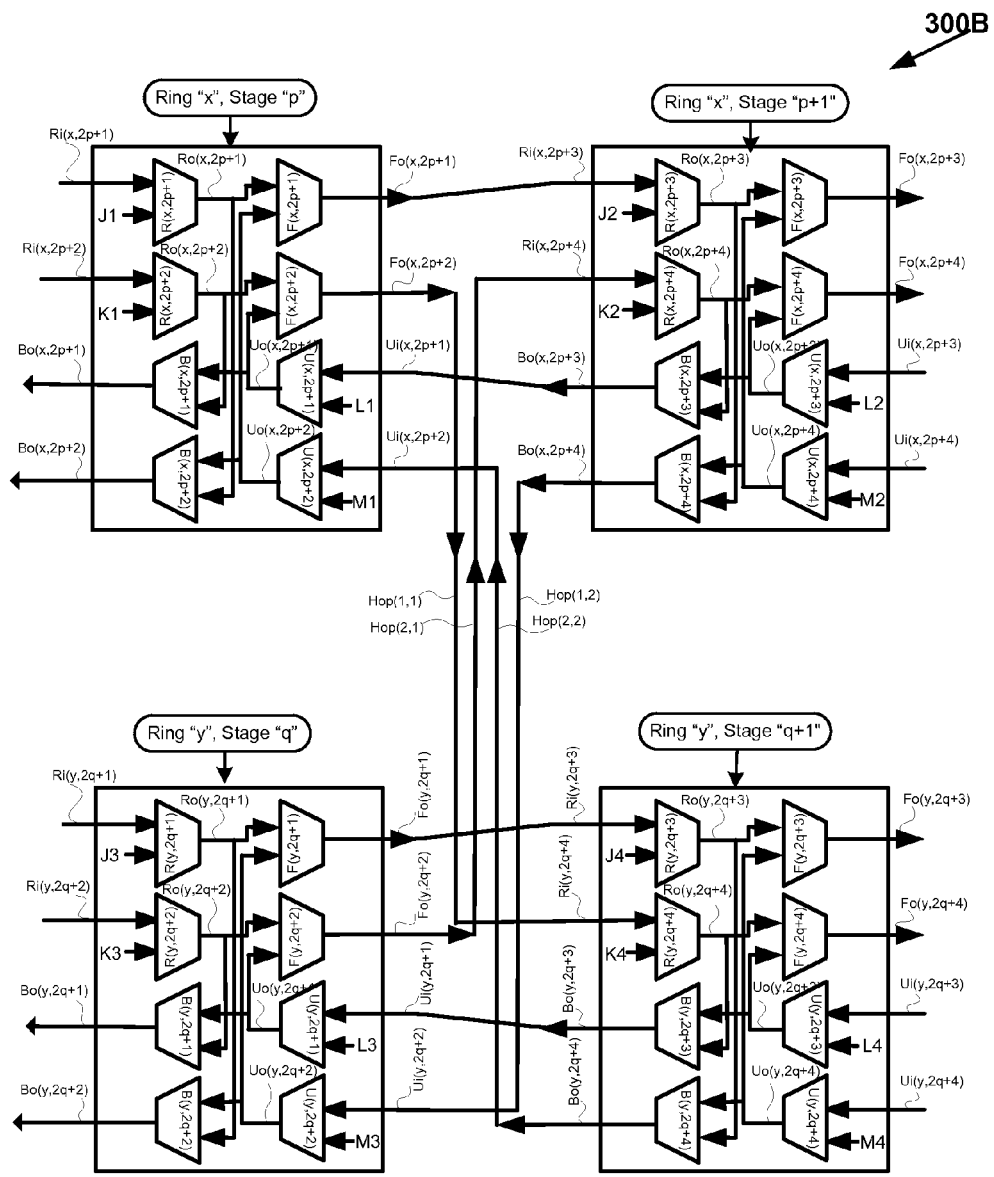
FIG. 3B is a diagram 300B, in an embodiment of, all the connections between two successive stages of two different rings in the same block or in two different blocks of a multi-stage hierarchical network.
Figure 4:
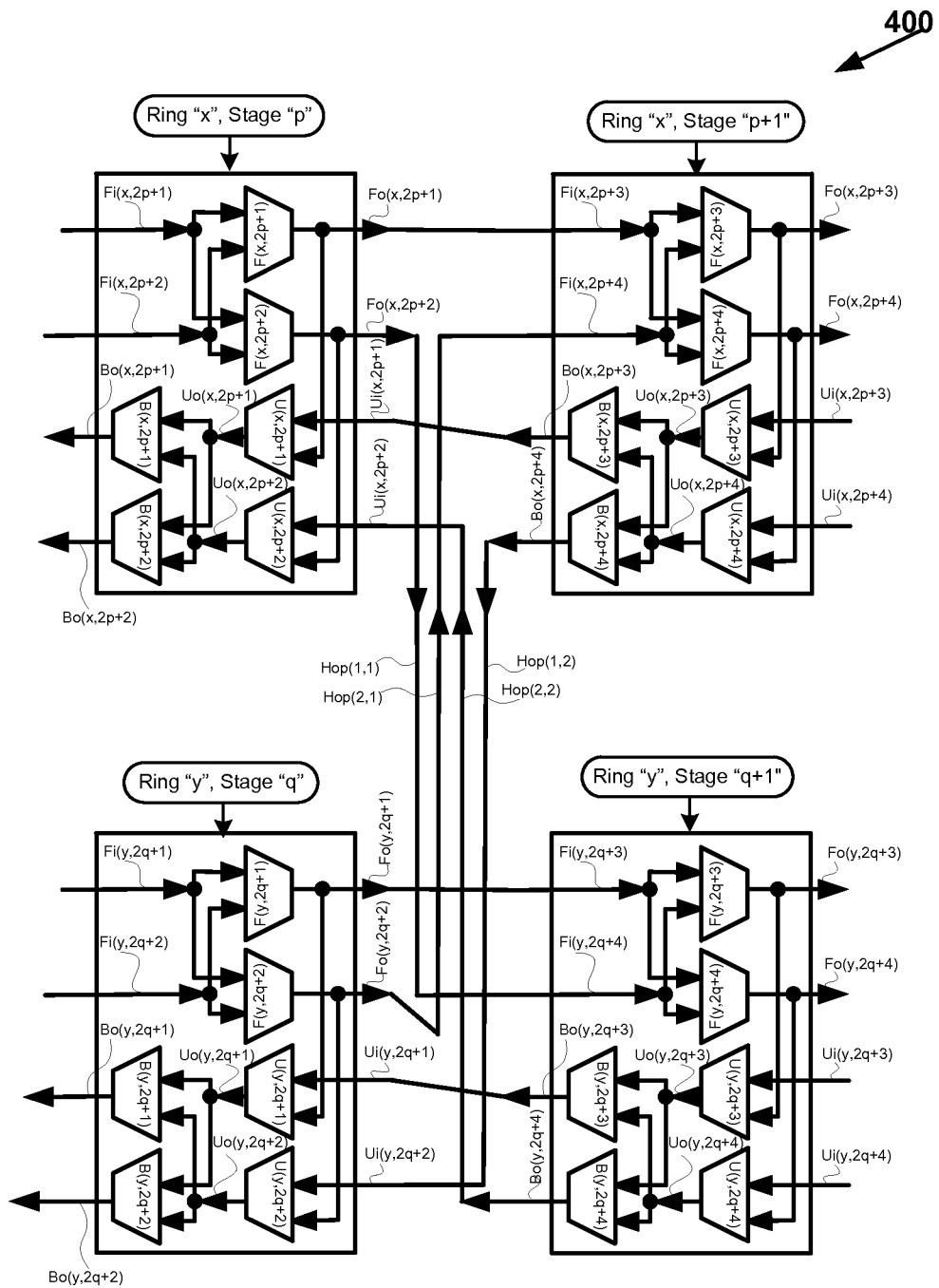
FIG. 4 is a diagram 400, in an embodiment of, all the connections between two successive stages of two different rings in the same block or in two different blocks of a multi-stage hierarchical network.
Figure 5:
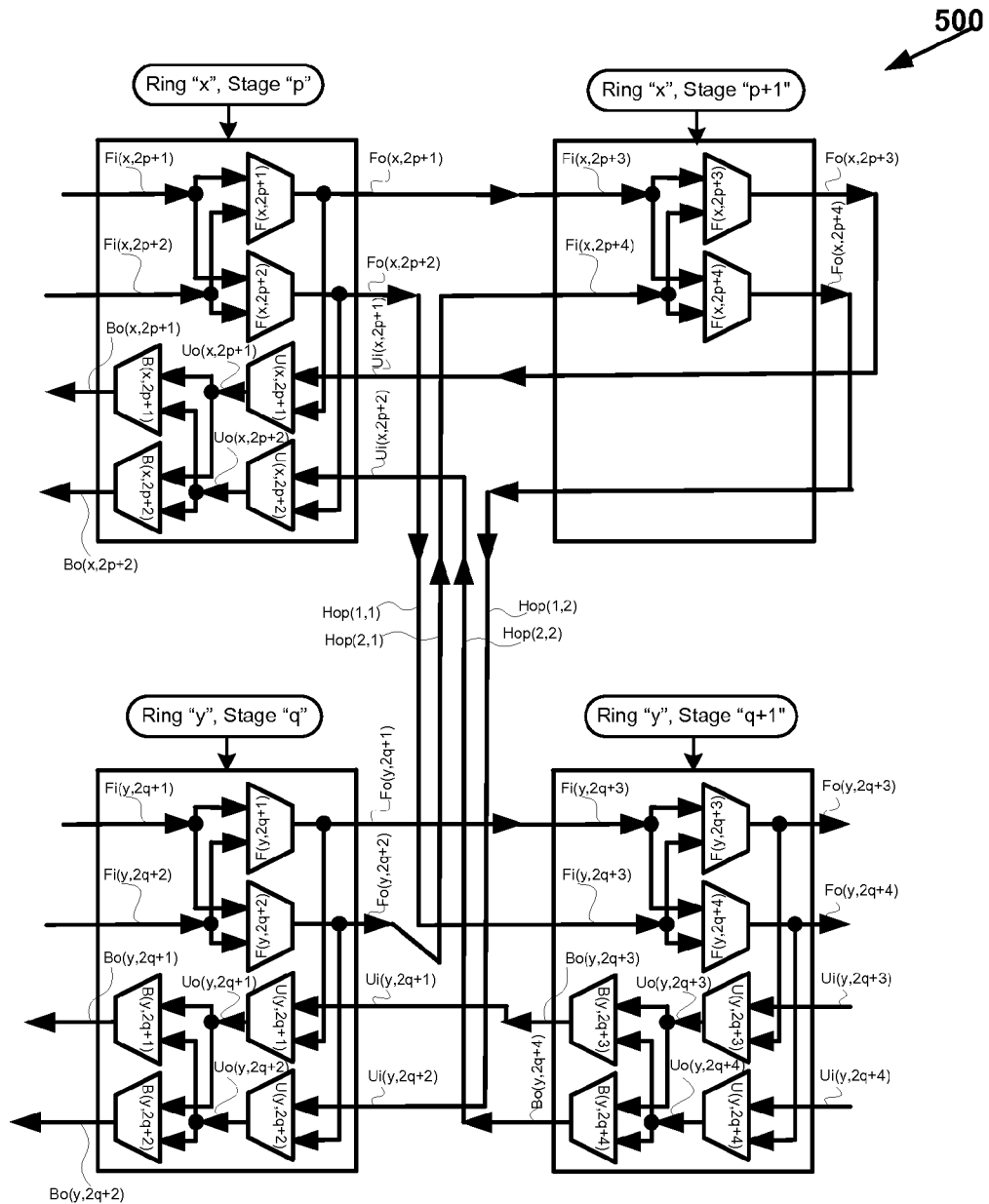
FIG. 5 is a diagram 500, in an embodiment of, all the connections between two successive stages of two different rings in the same block or in two different blocks of a multi-stage hierarchical network.
Figure 6:
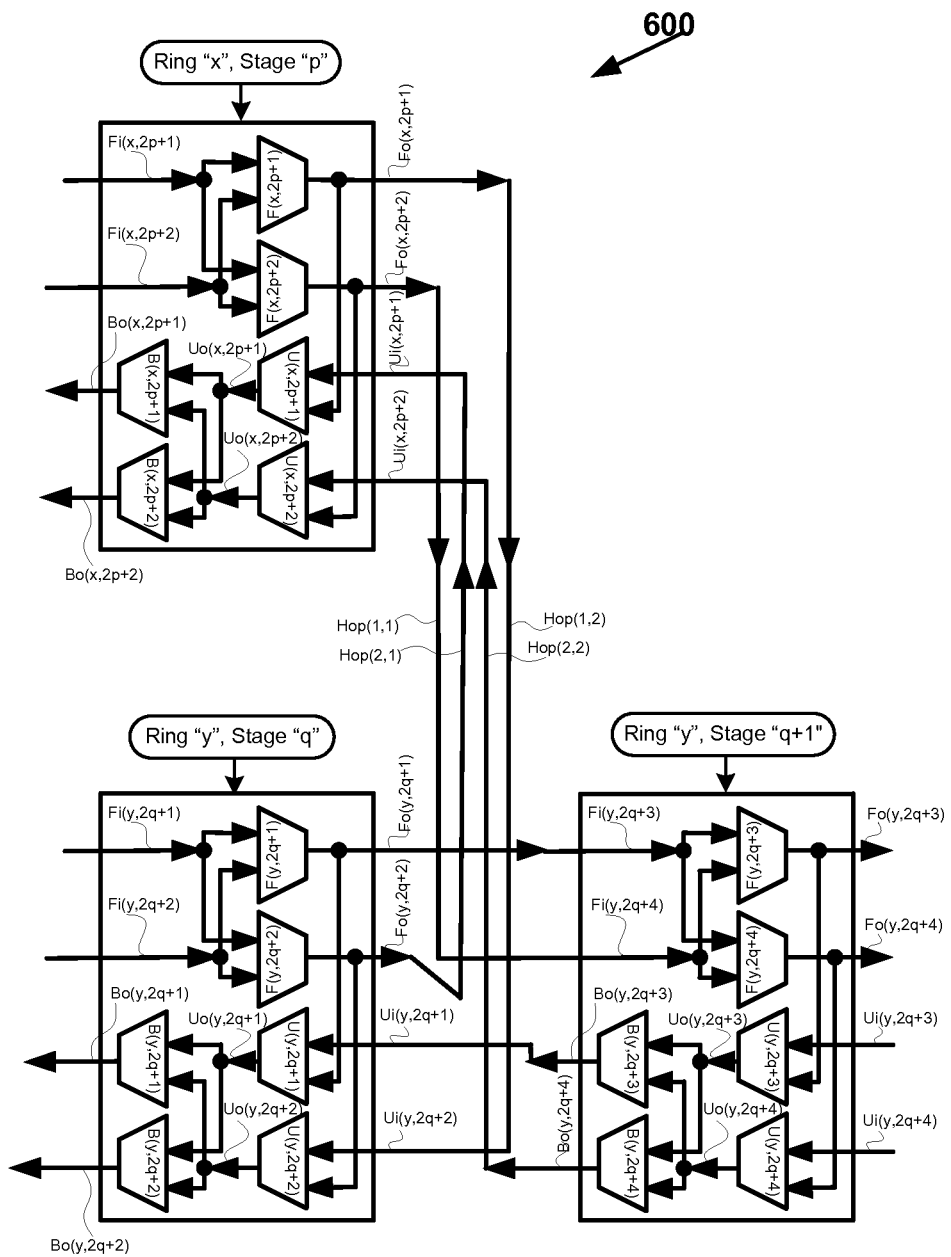
FIG. 6 is a diagram 600, in an embodiment of, all the connections between two successive stages of two different rings in the same block or in two different blocks of a multi-stage hierarchical network.

The diagram 300A of FIG. 3A, 300B of FIG. 3B, 400 of FIG. 4, 500 of FIG. 5, and 600 of FIG. 6 are different embodiments of all the connections between two arbitrary successive stages in two different rings of the same block or two different rings of different blocks of 2D-grid 800. Referring to diagram 300A in FIG. 3A illustrates all the connections between two arbitrary successive stages of a ring namely the stages (ring "x", stage "p") and (ring "x", stage "p+1") and two other arbitrary successive stages of any other ring namely the stages (ring "y", stage "q") and (ring "y", stage "q+1"), of the complete multi-stage hierarchical network $V_{Comb}$ ($N_1$, $N_2$, d, s).

The stage (ring "x", stage "p") consists of 4 inputs namely Ri(x,2p+1), Ri(x,2p+2), Ui(x,2p+1), and Ui(x,2p+2); and 4 outputs Bo(x,2p+1), Bo(x,2p+2), Fo(x,2p+1), and Fo(x,2p+2). The stage (ring "x", stage "p') also consists of eight 2:1 Muxes namely R(x,2p+1), R(x,2p+2), F(x,2p+1), F(x,2p+2), U(x,2p+1), U(x,2p+2), B(x,2p+1), and B(x,2p+2). The 2:1 Mux R(x,2p+1) has two inputs namely Ri(x,2p+1) and Bo(x,2p+1) and has one output Ro(x,2p+1). The 2:1 Mux R(x,2p+2) has two inputs namely Ri(x,2p+2) and Bo(x,2p+2) and has one output Ro(x,2p+2). The 2:1 Mux F(x,2p+1) has two inputs namely Ro(x,2p+1) and Ro(x,2p+2) and has one output Fo(x,2p+1). The 2:1 Mux F(x,2p+2) has two inputs namely Ro(x,2p+1) and Ro(x,2p+2) and has one output Fo(x,2p+2).

The 2:1 Mux U(x,2p+1) has two inputs namely Ui(x,2p+1) and Fo(x,2p+1) and has one output Uo(x,2p+1). The 2:1 Mux U(x,2p+2) has two inputs namely Ui(x,2p+2) and Fo(x,2p+2) and has one output Uo(x,2p+2). The 2:1 Mux B(x,2p+1) has two inputs namely Uo(x,2p+1) and Uo(x,2p+2) and has one output Bo(x,2p+1). The 2:1 Mux B(x,2p+2) has two inputs namely Uo(x,2p+1) and Uo(x,2p+2) and has one output Bo(x,2p+2).

The stage (ring "x", stage "p+1") consists of 4 inputs namely Ri(x,2p+3), Ri(x,2p+4), Ui(x,2p+3), and Ui(x,2p+4); and 4 outputs Bo(x,2p+3), Bo(x,2p+4), Fo(x,2p+3), and Fo(x,2p+4). The stage (ring "x", stage "p+1") also consists of eight 2:1 Muxes namely R(x,2p+3), R(x,2p+4), F(x,2p+3), F(x,2p+4), U(x,2p+3), U(x,2p+4), B(x,2p+3), and B(x,2p+4). The 2:1 Mux R(x,2p+3) has two inputs namely Ri(x,2p+3) and Bo(x,2p+3) and has one output Ro(x,2p+3). The 2:1 Mux R(x,2p+4) has two inputs namely Ri(x,2p+4) and Bo(x,2p+4) and has one output Ro(x,2p+4). The 2:1 Mux F(x,2p+3) has two inputs namely Ro(x,2p+3) and Ro(x,2p+4) and has one output Fo(x,2p+3). The 2:1 Mux F(x,2p+4) has two inputs namely Ro(x,2p+3) and Ro(x,2p+4) and has one output Fo(x,2p+4).

The 2:1 Mux U(x,2p+3) has two inputs namely Ui(x,2p+3) and Fo(x,2p+3) and has one output Uo(x,2p+3). The 2:1 Mux U(x,2p+4) has two inputs namely Ui(x,2p+4) and Fo(x,2p+4) and has one output Uo(x,2p+4). The 2:1 Mux B(x,2p+3) has two inputs namely Uo(x,2p+3) and Uo(x,2p+4) and has one output Bo(x,2p+3). The 2:1 Mux B(x,2p+4) has two inputs namely Uo(x,2p+3) and Uo(x,2p+4) and has one output Bo(x,2p+4).

The output Fo(x,2p+1) of the stage (ring "x", stage "p") is connected to the input Ri(x,2p+3) of the stage (ring "x", stage "p+1"). And the output Bo(x,2p+3) of the stage (ring "x", stage "p+1") is connected to the input Ui(x,2p+1) of the stage (ring "x", stage "p").

The stage (ring "y", stage "q") consists of 4 inputs namely Ri(y,2q+1), Ri(y,2q+2), Ui(y,2q+1), and Ui(y,2q+2); and 4 outputs Bo(y,2q+1), Bo(y,2q+2), Fo(y,2q+1), and Fo(y,2q+2). The stage (ring "y", stage "q') also consists of eight 2:1 Muxes namely R(y,2q+1), R(y,2q+2), F(y,2q+1), F(y,2q+2), U(y,2q+1), U(y,2q+2), B(y,2q+1), and B(y,2q+2). The 2:1 Mux R(y,2q+1) has two inputs namely Ri(y,2q+1) and Bo(y,2q+1) and has one output Ro(y,2q+1). The 2:1 Mux R(y,2q+2) has two inputs namely Ri(y,2q+2) and Bo(y,2q+2) and has one output Ro(y,2q+2). The 2:1 Mux F(y,2q+1) has two inputs namely Ro(y,2q+1) and Ro(y,2q+2) and has one output Fo(y,2q+1). The 2:1 Mux F(y,2q+2) has two inputs namely Ro(y,2q+1) and Ro(y,2q+2) and has one output Fo(y,2q+2).

The 2:1 Mux U(y,2q+1) has two inputs namely Ui(y,2q+1) and Fo(y,2q+1) and has one output Uo(y,2q+1). The 2:1 Mux U(y,2q+2) has two inputs namely Ui(y,2q+2) and Fo(y,2q+2) and has one output Uo(y,2q+2). The 2:1 Mux B(y,2q+1) has two inputs namely Uo(y,2q+1) and Uo(y,2q+2) and has one output Bo(y,2q+1). The 2:1 Mux B(y,2q+2) has two inputs namely Uo(y,2q+1) and Uo(y,2q+2) and has one output Bo(y,2q+2).

The stage (ring "y", stage "q+1") consists of 4 inputs namely Ri(y,2q+3), Ri(y,2q+4), Ui(y,2q+3), and Ui(y,2q+4); and 4 outputs Bo(y,2q+3), Bo(y,2q+4), Fo(y,2q+3), and Fo(y,2q+4). The stage (ring "y", stage "q+1") also consists of eight 2:1 Muxes namely R(y,2q+3), R(y,2q+4), F(y,2q+3), F(y,2q+4), U(y,2q+3), U(y,2q+4), B(y,2q+3), and B(y,2q+4). The 2:1 Mux R(y,2q+3) has two inputs namely Ri(y,2q+3) and Bo(y,2q+3) and has one output Ro(y,2q+3). The 2:1 Mux R(y,2q+4) has two inputs namely Ri(y,2q+4) and Bo(y,2q+4) and has one output Ro(y,2q+4). The 2:1 Mux F(y,2q+3) has two inputs namely Ro(y,2q+3) and Ro(y,2q+4) and has one output Fo(y,2q+3). The 2:1 Mux F(y,2q+4) has two inputs namely Ro(y,2q+3) and Ro(y,2q+4) and has one output Fo(y,2q+4).

The 2:1 Mux U(y,2q+3) has two inputs namely Ui(y,2q+3) and Fo(y,2q+3) and has one output Uo(y,2q+3). The 2:1 Mux U(y,2q+4) has two inputs namely Ui(y,2q+4) and Fo(y,2q+4) and has one output Uo(y,2q+4). The 2:1 Mux B(y,2q+3) has two inputs namely Uo(y,2q+3) and Uo(y,2q+4) and has one output Bo(y,2q+3). The 2:1 Mux B(y,2q+4) has two inputs namely Uo(y,2q+3) and Uo(y,2q+4) and has one output Bo(y,2q+4).

The output Fo(y,2q+1) of the stage (ring "y", stage "q") is connected to the input Ri(y,2q+3) of the stage (ring "y", stage "q+1"). And the output Bo(y,2q+3) of the stage (ring "y", stage "q+1") is connected to the input Ui(y,2q+1) of the stage (ring "y", stage "q").

The output Fo(x,2p+2) of the stage (ring "x", stage "p") is connected via the wire Hop(1,1) to the input Ri(y,2q+4) of the stage (ring "y", stage "q+1"). The output Bo(x,2p+4) of the stage (ring "x", stage "p+1") is connected via the wire Hop(1,2) to the input Ui(y,2q+2) of the stage (ring "y", stage "q").

The output Fo(y,2q+2) of the stage (ring "y", stage "q") is connected via the wire Hop(2,1) to the input Ri(x,2p+4) of the stage (ring "x", stage "p+1"). The output Bo(y,2q+4) of the stage (ring "y", stage "q+1") is connected via the wire Hop(2,2) to the input Ui(x,2p+2) of the stage (ring "x", stage "p").

Ring "x" and ring "y" may or may not belong to the same block of the complete multi-stage hierarchical network $V_{Comb}$ ($N_1$, $N_2$, d, s). If ring "x" and ring "y" belong to the same block of the complete multi-stage hierarchical network $V_{Comb}$ ($N_1$, $N_2$, d, s), then the wires Hop(1,1), Hop(1,2), Hop(2,1), and Hop(2,2) are hereinafter called "internal hop wires". For example if "x=2" and "y=3" and both the ring 2 and ring 3 belong to the same block (9,9) of 2D-grid 800, then the wires Hop(1,1), Hop(1,2), Hop(2,1), and Hop(2,2) are "internal hop wires".

If ring "x" and ring "y" belong to the different blocks of the complete multi-stage hierarchical network $V_{Comb}$ ($N_1$, $N_2$, d, s), then the wires Hop(1,1), Hop(1,2), Hop(2,1), and Hop(2,2) are hereinafter called "external hop wires". The external hop wires Hop(1,1), Hop(1,2), Hop(2,1), and Hop(2,2) may be horizontal wires or vertical wires. The length of the external hop wires is manhattan distance between the corresponding blocks, hereinafter "hop length". For example if ring "x" belongs to block (1,1) and ring "y" belongs to block (1,6) of 2D-grid 800 then the external hop wires are hereinafter called "horizontal external hop wires". And the hop length of the horizontal hop wires Hop(1,1), Hop(1,2), Hop(2,1), and Hop(2,2) is given by 6−1=5. Similarly if ring "x" and ring "y" belong to two blocks in the same horizontal row of 2D-grid 800, then the wires Hop(1,1), Hop(1,2), Hop(2,1), and Hop(2,2) are horizontal external hop wires.

For example if ring "x" belongs to block (1,1) and ring "y" belongs to block (9,1) of 2D-grid 800 then the external hop wires are hereinafter called "vertical external hop wires". And the hop length of the vertical hop wires Hop(1,1), Hop(1,2), Hop(2,1), and Hop(2,2) is given by 9−1=8. Similarly if ring "x" and ring "y" belong to two blocks in the same vertical column of 2D-grid 800, then the wires Hop(1,1), Hop(1,2), Hop(2,1), and Hop(2,2) are vertical external hop wires. External hop wires are typically horizontal or vertical according to the current invention.

Referring to diagram 300B in FIG. 3B illustrates all the connections between two arbitrary successive stages of a ring namely the stages (ring "x", stage "p") and (ring "x", stage "p+1") and two other arbitrary successive stages of any other ring namely the stages (ring "y", stage "q") and (ring "y", stage "q+1"), of the complete multi-stage hierarchical network $V_{Comb}$ ($N_1$, $N_2$, d, s).

The stage (ring "x", stage "p") consists of 8 inputs namely Ri(x,2p+1), Ri(x,2p+2), Ui(x,2p+1), Ui(x,2p+2), J1, K1, L1, and M1; and 4 outputs Bo(x,2p+1), Bo(x,2p+2), Fo(x,2p+1), and Fo(x,2p+2). The stage (ring "x", stage "p'") also consists of eight 2:1 Muxes namely R(x,2p+1), R(x,2p+2), F(x,2p+1), F(x,2p+2), U(x,2p+1), U(x,2p+2), B(x,2p+1), and B(x,2p+2). The 2:1 Mux R(x,2p+1) has two inputs namely Ri(x,2p+1) and J1, and has one output Ro(x,2p+1). The 2:1 Mux R(x,2p+2) has two inputs namely Ri(x,2p+2) and K1, and has one output Ro(x,2p+2). The 2:1 Mux F(x,2p+1) has two inputs namely Ro(x,2p+1) and Uo(x,2p+2), and has one output Fo(x,2p+1). The 2:1 Mux F(x,2p+2) has two inputs namely Ro(x,2p+2) and Uo(x,2p+1), and has one output Fo(x,2p+2).

The 2:1 Mux U(x,2p+1) has two inputs namely Ui(x,2p+1) and L1, and has one output Uo(x,2p+1). The 2:1 Mux U(x,2p+2) has two inputs namely Ui(x,2p+2) and M1, and has one output Uo(x,2p+2). The 2:1 Mux B(x,2p+1) has two inputs namely Uo(x,2p+1) and Ro(x,2p+2), and has one output Bo(x,2p+1). The 2:1 Mux B(x,2p+2) has two inputs namely Uo(x,2p+2) and Ro(x,2p+1), and has one output Bo(x,2p+2).

The stage (ring "x", stage "p+1") consists of 8 inputs namely Ri(x,2p+3), Ri(x,2p+4), Ui(x,2p+3), Ui(x,2p+4), J2, K2, L2, and M2; and 4 outputs Bo(x,2p+3), Bo(x,2p+4), Fo(x,2p+3), and Fo(x,2p+4). The stage (ring "x", stage "p+1") also consists of eight 2:1 Muxes namely R(x,2p+3), R(x,2p+4), F(x,2p+3), F(x,2p+4), U(x,2p+3), U(x,2p+4), B(x,2p+3), and B(x,2p+4). The 2:1 Mux R(x,2p+3) has two inputs namely Ri(x,2p+3) and J2, and has one output Ro(x,2p+3). The 2:1 Mux R(x,2p+4) has two inputs namely Ri(x,2p+4) and K2, and has one output Ro(x,2p+4). The 2:1 Mux F(x,2p+3) has two inputs namely Ro(x,2p+3) and Uo(x,2p+4), and has one output Fo(x,2p+3). The 2:1 Mux F(x,2p+4) has two inputs namely Ro(x,2p+4) and Uo(x,2p+3), and has one output Fo(x,2p+4).

The 2:1 Mux U(x,2p+3) has two inputs namely Ui(x,2p+3) and L2, and has one output Uo(x,2p+3). The 2:1 Mux U(x,2p+4) has two inputs namely Ui(x,2p+4) and M2, and has one output Uo(x,2p+4). The 2:1 Mux B(x,2p+3) has two inputs namely Uo(x,2p+3) and Ro(x,2p+4), and has one output Bo(x,2p+3). The 2:1 Mux B(x,2p+4) has two inputs namely Uo(x,2p+4) and Ro(x,2p+3), and has one output Bo(x,2p+4).

The output Fo(x,2p+1) of the stage (ring "x", stage "p") is connected to the input Ri(x,2p+3) of the stage (ring "x", stage "p+1"). And the output Bo(x,2p+3) of the stage (ring "x", stage "p+1") is connected to the input Ui(x,2p+1) of the stage (ring "x", stage "p").

The stage (ring "y", stage "q") consists of 8 inputs namely Ri(y,2q+1), Ri(y,2q+2), Ui(y,2q+1), Ui(y,2q+2), J3, K3, L3, and M3; and 4 outputs Bo(y,2q+1), Bo(y,2q+2), Fo(y,2q+1), and Fo(y,2q+2). The stage (ring "y", stage "q') also consists of eight 2:1 Muxes namely R(y,2q+1), R(y,2q+2), F(y,2q+1), F(y,2q+2), U(y,2q+1), U(y,2q+2), B(y,2q+1), and B(y,2q+2). The 2:1 Mux R(y,2q+1) has two inputs namely Ri(y,2q+1) and J3, and has one output Ro(y,2q+1). The 2:1 Mux R(y,2q+2) has two inputs namely Ri(y,2q+2) and K3, and has one output Ro(y,2q+2). The 2:1 Mux F(y,2q+1) has two inputs namely Ro(y,2q+1) and Uo(y,2q+2), and has one output Fo(y,2q+1). The 2:1 Mux F(y,2q+2) has two inputs namely Ro(y,2q+2) and Uo(y,2q+1) and has one output Fo(y,2q+2).

The 2:1 Mux U(y,2q+1) has two inputs namely Ui(y,2q+1) and L3, and has one output Uo(y,2q+1). The 2:1 Mux U(y,2q+2) has two inputs namely Ui(y,2q+2) and M3, and has one output Uo(y,2q+2). The 2:1 Mux B(y,2q+1) has two inputs namely Uo(y,2q+1) and Ro(y,2q+2), and has one output Bo(y,2q+1). The 2:1 Mux B(y,2q+2) has two inputs namely Uo(y,2q+2) and Ro(y,2q+1), and has one output Bo(y,2q+2).

The stage (ring "y", stage "q+1") consists of 8 inputs namely Ri(y,2q+3), Ri(y,2q+4), Ui(y,2q+3), Ui(y,2q+4), J4, K4, L4, and M4; and 4 outputs Bo(y,2q+3), Bo(y,2q+4), Fo(y,2q+3), and Fo(y,2q+4). The stage (ring "y", stage "q+1") also consists of eight 2:1 Muxes namely R(y,2q+3), R(y,2q+4), F(y,2q+3), F(y,2q+4), U(y,2q+3), U(y,2q+4), B(y,2q+3), and B(y,2q+4). The 2:1 Mux R(y,2q+3) has two inputs namely Ri(y,2q+3) and J4, and has one output Ro(y,2q+3). The 2:1 Mux R(y,2q+4) has two inputs namely Ri(y,2q+4) and K4, and has one output Ro(y,2q+4). The 2:1 Mux F(y,2q+3) has two inputs namely Ro(y,2q+3) and Uo(y,2q+4), and has one output Fo(y,2q+3). The 2:1 Mux F(y,2q+4) has two inputs namely Ro(y,2q+4) and Uo(y,2q+3), and has one output Fo(y,2q+4).

The 2:1 Mux U(y,2q+3) has two inputs namely Ui(y,2q+3) and L4, and has one output Uo(y,2q+3). The 2:1 Mux U(y,2q+4) has two inputs namely Ui(y,2q+4) and M4, and has one output Uo(y,2q+4). The 2:1 Mux B(y,2q+3) has two inputs namely Uo(y,2q+3) and Ro(y,2q+4), and has one output Bo(y,2q+3). The 2:1 Mux B(y,2q+4) has two inputs namely Uo(y,2q+4) and Ro(y,2q+3), and has one output Bo(y,2q+4).

The output Fo(y,2q+1) of the stage (ring "y", stage "q") is connected to the input Ri(y,2q+3) of the stage (ring "y", stage "q+1"). And the output Bo(y,2q+3) of the stage (ring "y", stage "q+1") is connected to the input Ui(y,2q+1) of the stage (ring "y", stage "q").

The output Fo(x,2p+2) of the stage (ring "x", stage "p") is connected via the wire Hop(1,1) to the input Ri(y,2q+4) of the stage (ring "y", stage "q+1"). The output Bo(x,2p+4) of the stage (ring "x", stage "p+1") is connected via the wire Hop(1,2) to the input Ui(y,2q+2) of the stage (ring "y", stage "q").

The output Fo(y,2q+2) of the stage (ring "y", stage "q") is connected via the wire Hop(2,1) to the input Ri(x,2p+4) of the stage (ring "x", stage "p+1"). The output Bo(y,2q+4) of the stage (ring "y", stage "q+1") is connected via the wire Hop(2,2) to the input Ui(x,2p+2) of the stage (ring "x", stage "p").

In various embodiments, the inputs J1, K1, L1, and M1 are connected from any of the outputs of any other stages of any ring of any block of the multi-stage hierarchical network $V_{Comb}$ ($N_1$, $N_2$, d, s). Similarly the inputs J2, K2, L2, and M2 are connected from any of the outputs of any other stages of any ring of any block of the multi-stage hierarchical network $V_{Comb}$ ($N_1$, $N_2$, d, s). Similarly the inputs J3, K3, L3, and M3 are connected from any of the outputs of any other stages of any ring of any block of the multi-stage hierarchical network $V_{Comb}$ ($N_1$, $N_2$, d, s). Finally the inputs J4, K4, L4, and M4 are connected from any of the outputs of any other stages of any ring of any block of the multi-stage hierarchical network $V_{Comb}$ ($N_1$, $N_2$, d, s).

Referring to diagram 400 in FIG. 4, illustrates all the connections between two arbitrary successive stages of a ring namely the stages (ring "x", stage "p") and (ring "x", stage "p+1") and two other arbitrary successive stages of any other ring namely the stages (ring "y", stage "q") and (ring "y", stage "q+1"), of the complete multi-stage hierarchical network $V_{Comb}$ ($N_1$, $N_2$, d, s).

The stage (ring "x", stage "p") consists of 4 inputs namely Fi(x,2p+1), Fi(x,2p+2), Ui(x,2p+1), and Ui(x,2p+2); and 4 outputs Bo(x,2p+1), Bo(x,2p+2), Fo(x,2p+1), and Fo(x,2p+2). The stage (ring "x", stage "p') also consists of six 2:1 Muxes namely F(x,2p+1), F(x,2p+2), U(x,2p+1), U(x,2p+2), B(x,2p+1), and B(x,2p+2). The 2:1 Mux F(x,2p+1) has two inputs namely Fi(x,2p+1) and Fi(x,2p+2) and has one output Fo(x,2p+1). The 2:1 Mux F(x,2p+2) has two inputs namely Fi(x,2p+1) and Fi(x,2p+2) and has one output Fo(x,2p+2).

The 2:1 Mux U(x,2p+1) has two inputs namely Ui(x,2p+1) and Fo(x,2p+1) and has one output Uo(x,2p+1). The 2:1 Mux U(x,2p+2) has two inputs namely Ui(x,2p+2) and Fo(x,2p+2) and has one output Uo(x,2p+2). The 2:1 Mux B(x,2p+1) has two inputs namely Uo(x,2p+1) and Uo(x,2p+2) and has one output Bo(x,2p+1). The 2:1 Mux B(x,2p+2) has two inputs namely Uo(x,2p+1) and Uo(x,2p+2) and has one output Bo(x,2p+2).

The stage (ring "x", stage "p+1") consists of 4 inputs namely Fi(x,2p+3), Fi(x,2p+4), Ui(x,2p+3), and Ui(x,2p+4); and 4 outputs Bo(x,2p+3), Bo(x,2p+4), Fo(x,2p+3), and Fo(x,2p+4). The stage (ring "x", stage "p+1") also consists of six 2:1 Muxes namely F(x,2p+3), F(x,2p+4), U(x,2p+3), U(x,2p+4), B(x,2p+3), and B(x,2p+4). The 2:1 Mux F(x,2p+3) has two inputs namely Fi(x,2p+3) and Fi(x,2p+4) and has one output Fo(x,2p+3). The 2:1 Mux F(x,2p+4) has two inputs namely Fi(x,2p+3) and Fi(x,2p+4) and has one output Fo(x,2p+4).

The 2:1 Mux U(x,2p+3) has two inputs namely Ui(x,2p+3) and Fo(x,2p+3) and has one output Uo(x,2p+3). The 2:1 Mux U(x,2p+4) has two inputs namely Ui(x,2p+4) and Fo(x,2p+4) and has one output Uo(x,2p+4). The 2:1 Mux B(x,2p+3) has two inputs namely Uo(x,2p+3) and Uo(x,2p+4) and has one output Bo(x,2p+3). The 2:1 Mux B(x,2p+4) has two inputs namely Uo(x,2p+3) and Uo(x,2p+4) and has one output Bo(x,2p+4).

The output Fo(x,2p+1) of the stage (ring "x", stage "p") is connected to the input Fi(x,2p+3) of the stage (ring "x", stage "p+1"). And the output Bo(x,2p+3) of the stage (ring "x", stage "p+1") is connected to the input Ui(x,2p+1) of the stage (ring "x", stage "p").

The stage (ring "y", stage "q") consists of 4 inputs namely Fi(y,2q+1), Fi(y,2q+2), Ui(y,2q+1), and Ui(y,2q+2); and 4 outputs Bo(y,2q+1), Bo(y,2q+2), Fo(y,2q+1), and Fo(y,2q+2). The stage (ring "y", stage "q') also consists of six 2:1 Muxes namely F(y,2q+1), F(y,2q+2), U(y,2q+1), U(y,2q+2), B(y,2q+1), and B(y,2q+2). The 2:1 Mux F(y,2q+1) has two inputs namely Fi(y,2q+1) and Fi(y,2q+2) and has one output Fo(y,2q+1). The 2:1 Mux F(y,2q+2) has two inputs namely Fi(y,2q+1) and Fi(y,2q+2) and has one output Fo(y,2q+2).

The 2:1 Mux U(y,2q+1) has two inputs namely Ui(y,2q+1) and Fo(y,2q+1) and has one output Uo(y,2q+1). The 2:1 Mux U(y,2q+2) has two inputs namely Ui(y,2q+2) and Fo(y,2q+2) and has one output Uo(y,2q+2). The 2:1 Mux B(y,2q+1) has two inputs namely Uo(y,2q+1) and Uo(y,2q+2) and has one output Bo(y,2q+1). The 2:1 Mux B(y,2q+2) has two inputs namely Uo(y,2q+1) and Uo(y,2q+2) and has one output Bo(y,2q+2).

The stage (ring "y", stage "q+1") consists of 4 inputs namely Fi(y,2q+3), Fi(y,2q+4), Ui(y,2q+3), and Ui(y,2q+4); and 4 outputs Bo(y,2q+3), Bo(y,2q+4), Fo(y,2q+3), and Fo(y, 2q+4). The stage (ring "y", stage "q+1") also consists of six 2:1 Muxes namely F(y,2q+3), F(y,2q+4), U(y,2q+3), U(y,2q+4), B(y,2q+3), and B(y,2q+4). The 2:1 Mux F(y,2q+3) has two inputs namely Fi(y,2q+3) and Fi(y,2q+4) and has one output Fo(y,2q+3). The 2:1 Mux F(y,2q+4) has two inputs namely Fi(y,2q+3) and Fi(y,2q+4) and has one output Fo(y,2q+4).

The 2:1 Mux U(y,2q+3) has two inputs namely Ui(y,2q+3) and Fo(y,2q+3) and has one output Uo(y,2q+3). The 2:1 Mux U(y,2q+4) has two inputs namely Ui(y,2q+4) and Fo(y,2q+4) and has one output Uo(y,2q+4). The 2:1 Mux B(y,2q+3) has two inputs namely Uo(y,2q+3) and Uo(y,2q+4) and has one output Bo(y,2q+3). The 2:1 Mux B(y,2q+4) has two inputs namely Uo(y,2q+3) and Uo(y,2q+4) and has one output Bo(y,2q+4).

The output Fo(y,2q+1) of the stage (ring "y", stage "q") is connected to the input Fi(y,2q+3) of the stage (ring "y", stage "q+1"). And the output Bo(y,2q+3) of the stage (ring "y", stage "q+1") is connected to the input Ui(y,2q+1) of the stage (ring "y", stage "q").

The output Fo(x,2p+2) of the stage (ring "x", stage "p") is connected via the wire Hop(1,1) to the input Fi(y,2q+4) of the stage (ring "y", stage "q+1"). The output Bo(x,2p+4) of the stage (ring "x", stage "p+1") is connected via the wire Hop(1,2) to the input Ui(y,2q+2) of the stage (ring "y", stage "q").

The output Fo(y,2q+2) of the stage (ring "y", stage "q") is connected via the wire Hop(2,1) to the input Fi(x,2p+4) of the stage (ring "x", stage "p+1"). The output Bo(y,2q+4) of the stage (ring "y", stage "q+1") is connected via the wire Hop(2,2) to the input Ui(x,2p+2) of the stage (ring "x", stage "p").

Referring to diagram 500 in FIG. 5, illustrates all the connections between two arbitrary successive stages of a ring namely the stages (ring "x", stage "p") and (ring "x", stage "p+1") and two other arbitrary successive stages of any other ring namely the stages (ring "y", stage "q") and (ring "y", stage "q+1"), of the complete multi-stage hierarchical network $V_{Comb}$ ($N_1$, $N_2$, d, s).

The stage (ring "x", stage "p") consists of 4 inputs namely Fi(x,2p+1), Fi(x,2p+2), Ui(x,2p+1), and Ui(x,2p+2); and 4 outputs Bo(x,2p+1), Bo(x,2p+2), Fo(x,2p+1), and Fo(x,2p+2). The stage (ring "x", stage "p') also consists of six 2:1 Muxes namely F(x,2p+1), F(x,2p+2), U(x,2p+1), U(x,2p+2), B(x,2p+1), and B(x,2p+2). The 2:1 Mux F(x,2p+1) has two inputs namely Fi(x,2p+1) and Fi(x,2p+2) and has one output Fo(x,2p+1). The 2:1 Mux F(x,2p+2) has two inputs namely Fi(x,2p+1) and Fi(x,2p+2) and has one output Fo(x,2p+2).

The 2:1 Mux U(x,2p+1) has two inputs namely Ui(x,2p+1) and Fo(x,2p+1) and has one output Uo(x,2p+1). The 2:1 Mux U(x,2p+2) has two inputs namely Ui(x,2p+2) and Fo(x,2p+2) and has one output Uo(x,2p+2). The 2:1 Mux B(x,2p+1) has two inputs namely Uo(x,2p+1) and Uo(x,2p+2) and has one output Bo(x,2p+1). The 2:1 Mux B(x,2p+2) has two inputs namely Uo(x,2p+1) and Uo(x,2p+2) and has one output Bo(x,2p+2).

The stage (ring "x", stage "p+1") consists of 2 inputs namely Fi(x,2p+3), Fi(x,2p+4); and 2 outputs Fo(x,2p+3), and Fo(x,2p+4). The stage (ring "x", stage "p+1") also consists of two 2:1 Muxes namely F(x,2p+3) and F(x,2p+4). The 2:1 Mux F(x,2p+3) has two inputs namely Fi(x,2p+3) and Fi(x,2p+4) and has one output Fo(x,2p+3). The 2:1 Mux F(x,2p+4) has two inputs namely Fi(x,2p+3) and Fi(x,2p+4) and has one output Fo(x,2p+4).

The output Fo(x,2p+1) of the stage (ring "x", stage "p") is connected to the input Fi(x,2p+3) of the stage (ring "x", stage "p+1"). And the output Fo(x,2p+3) of the stage (ring "x", stage "p+1") is connected to the input Ui(x,2p+1) of the stage (ring "x", stage "p").

The stage (ring "y", stage "q") consists of 4 inputs namely Fi(y,2q+1), Fi(y,2q+2), Ui(y,2q+1), and Ui(y,2q+2); and 4 outputs Bo(y,2q+1), Bo(y,2q+2), Fo(y,2q+1), and Fo(y,2q+2). The stage (ring "y", stage "q') also consists of six 2:1 Muxes namely F(y,2q+1), F(y,2q+2), U(y,2q+1), U(y,2q+2), B(y,2q+1), and B(y,2q+2). The 2:1 Mux F(y,2q+1) has two inputs namely Fi(y,2q+1) and Fi(y,2q+2) and has one output Fo(y,2q+1). The 2:1 Mux F(y,2q+2) has two inputs namely Fi(y,2q+1) and Fi(y,2q+2) and has one output Fo(y,2q+2).

The 2:1 Mux U(y,2q+1) has two inputs namely Ui(y,2q+1) and Fo(y,2q+1) and has one output Uo(y,2q+1). The 2:1 Mux U(y,2q+2) has two inputs namely Ui(y,2q+2) and Fo(y,2q+2) and has one output Uo(y,2q+2). The 2:1 Mux B(y,2q+1) has two inputs namely Uo(y,2q+1) and Uo(y,2q+2) and has one output Bo(y,2q+1). The 2:1 Mux B(y,2q+2) has two inputs namely Uo(y,2q+1) and Uo(y,2q+2) and has one output Bo(y,2q+2).

The stage (ring "y", stage "q+1") consists of 4 inputs namely Fi(y,2q+3), Fi(y,2q+4), Ui(y,2q+3), and Ui(y,2q+4); and 4 outputs Bo(y,2q+3), Bo(y,2q+4), Fo(y,2q+3), and Fo(y,2q+4). The stage (ring "y", stage "q+1") also consists of six 2:1 Muxes namely F(y,2q+3), F(y,2q+4), U(y,2q+3), U(y,2q+4), B(y,2q+3), and B(y,2q+4). The 2:1 Mux F(y,2q+3) has two inputs namely Fi(y,2q+3) and Fi(y,2q+4) and has one output Fo(y,2q+3). The 2:1 Mux F(y,2q+4) has two inputs namely Fi(y,2q+3) and Fi(y,2q+4) and has one output Fo(y,2q+4).

The 2:1 Mux U(y,2q+3) has two inputs namely Ui(y,2q+3) and Fo(y,2q+3) and has one output Uo(y,2q+3). The 2:1 Mux U(y,2q+4) has two inputs namely Ui(y,2q+4) and Fo(y,2q+4) and has one output Uo(y,2q+4). The 2:1 Mux B(y,2q+3) has two inputs namely Uo(y,2q+3) and Uo(y,2q+4) and has one output Bo(y,2q+3). The 2:1 Mux B(y,2q+4) has two inputs namely Uo(y,2q+3) and Uo(y,2q+4) and has one output Bo(y,2q+4).

The output Fo(y,2q+1) of the stage (ring "y", stage "q") is connected to the input Fi(y,2q+3) of the stage (ring "y", stage "q+1"). And the output Bo(y,2q+3) of the stage (ring "y", stage "q+1") is connected to the input Ui(y,2q+1) of the stage (ring "y", stage "q").

The output Fo(x,2p+2) of the stage (ring "x", stage "p") is connected via the wire Hop(1,1) to the input Fi(y,2q+4) of the stage (ring "y", stage "q+1"). The output Fo(x,2p+4) of the stage (ring "x", stage "p+1") is connected via the wire Hop(1,2) to the input Ui(y,2q+2) of the stage (ring "y", stage "q").

The output Fo(y,2q+2) of the stage (ring "y", stage "q") is connected via the wire Hop(2,1) to the input Fi(x,2p+4) of the stage (ring "x", stage "p+1"). The output Bo(y,2q+4) of the stage (ring "y", stage "q+1") is connected via the wire Hop(2,2) to the input Ui(x,2p+2) of the stage (ring "x", stage "p").

Referring to diagram 600 in FIG. 6, illustrates all the connections between root stage of a ring namely the stage (ring "x", stage "p") and two other arbitrary successive stages of any other ring namely the stages (ring "y", stage "q") and (ring "y", stage "q+1"), of the complete multi-stage hierarchical network $V_{Comb}$ ($N_1$, $N_2$, d, s).

The stage (ring "x", stage "p") consists of 4 inputs namely Fi(x,2p+1), Fi(x,2p+2), Ui(x,2p+1), and Ui(x,2p+2); and 4 outputs Bo(x,2p+1), Bo(x,2p+2), Fo(x,2p+1), and Fo(x,2p+2). The stage (ring "x", stage "p') also consists of six 2:1 Muxes namely F(x,2p+1), F(x,2p+2), U(x,2p+1), U(x,2p+2), B(x,2p+1), and B(x,2p+2). The 2:1 Mux F(x,2p+1) has two inputs namely Fi(x,2p+1) and Fi(x,2p+2) and has one output Fo(x,2p+1). The 2:1 Mux F(x,2p+2) has two inputs namely Fi(x,2p+1) and Fi(x,2p+2) and has one output Fo(x,2p+2).

The 2:1 Mux U(x,2p+1) has two inputs namely Ui(x,2p+1) and Fo(x,2p+1) and has one output Uo(x,2p+1). The 2:1 Mux U(x,2p+2) has two inputs namely Ui(x,2p+2) and Fo(x,2p+2)

and has one output Uo(x,2p+2). The 2:1 Mux B(x,2p+1) has two inputs namely Uo(x,2p+1) and Uo(x,2p+2) and has one output Bo(x,2p+1). The 2:1 Mux B(x,2p+2) has two inputs namely Uo(x,2p+1) and Uo(x,2p+2) and has one output Bo(x, 2p+2).

The stage (ring "y", stage "q") consists of 4 inputs namely Fi(y,2q+1), Fi(y,2q+2), Ui(y,2q+1), and Ui(y,2q+2); and 4 outputs Bo(y,2q+1), Bo(y,2q+2), Fo(y,2q+1), and Fo(y,2q+2). The stage (ring "y", stage "q') also consists of six 2:1 Muxes namely F(y,2q+1), F(y,2q+2), U(y,2q+1), U(y,2q+2), B(y,2q+1), and B(y,2q+2). The 2:1 Mux F(y,2q+1) has two inputs namely Fi(y,2q+1) and Fi(y,2q+2) and has one output Fo(y,2q+1). The 2:1 Mux F(y,2q+2) has two inputs namely Fi(y,2q+1) and Fi(y,2q+2) and has one output Fo(y,2q+2).

The 2:1 Mux U(y,2q+1) has two inputs namely Ui(y,2q+1) and Fo(y,2q+1) and has one output Uo(y,2q+1). The 2:1 Mux U(y,2q+2) has two inputs namely Ui(y,2q+2) and Fo(y,2q+2) and has one output Uo(y,2q+2). The 2:1 Mux B(y,2q+1) has two inputs namely Uo(y,2q+1) and Uo(y,2q+2) and has one output Bo(y,2q+1). The 2:1 Mux B(y,2q+2) has two inputs namely Uo(y,2q+1) and Uo(y,2q+2) and has one output Bo(y, 2q+2).

The stage (ring "y", stage "q+1") consists of 4 inputs namely Fi(y,2q+3), Fi(y,2q+4), Ui(y,2q+3), and Ui(y,2q+4); and 4 outputs Bo(y,2q+3), Bo(y,2q+4), Fo(y,2q+3), and Fo(y, 2q+4). The stage (ring "y", stage "q+1") also consists of six 2:1 Muxes namely F(y,2q+3), F(y,2q+4), U(y,2q+3), U(y,2q+4), B(y,2q+3), and B(y,2q+4). The 2:1 Mux F(y,2q+3) has two inputs namely Fi(y,2q+3) and Fi(y,2q+4) and has one output Fo(y,2q+3). The 2:1 Mux F(y,2q+4) has two inputs namely Fi(y,2q+3) and Fi(y,2q+4) and has one output Fo(y,2q+4).

The 2:1 Mux U(y,2q+3) has two inputs namely Ui(y,2q+3) and Fo(y,2q+3) and has one output Uo(y,2q+3). The 2:1 Mux U(y,2q+4) has two inputs namely Ui(y,2q+4) and Fo(y,2q+4) and has one output Uo(y,2q+4). The 2:1 Mux B(y,2q+3) has two inputs namely Uo(y,2q+3) and Uo(y,2q+4) and has one output Bo(y,2q+3). The 2:1 Mux B(y,2q+4) has two inputs namely Uo(y,2q+3) and Uo(y,2q+4) and has one output Bo(y, 2q+4).

The output Fo(y,2q+1) of the stage (ring "y", stage "q") is connected to the input Fi(y,2q+3) of the stage (ring "y", stage "q+1"). And the output Bo(y,2q+3) of the stage (ring "y", stage "q+1") is connected to the input Ui(y,2q+1) of the stage (ring "y", stage "q").

The output Fo(x,2p+1) of the stage (ring "x", stage "p") is connected via the wire Hop(1,2) to the input Ui(y,2q+2) of the stage (ring "y", stage "q"). The output Fo(x,2p+2) of the stage (ring "x", stage "p") is connected via the wire Hop(1,1) to the input Fi(y,2q+4) of the stage (ring "y", stage "q+1").

The output Fo(y,2q+2) of the stage (ring "y", stage "q") is connected via the wire Hop(2,1) to the input Ui(x,2p+1) of the stage (ring "x", stage "p"). The output Bo(y,2q+4) of the stage (ring "y", stage "q+1") is connected via the wire Hop(2,2) to the input Ui(x,2p+2) of the stage (ring "x", stage "p").

Just like in diagram 300A of FIG. 3A, in diagram 300B of FIG. 3B, in diagram 400 of FIG. 4, diagram 500 of FIG. 5, and in diagram 6 of FIG. 6, the wires Hop(1,1), Hop(1,2), Hop(2, 1), and Hop(2,2) are either internal hop wires or horizontal external hop wires or vertical external hop wires.

Figure 7:
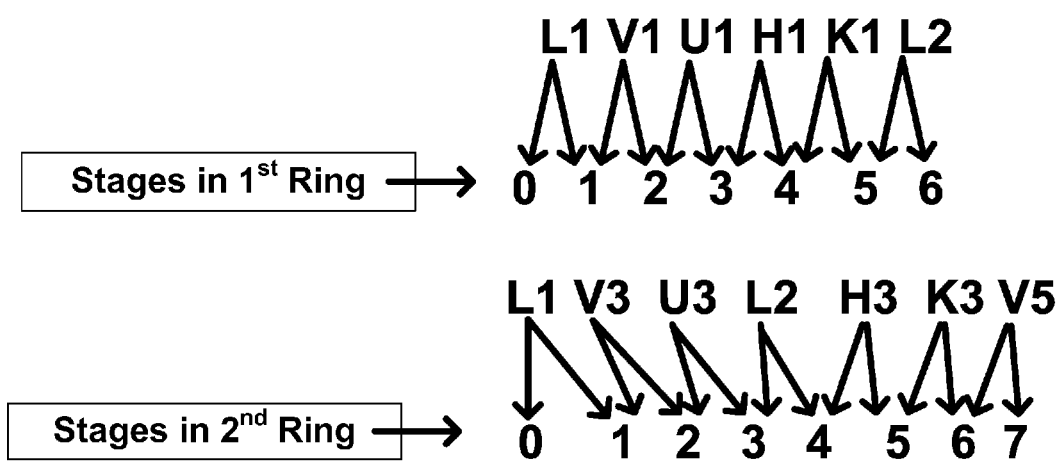
FIG. 7 is a diagram 700, is an embodiment of hop wire connection chart corresponding to a block of multi-stage hierarchical network.

Referring to diagram 700 in FIG. 7, illustrates, in one embodiment, the hop wire connections chart of a partial multi-stage hierarchical network $V_{Comb}(N_1, N_2, d, s)$ 100A or a partial multi-stage hierarchical network $V_{Comb}(N_1, N_2, d, s)$ 100B, with m=6 and n=7. The hop wire connections chart shows two rings namely ring 1 and ring 2. And there are m+1=7 stages in ring 1 and n+1=8 stages in ring 2.

The hop wire connections chart 700 illustrates how the hop wires are connected between any two successive stages of all the rings corresponding to a block of 2D-grid 800. "Lx" denotes an internal hop wire connection, where symbol "L" denotes internal hop wire and "x" is an integer. For example "L1" between the stages (ring 1, stage 0) and (ring 1, stage 1) denotes that the corresponding hop wires Hop(1,1), Hop(1,2), Hop(2,1), and Hop(2,2) are connected to two successive stages of another ring in the same block or alternatively hop wires Hop(1,1), Hop(1,2), Hop(2,1), and Hop(2,2) are internal hop wires. Since there is also "L1" between the stages (ring 2, stage 0) and (ring 2, stage 1), there are internal hop wire connections Hop(1,1), Hop(1,2), Hop(2,1), and Hop(2, 2) connected between the stages (ring 1, stage 0) and (ring 1, stage 1) and the stages (ring 2, stage 0) and (ring 2, stage 1). Hence there can be only two "L1" labels in the hop wire connection chart 700.

Similarly there are two "L2" labels in the hop wire connections chart 700. Since the label "L2" is given between the stages (ring 1, stage 5) and (ring 1, stage 6) and also the label "L2" is given between the stages (ring 2, stage 3) and (ring 2, stage 4), there are corresponding internal hop wire connections Hop(1,1), Hop(1,2), Hop(2,1), and Hop(2,2) connected between the stages (ring 1, stage 5) and (ring 1, stage 6) and the stages (ring 2, stage 3) and (ring 2, stage 4).

"Vx" denotes an external vertical hop wire, where symbol "V" denotes vertical external hop wire connections from blocks of the topmost row of 2D-grid 800 (i.e., row of blocks consisting of block (1,1), block (1,2), . . . , and block (1,10)) to the same corresponding stages of the same numbered ring of another block that is directly down south, with "x" vertical hop length, where "x" is a positive integer. For example "V1" between the stages (ring 1, stage 1) and (ring 1, stage 2) denote that from block (1,1) of 2D-grid 800 to another block directly below it, which is block (2,1), since "V1" denotes hop length of 1, there are external hop wire connections Hop(1,1), Hop(1,2), Hop(2,1), and Hop(2,2) from (ring 1, stage 1) and (ring 1, stage 2) of block (1,1) to (ring 1, stage 1) and (ring 1, stage 2) of block (2,1). It also means there are external hop wire connections Hop(1,1), Hop(1,2), Hop(2,1), and Hop(2, 2) from (ring 1, stage 1) and (ring 1, stage 2) of block (3,1) to (ring 1, stage 1) and (ring 1, stage 2) of block (4,1). This pattern continues and finally there are external hop wire connections Hop(1,1), Hop(1,2), Hop(2,1), and Hop(2,2) from (ring 1, stage 1) and (ring 1, stage 2) of block (9,1) to (ring 1, stage 1) and (ring 1, stage 2) of block (10,1). The same pattern continues for all the columns starting from the block in the topmost row of each column.

Similarly "V3" between the stages (ring 2, stage 1) and (ring 2, stage 2) denote that from block (1,1) of 2D-grid 800 to another block below it and at a hop length of 3 which is block (4,1), there are external hop wire connections Hop(1,1), Hop(1,2), Hop(2,1), and Hop(2,2) from (ring 2, stage 1) and (ring 2, stage 2) of block (1,1) to (ring 2, stage 1) and (ring 2, stage 2) of block (4,1). It also means there are external hop wire connections Hop(1,1), Hop(1,2), Hop(2,1), and Hop(2, 2) from (ring 2, stage 1) and (ring 2, stage 2) of block (2,1) to (ring 2, stage 1) and (ring 2, stage 2) of block (5,1). This pattern continues and finally there are external hop wire connections Hop(1,1), Hop(1,2), Hop(2,1), and Hop(2,2) from (ring 2, stage 1) and (ring 2, stage 2) of block (7,1) to (ring 2, stage 1) and (ring 2, stage 2) of block (10,1). The same pattern continues for all the columns starting from the block in the topmost row of each column.

If there is no block that is directly below a block with hop length equal to 3 then there is no vertical external hop wire connections is given corresponding to those two successive stages of the blocks. For example block (8,1) does not have any block that is directly below and with hop length equal to 3 then none of the vertical external hop wires are connected from (ring 2, stage 1) and (ring 2, stage 2) of block (8,1). Similarly from (ring 2, stage 1) and (ring 2, stage 2) of block (9,1) and from (ring 2, stage 1) and (ring 2, stage 2) of block (10,1), none of the vertical external hop wires are connected. Similarly vertical external hop wires are connected corresponding to "V5", "V7" etc., labels given in the hop wire connections chart 700.

"Ux" denotes an external vertical hop wire, where symbol "U" denotes vertical external hop wire connections starting from blocks that are "x" hop length below the topmost row of 2D-grid 800 (i.e., row of blocks consisting of block (1+x,1), block (1+x,2), . . . , and block (1+x,10)) to the same corresponding stages of the same numbered ring of another block that is directly down below, with "x" vertical hop length, where "x" is a positive integer. For example "U1" between the stages (ring 1, stage 2) and (ring 1, stage 3) denote that from block (2,1) of 2D-grid 800 to another block directly below it, which is block (3,1), since "U1" denotes hop length of 1, there are external hop wire connections Hop(1,1), Hop(1,2), Hop (2,1), and Hop(2,2) from (ring 1, stage 2) and (ring 1, stage 3) of block (2,1) to (ring 1, stage 2) and (ring 1, stage 3) of block (3,1). It also means there are external hop wire connections Hop(1,1), Hop(1,2), Hop(2,1), and Hop(2,2) from (ring 1, stage 2) and (ring 1, stage 3) of block (4,1) to (ring 1, stage 2) and (ring 1, stage 3) of block (5,1). This pattern continues and finally there are external hop wire connections Hop(1,1), Hop(1,2), Hop(2,1), and Hop(2,2) from (ring 1, stage 2) and (ring 1, stage 3) of block (8,1) to (ring 1, stage 2) and (ring 1, stage 3) of block (9,1). The same pattern continues for all the columns starting from the block in the topmost row of each column.

If there is no block that is directly below a block with hop length equal to 1 then no vertical external hop wire connections is given corresponding to those two successive stages of the blocks. For example block (10,1) does not have any block that is directly below and with hop length equal to 1 then none of the vertical external hop wires are connected from (ring 1, stage 2) and (ring 1, stage 3) of block (10,1). Similarly for all the blocks in each column from the topmost row up to the row "x", no vertical external hop wires are connected to the corresponding (ring 1, stage 2) and (ring 1, stage 3).

Similarly "U3" between the stages (ring 2, stage 2) and (ring 2, stage 3) denote that starting from blocks that are 3 hop length below the topmost row of 2D-grid 800 (i.e., row of blocks consisting of block (4,1), block (4,2), . . . , and block (4,10)) to the same corresponding stages of the same numbered ring of another block that is directly down below, with vertical hop length of 3, there are external hop wire connections Hop(1,1), Hop(1,2), Hop(2,1), and Hop(2,2) connected. For example from block (4,1) of 2D-grid 800 to another block below it and at a hop length of 3 which is block (7,1), there are external hop wire connections Hop(1,1), Hop(1,2), Hop(2,1), and Hop(2,2) from (ring 2, stage 2) and (ring 2, stage 3) of block (4,1) to (ring 2, stage 1) and (ring 2, stage 2) of block (7,1). It also means there are external hop wire connections Hop(1,1), Hop(1,2), Hop(2,1), and Hop(2,2) from (ring 2, stage 2) and (ring 2, stage 3) of block (5,1) to (ring 2, stage 2) and (ring 2, stage 3) of block (8,1). This pattern continues and finally there are external hop wire connections Hop(1,1), Hop(1,2), Hop(2,1), and Hop(2,2) from (ring 2, stage 2) and (ring 2, stage 3) of block (7,1) to (ring 2, stage 2) and (ring 2, stage 3) of block (10,1). The same pattern continues for all the columns starting from the block in the topmost row of each column.

If there is no block that is directly below a block with hop length equal to 3 then no vertical external hop wire connections is given corresponding to those two successive stages of the blocks. For example block (8,1) does not have any block that is directly below and with hop length equal to 3 then none of the vertical external hop wires are connected from (ring 2, stage 2) and (ring 2, stage 3) of block (8,1). Similarly from (ring 2, stage 2) and (ring 2, stage 3) of block (9,1) and from (ring 2, stage 2) and (ring 2, stage 3) of block (10,1), none of the vertical external hop wires are connected. Similarly vertical external hop wires are connected corresponding to "U5", "U7" etc. labels given in the hop wire connections chart 700.

"Hx" denotes an external horizontal hop wire, where symbol "H" denotes horizontal external hop wire connections from blocks of the leftmost column of 2D-grid 800 (i.e., column of blocks consisting of block (1,1), block (2,1), . . . , and block (10,1)) to the same corresponding stages of the same numbered ring of another block that is directly to the right, with "x" horizontal hop length, where "x" is a positive integer. For example "H1" between the stages (ring 1, stage 3) and (ring 1, stage 4) denote that from block (1,1) of 2D-grid 800 to another block directly to the right, which is block (1,2), since "H1" denotes hop length of 1, there are external hop wire connections Hop(1,1), Hop(1,2), Hop(2,1), and Hop(2, 2) from (ring 1, stage 3) and (ring 1, stage 4) of block (1,1) to (ring 1, stage 3) and (ring 1, stage 4) of block (1,2). It also means there are external hop wire connections Hop(1,1), Hop(1,2), Hop(2,1), and Hop(2,2) from (ring 1, stage 3) and (ring 1, stage 4) of block (1,3) to (ring 1, stage 3) and (ring 1, stage 4) of block (1,4). This pattern continues and finally there are external hop wire connections Hop(1,1), Hop(1,2), Hop (2,1), and Hop(2,2) from (ring 1, stage 3) and (ring 1, stage 4) of block (9,1) to (ring 1, stage 3) and (ring 1, stage 4) of block (10,1). The same pattern continues for all the rows starting from the block in the leftmost block of each row.

Similarly "H3" between the stages (ring 2, stage 4) and (ring 2, stage 5) denote that from block (1,1) of 2D-grid 800 to another block to the right and at a hop length of 3 which is block (1,4), there are external hop wire connections Hop(1,1), Hop(1,2), Hop(2,1), and Hop(2,2) from (ring 2, stage 4) and (ring 2, stage 5) of block (1,1) to (ring 2, stage 4) and (ring 2, stage 5) of block (1,4). It also means there are external hop wire connections Hop(1,1), Hop(1,2), Hop(2,1), and Hop(2, 2) from (ring 2, stage 4) and (ring 2, stage 5) of block (1,2) to (ring 2, stage 4) and (ring 2, stage 5) of block (1,5). This pattern continues and finally there are external hop wire connections Hop(1,1), Hop(1,2), Hop(2,1), and Hop(2,2) from (ring 2, stage 4) and (ring 2, stage 5) of block (1,7) to (ring 2, stage 4) and (ring 2, stage 5) of block (1,10). The same pattern continues for all the columns starting from the block in the leftmost column of each row.

If there is no block that is directly to the right with hop length equal to 3 then there is no horizontal external hop wire connections is given corresponding to those two successive stages of the blocks. For example block (1,8) does not have any block that is directly to the right and with hop length equal to 3 then none of the horizontal external hop wires are connected from (ring 2, stage 4) and (ring 2, stage 5) of block (1,8). Similarly from (ring 2, stage 4) and (ring 2, stage 5) of block (1,9) and from (ring 2, stage 4) and (ring 2, stage 5) of block (1,10), none of the horizontal external hop wires are connected. Similarly horizontal external hop wires are connected corresponding to "H5", "H7" etc., labels given in the hop wire connections chart 700.

"Kx" denotes an external horizontal hop wire, where symbol "K" denotes horizontal external hop wire connections starting from blocks that are "x" hop length below the leftmost column of 2D-grid 800 (i.e., column of blocks consisting of block (1, 1+x), block (2, 1+x), . . . , and block (10, 1+x)) to the same corresponding stages of the same numbered ring of another block that is directly to the right, with "x" horizontal hop length, where "x" is a positive integer. For example "K1" between the stages (ring 1, stage 4) and (ring 1, stage 5) denote that from block (1,2) of 2D-grid 800 to another block directly to the right, which is block (1,3), since "K1" denotes hop length of 1, there are external hop wire connections Hop(1,1), Hop(1,2), Hop(2,1), and Hop(2,2) from (ring 1, stage 4) and (ring 1, stage 5) of block (1,2) to (ring 1, stage 4) and (ring 1, stage 5) of block (1,3). It also means there are external hop wire connections Hop(1,1), Hop(1,2), Hop(2,1), and Hop(2,2) from (ring 1, stage 4) and (ring 1, stage 4) of block (1,4) to (ring 1, stage 4) and (ring 1, stage 5) of block (1,5). This pattern continues and finally there are external hop wire connections Hop(1,1), Hop(1,2), Hop(2,1), and Hop(2,2) from (ring 1, stage 4) and (ring 1, stage 5) of block (1,8) to (ring 1, stage 4) and (ring 1, stage 5) of block (1,9). The same pattern continues for all the rows starting from the block in the leftmost column of each row.

If there is no block that is directly to the right of a block with hop length equal to 1 then no horizontal external hop wire connections is given corresponding to those two successive stages of the blocks. For example block (1,10) does not have any block that is directly to the right and with hop length equal to 1 then none of the horizontal external hop wires are connected from (ring 1, stage 4) and (ring 1, stage 5) of block (1,10). Similarly for all the blocks in each row from the leftmost column up to the column "x", no horizontal external hop wires are connected to the corresponding (ring 1, stage 4) and (ring 1, stage 5).

Similarly "K3" between the stages (ring 2, stage 5) and (ring 2, stage 6) denote that starting from blocks that are 3 hop length to the right of the leftmost column of 2D-grid 800 (i.e., column of blocks consisting of block (1,4), block (2,4), . . . , and block (10,4)) to the same corresponding stages of the same numbered ring of another block that is directly to the right, with horizontal hop length of 3, there are external hop wire connections Hop(1,1), Hop(1,2), Hop(2,1), and Hop(2,2) connected. For example from block (1,4) of 2D-grid 800 to another block to the right and at a hop length of 3 which is block (1,7), there are external hop wire connections Hop(1,1), Hop(1,2), Hop(2,1), and Hop(2,2) from (ring 2, stage 5) and (ring 2, stage 6) of block (1,4) to (ring 2, stage 5) and (ring 2, stage 6) of block (1,7). It also means there are external hop wire connections Hop(1,1), Hop(1,2), Hop(2,1), and Hop(2,2) from (ring 2, stage 5) and (ring 2, stage 6) of block (1,5) to (ring 2, stage 5) and (ring 2, stage 6) of block (1,8). This pattern continues and finally there are external hop wire connections Hop(1,1), Hop(1,2), Hop(2,1), and Hop(2,2) from (ring 2, stage 5) and (ring 2, stage 6) of block (1,7) to (ring 2, stage 5) and (ring 2, stage 6) of block (1,10). The same pattern continues for all the rows starting from the block in the leftmost block of each row.

If there is no block that is directly to the right of a block with hop length equal to 3 then no horizontal external hop wire connections is given corresponding to those two successive stages of the blocks. For example block (1,8) does not have any block that is directly to the right and with hop length equal to 3 then none of the horizontal external hop wires are connected from (ring 2, stage 5) and (ring 2, stage 6) of block (1,8). Similarly from (ring 2, stage 5) and (ring 2, stage 6) of block (1,9) and from (ring 2, stage 5) and (ring 2, stage 6) of block (1,10), none of the horizontal external hop wires are connected. Similarly horizontal external hop wires are connected corresponding to "K5", "K7" etc. labels given in the hop wire connections chart 700.

In general the hop length of an external vertical hop wire can be any positive number. Similarly the hop length of an external horizontal hop wire can be any positive number. The hop wire connections between two arbitrary successive stages in two different rings of the same block or two different rings of different blocks described in diagram 700 of FIG. 7 may be any one of the embodiments of either the diagrams 300A of FIG. 3A, 300B of FIG. 3B, 400 of FIG. 4, 500 of FIG. 5, and 600 of FIG. 6.

In accordance with the current invention, either partial multi-stage hierarchical network $V_{Comb}$ ($N_1$, $N_2$, d, s) 100A of FIG. 1A or partial multi-stage hierarchical network $V_{Comb}$ ($N_1$, $N_2$, d, s) 100B of FIG. 1B, corresponding to a block of 2D-grid of blocks 800 of FIG. 8, using any one of the embodiments of 200A-200E of FIGS. 2A-2E to implement a stage of a ring of the multi-stage hierarchical network, by using the hop wire connection chart 700 of FIG. 7 and the hop wire connections between two arbitrary successive stages in two different rings of the same block or two different rings of different blocks described in diagram 700 of FIG. 7 may be any one of the embodiments of either the diagrams 300A of FIG. 3A, 300B of FIG. 3B, 400 of FIG. 4, 500 of FIG. 5, and 600 of FIG. 6 is very efficient in the reduction of the die size, power consumption, and for lower wire/path delay for higher performance for practical routing applications to particularly to set up broadcast, unicast and multicast connections. In general in accordance with the current invention, where $N_1$ and $N_2$ of the complete multi-stage hierarchical network $V_{Comb}$ ($N_1$, $N_2$, d, s) may be arbitrarily large in size and also the 2D-grid size 800 may also be arbitrarily large in size in terms of both the number of rows and number of columns.

Delay Optimizations in Multi-Stage Hierarchical Network $V_{D\text{-}Comb}$ ($N_1$, $N_2$, d, s):

The multi-stage hierarchical network $V_{Comb}$ ($N_1$, $N_2$, d, s) according to the current invention can further be optimized to reduce the delay in the routed path of the connection. The delay optimized multi-stage hierarchical network $V_{Comb}$ ($N_1$, $N_2$, d, s) is hereinafter denoted by $V_{D\text{-}Comb}$ ($N_1$, $N_2$, d, s). The delay optimizing embodiments of the stages of a ring are one of the diagrams namely 900A-900E of FIGS. 9A-9D, 1000A-1000F of FIGS. 10A-10F, and 1100A-1100C of FIGS. 11A-11C. The diagram 1200 of FIG. 12, 1300 of FIG. 13, 1400 of FIGS. 14, and 1500 of FIG. 15 are different embodiments for the implementation of delay optimizations with all the connections between two arbitrary successive stages in two different rings of the same block or two different rings of different blocks of 2D-grid 800.

Figure 9A:
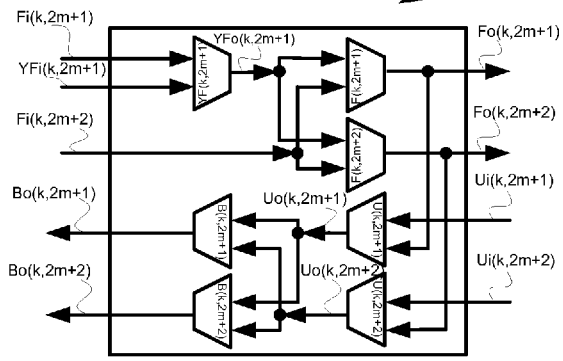
FIG. 9A is a diagram 900A, in an embodiment of, a stage in a ring of multi-stage hierarchical network corresponding to one block, with delay optimizations.

FIG. 9A illustrates a stage (ring "k", stage "m") 900A consists of 5 inputs namely Fi(k,2m+1), Fi(k,2m+2), YFi(k, 2m+1), Ui(k,2m+1), and Ui(k,2m+2); and 4 outputs Bo(k, 2m+1), Bo(k,2m+2), Fo(k,2m+1), and Fo(k,2m+2). The stage (ring "k", stage "m") also consists of seven 2:1 Muxes namely YF(k,2m+1), F(k,2m+1), F(k,2m+2), U(k,2m+1), U(k,2m+2), B(k,2m+1), and B(k,2m+2). The 2:1 Mux YF(k, 2m+1) has two inputs namely Fi(k,2m+1) and YFi(k,2m+1) and has one output YFo(k,2m+1). The 2:1 Mux F(k,2m+1) has two inputs namely YFo(k,2m+1) and Fi(k,2m+2) and has one output Fo(k,2m+1). The 2:1 Mux F(k,2m+2) has two inputs namely YFo(k,2m+1) and Fi(k,2m+2) and has one output Fo(k,2m+2).

The 2:1 Mux U(k,2m+1) has two inputs namely Ui(k,2m+1) and Fo(k,2m+1) and has one output Uo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely Uo(k,2m+1) and Uo(k, 2m+2) and has one output Bo(k,2m+1). The 2:1 Mux B(k, 2m+2) has two inputs namely Uo(k,2m+1) and Uo(k,2m+2) and has one output Bo(k,2m+2).

Figure 9B:
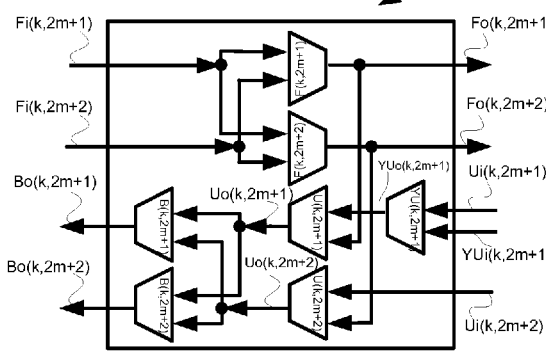
FIG. 9B is a diagram 900B, in an embodiment of, a stage in a ring of multi-stage hierarchical network corresponding to one block, with delay optimizations.

FIG. 9B illustrates a stage (ring "k", stage "m") 900B consists of 5 inputs namely Fi(k,2m+1), Fi(k,2m+2), YUi(k, 2m+1), Ui(k,2m+1), and Ui(k,2m+2); and 4 outputs Bo(k, 2m+1), Bo(k,2m+2), Fo(k,2m+1), and Fo(k,2m+2). The stage (ring "k", stage "m") also consists of seven 2:1 Muxes namely F(k,2m+1), F(k,2m+2), YF(k,2m+1), U(k,2m+1), U(k,2m+2), B(k,2m+1), and B(k,2m+2). The 2:1 Mux F(k, 2m+1) has two inputs namely Fi(k,2m+1) and Fi(k,2m+2) and has one output Fo(k,2m+1). The 2:1 Mux F(k,2m+2) has two inputs namely Fi(k,2m+1) and Fi(k,2m+2) and has one output Fo(k,2m+2).

The 2:1 Mux YU(k,2m+1) has two inputs namely Ui(k, 2m+1) and YUi(k,2m+1) and has one output YUo(k,2m+1). The 2:1 Mux U(k,2m+1) has two inputs namely YUo(k,2m+ 1) and Fo(k,2m+1) and has one output Uo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely Uo(k,2m+1) and Uo(k, 2m+2) and has one output Bo(k,2m+1). The 2:1 Mux B(k, 2m+2) has two inputs namely Uo(k,2m+1) and Uo(k,2m+2) and has one output Bo(k,2m+2).

Figure 9C:
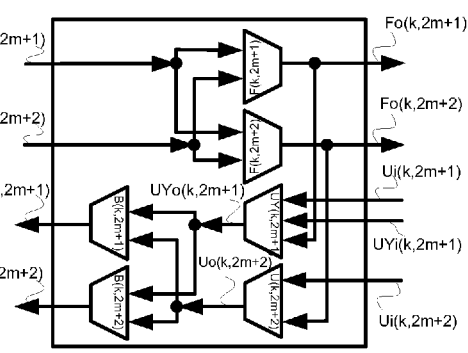
FIG. 9C is a diagram 900C, in an embodiment of, a stage in a ring of multi-stage hierarchical network corresponding to one block, with delay optimizations.

FIG. 9C illustrates a stage (ring "k", stage "m") 900C consists of 5 inputs namely Fi(k,2m+1), Fi(k,2m+2), UYi(k, 2m+1), Ui(k,2m+1), and Ui(k,2m+2); and 4 outputs Bo(k, 2m+1), Bo(k,2m+2), Fo(k,2m+1), and Fo(k,2m+2). The stage (ring "k", stage "m") also consists of five 2:1 Muxes namely F(k,2m+1), F(k,2m+2), U(k,2m+2), B(k,2m+1), and B(k,2m+2). The stage (ring "k", stage "m") also consists of one 3:1 Mux namely UY(k,2m+1). The 2:1 Mux F(k,2m+1) has two inputs namely Fi(k,2m+1) and Fi(k,2m+2) and has one output Fo(k,2m+1). The 2:1 Mux F(k,2m+2) has two inputs namely Fi(k,2m+1) and Fi(k,2m+2) and has one output Fo(k,2m+2).

The 3:1 Mux UY(k,2m+1) has three inputs namely Ui(k, 2m+1), UYi(k,2m+1) and Fo(k,2m+1) and has one output UYo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely UYo(k,2m+1) and Uo(k,2m+2) and has one output Bo(k,2m+ 1). The 2:1 Mux B(k,2m+2) has two inputs namely UYo(k, 2m+1) and Uo(k,2m+2) and has one output Bo(k,2m+2).

Figure 9D:
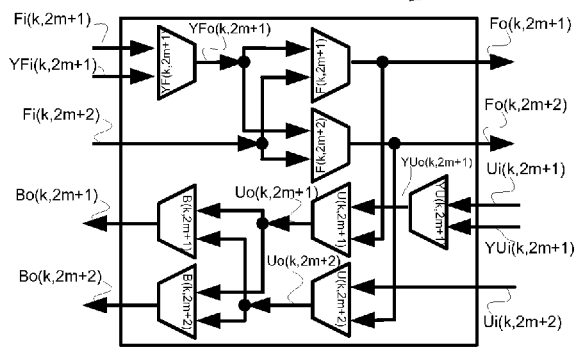
FIG. 9D is a diagram 900D, in an embodiment of, a stage in a ring of multi-stage hierarchical network corresponding to one block, with delay optimizations.

FIG. 9D illustrates a stage (ring "k", stage "m") 900D consists of 6 inputs namely Fi(k,2m+1), Fi(k,2m+2), YFi(k, 2m+1), Ui(k,2m+1), Ui(k,2m+2), and YUi(k,2m+1); and 4 outputs Bo(k,2m+1), Bo(k,2m+2), Fo(k,2m+1), and Fo(k, 2m+2). The stage (ring "k", stage "m") also consists of eight 2:1 Muxes namely F(k,2m+1), F(k,2m+2), YF(k,2m+1), U(k, 2m+1), U(k,2m+2), YU(k,2m+1), B(k,2m+1), and B(k,2m+ 2). The 2:1 Mux YF(k,2m+1) has two inputs namely Fi(k, 2m+1) and YFi(k,2m+1) and has one output YFo(k,2m+1). The 2:1 Mux F(k,2m+1) has two inputs namely YFo(k,2m+1) and Fi(k,2m+2) and has one output Fo(k,2m+1). The 2:1 Mux F(k,2m+2) has two inputs namely YFo(k,2m+1) and Fi(k, 2m+2) and has one output Fo(k,2m+2).

The 2:1 Mux YU(k,2m+1) has two inputs namely Ui(k, 2m+1) and YUi(k,2m+1) and has one output YUo(k,2m+1). The 2:1 Mux U(k,2m+1) has two inputs namely YUo(k,2m+ 1) and Fo(k,2m+1) and has one output Uo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely Uo(k,2m+1) and Uo(k, 2m+2) and has one output Bo(k,2m+1). The 2:1 Mux B(k, 2m+2) has two inputs namely Uo(k,2m+1) and Uo(k,2m+2) and has one output Bo(k,2m+2).

Figure 9E:
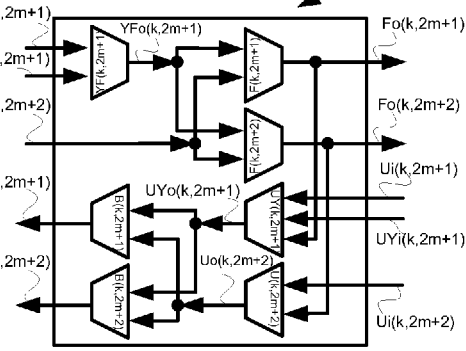
FIG. 9E is a diagram 900E, in an embodiment of, a stage in a ring of multi-stage hierarchical network corresponding to one block, with delay optimizations.

FIG. 9E illustrates a stage (ring "k", stage "m") 900E consists of 6 inputs namely Fi(k,2m+1), Fi(k,2m+2), YFi(k, 2m+1), Ui(k,2m+1), Ui(k,2m+2), and UYi(k,2m+1); and 4 outputs Bo(k,2m+1), Bo(k,2m+2), Fo(k,2m+1), and Fo(k, 2m+2). The stage (ring "k", stage "m") also consists of six 2:1 Muxes namely F(k,2m+1), F(k,2m+2), YF(k,2m+1), U(k, 2m+2), B(k,2m+1), and B(k,2m+2). The stage (ring "k", stage "m") also consists of one 3:1 Mux namely UY(k,2m+ 1). The 2:1 Mux YF(k,2m+1) has two inputs namely Fi(k, 2m+1) and YFi(k,2m+1) and has one output YFo(k,2m+1). The 2:1 Mux F(k,2m+1) has two inputs namely YFo(k,2m+1) and Fi(k,2m+2) and has one output Fo(k,2m+1). The 2:1 Mux F(k,2m+2) has two inputs namely YFo(k,2m+1) and Fi(k, 2m+2) and has one output Fo(k,2m+2).

The 3:1 Mux UY(k,2m+1) has three inputs namely Ui(k, 2m+1), UYi(k,2m+1) and Fo(k,2m+1) and has one output UYo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely UYo(k,2m+1) and Uo(k,2m+2) and has one output Bo(k,2m+ 1). The 2:1 Mux B(k,2m+2) has two inputs namely UYo(k, 2m+1) and Uo(k,2m+2) and has one output Bo(k,2m+2).

Figure 10A:
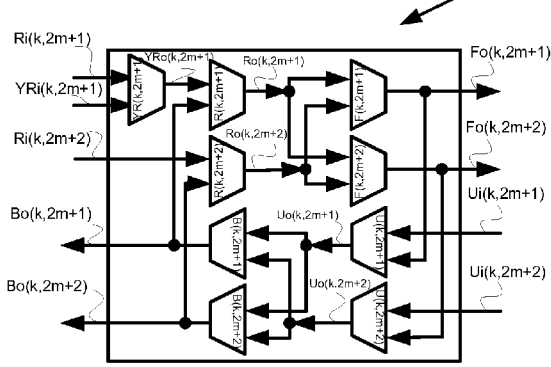
FIG. 10A is a diagram 1000A, in an embodiment of, a stage in a ring of multi-stage hierarchical network corresponding to one block, with delay optimizations.

FIG. 10A illustrates a stage (ring "k", stage "m") 1000A consists of 5 inputs namely Ri(k,2m+1), Ri(k,2m+2), YRi(k, 2m+1), Ui(k,2m+1), and Ui(k,2m+2); and 4 outputs Bo(k, 2m+1), Bo(k,2m+2), Fo(k,2m+1), and Fo(k,2m+2). The stage (ring "k", stage "m") also consists of nine 2:1 Muxes namely R(k,2m+1), R(k,2m+2), YR(k,2m+1), F(k,2m+1), F(k,2m+2), U(k,2m+1), U(k,2m+2), B(k,2m+1), and B(k, 2m+2). The 2:1 Mux YR(k,2m+1) has two inputs namely Ri(k,2m+1) and YRi(k,2m+1) and has one output YRo(k,2m+ 1). The 2:1 Mux R(k,2m+1) has two inputs namely YRo(k, 2m+1) and Bo(k,2m+1) and has one output Ro(k,2m+1). The 2:1 Mux R(k,2m+2) has two inputs namely Ri(k,2m+2) and Bo(k,2m+2) and has one output Ro(k,2m+2). The 2:1 Mux F(k,2m+1) has two inputs namely Ro(k,2m+1) and Ro(k,2m+ 2) and has one output Fo(k,2m+1). The 2:1 Mux F(k,2m+2) has two inputs namely Ro(k,2m+1) and Ro(k,2m+2) and has one output Fo(k,2m+2).

The 2:1 Mux U(k,2m+1) has two inputs namely Ui(k,2m+ 1) and Fo(k,2m+1) and has one output Uo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely Uo(k,2m+1) and Uo(k, 2m+2) and has one output Bo(k,2m+1). The 2:1 Mux B(k, 2m+2) has two inputs namely Uo(k,2m+1) and Uo(k,2m+2) and has one output Bo(k,2m+2).

Figure 10B:
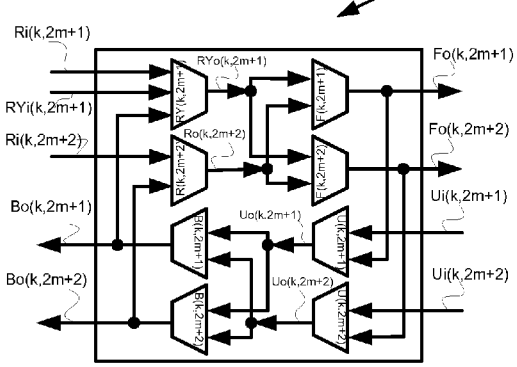
FIG. 10B is a diagram 1000B, in an embodiment of, a stage in a ring of multi-stage hierarchical network corresponding to one block, with delay optimizations.

FIG. 10B illustrates a stage (ring "k", stage "m") 1000B consists of 5 inputs namely Ri(k,2m+1), Ri(k,2m+2), RYi(k, 2m+1), Ui(k,2m+1), and Ui(k,2m+2); and 4 outputs Bo(k, 2m+1), Bo(k,2m+2), Fo(k,2m+1), and Fo(k,2m+2). The stage (ring "k", stage "m") also consists of seven 2:1 Muxes namely R(k,2m+2), F(k,2m+1), F(k,2m+2), U(k,2m+1), U(k, 2m+2), B(k,2m+1), and B(k,2m+2). The stage (ring "k", stage "m") also consists of one 3:1 Mux namely RY(k,2m+1). The 3:1 Mux RY(k,2m+1) has three inputs namely Ri(k,2m+ 1), RYi(k,2m+1), and Bo(k,2m+1), and has one output RYo (k,2m+1). The 2:1 Mux R(k,2m+2) has two inputs namely Ri(k,2m+2) and Bo(k,2m+2) and has one output Ro(k,2m+ 2). The 2:1 Mux F(k,2m+1) has two inputs namely RYo(k, 2m+1) and Ro(k,2m+2) and has one output Fo(k,2m+1). The 2:1 Mux F(k,2m+2) has two inputs namely RYo(k,2m+1) and Ro(k,2m+2) and has one output Fo(k,2m+2).

The 2:1 Mux U(k,2m+1) has two inputs namely Ui(k,2m+ 1) and Fo(k,2m+1) and has one output Uo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely Uo(k,2m+1) and Uo(k,2m+2) and has one output Bo(k,2m+1). The 2:1 Mux B(k,2m+2) has two inputs namely Uo(k,2m+1) and Uo(k,2m+2) and has one output Bo(k,2m+2).

Figure 10C:
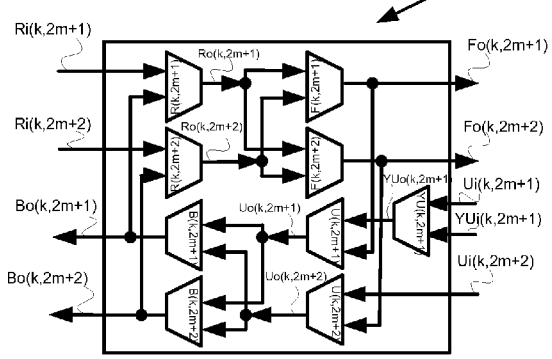
FIG. 10C is a diagram 1000C, in an embodiment of, a stage in a ring of multi-stage hierarchical network corresponding to one block, with delay optimizations.

FIG. 10C illustrates a stage (ring "k", stage "m") 1000C consists of 5 inputs namely Ri(k,2m+1), Ri(k,2m+2), Ui(k,2m+1), Ui(k,2m+2), and YUi(k,2m+1); and 4 outputs Bo(k,2m+1), Bo(k,2m+2), Fo(k,2m+1), and Fo(k,2m+2). The stage (ring "k", stage "m") also consists of nine 2:1 Muxes namely R(k,2m+1), R(k,2m+2), F(k,2m+1), F(k,2m+2), YU(k,2m+1), U(k,2m+1), U(k,2m+2), B(k,2m+1), and B(k,2m+2). The 2:1 Mux R(k,2m+1) has two inputs namely Ri(k,2m+1) and Bo(k,2m+1) and has one output Ro(k,2m+1). The 2:1 Mux R(k,2m+2) has two inputs namely Ri(k,2m+2) and Bo(k,2m+2) and has one output Ro(k,2m+2). The 2:1 Mux F(k,2m+1) has two inputs namely Ro(k,2m+1) and Ro(k,2m+2) and has one output Fo(k,2m+1). The 2:1 Mux F(k,2m+2) has two inputs namely Ro(k,2m+1) and Ro(k,2m+2) and has one output Fo(k,2m+2).

The 2:1 Mux YU(k,2m+1) has two inputs namely Ui(k,2m+1) and YUi(k,2m+1) and has one output YUo(k,2m+1). The 2:1 Mux U(k,2m+1) has two inputs namely YUo(k,2m+1) and Fo(k,2m+1) and has one output Uo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely Uo(k,2m+1) and Uo(k,2m+2) and has one output Bo(k,2m+1). The 2:1 Mux B(k,2m+2) has two inputs namely Uo(k,2m+1) and Uo(k,2m+2) and has one output Bo(k,2m+2).

Figure 10D:
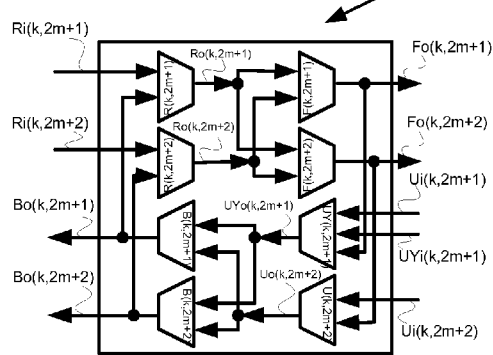
FIG. 10D is a diagram 1000D, in an embodiment of, a stage in a ring of multi-stage hierarchical network corresponding to one block, with delay optimizations.

FIG. 10D illustrates a stage (ring "k", stage "m") 1000D consists of 5 inputs namely Ri(k,2m+1), Ri(k,2m+2), Ui(k,2m+1), Ui(k,2m+2), and UYi(k,2m+1); and 4 outputs Bo(k,2m+1), Bo(k,2m+2), Fo(k,2m+1), and Fo(k,2m+2). The stage (ring "k", stage "m") also consists of seven 2:1 Muxes namely R(k,2m+1), R(k,2m+2), F(k,2m+1), F(k,2m+2), U(k,2m+2), B(k,2m+1), and B(k,2m+2). The stage (ring "k", stage "m") also consists of one 3:1 Mux namely UY(k,2m+1). The 2:1 Mux R(k,2m+1) has two inputs namely Ri(k,2m+1) and Bo(k,2m+1) and has one output Ro(k,2m+1). The 2:1 Mux R(k,2m+2) has two inputs namely Ri(k,2m+2) and Bo(k,2m+2) and has one output Ro(k,2m+2). The 2:1 Mux F(k,2m+1) has two inputs namely Ro(k,2m+1) and Ro(k,2m+2) and has one output Fo(k,2m+1). The 2:1 Mux F(k,2m+2) has two inputs namely Ro(k,2m+1) and Ro(k,2m+2) and has one output Fo(k,2m+2).

The 3:1 Mux UY(k,2m+1) has three inputs namely Ui(k,2m+1), UYi(k,2m+1), and Fo(k,2m+1), and has one output UYo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely UYo(k,2m+1) and Uo(k,2m+2) and has one output Bo(k,2m+1). The 2:1 Mux B(k,2m+2) has two inputs namely UYo(k,2m+1) and Uo(k,2m+2) and has one output Bo(k,2m+2).

Figure 10E:
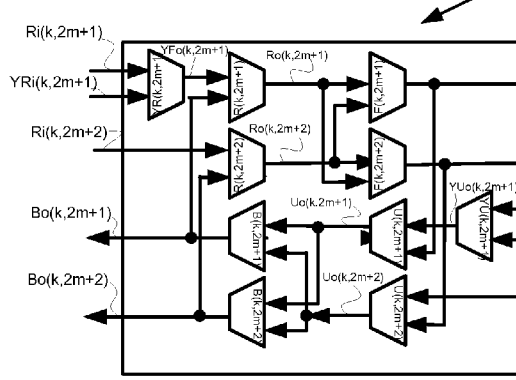
FIG. 10E is a diagram 1000E, in an embodiment of, a stage in a ring of multi-stage hierarchical network corresponding to one block, with delay optimizations.

FIG. 10E illustrates a stage (ring "k", stage "m") 1000E consists of 6 inputs namely Ri(k,2m+1), Ri(k,2m+2), YRi(k,2m+1), Ui(k,2m+1), Ui(k,2m+2), and YUi(k,2m+1); and 4 outputs Bo(k,2m+1), Bo(k,2m+2), Fo(k,2m+1), and Fo(k,2m+2). The stage (ring "k", stage "m") also consists of ten 2:1 Muxes namely YR(k,2m+1), R(k,2m+1), R(k,2m+2), F(k,2m+1), F(k,2m+2), YU(k,2m+1), U(k,2m+1), U(k,2m+2), B(k,2m+1), and B(k,2m+2). The 2:1 Mux YR(k,2m+1) has two inputs namely Ri(k,2m+1) and YRi(k,2m+1) and has one output YRo(k,2m+1). The 2:1 Mux R(k,2m+1) has two inputs namely YRo(k,2m+1) and Bo(k,2m+1) and has one output Ro(k,2m+1). The 2:1 Mux R(k,2m+2) has two inputs namely Ri(k,2m+2) and Bo(k,2m+2) and has one output Ro(k,2m+2). The 2:1 Mux F(k,2m+1) has two inputs namely Ro(k,2m+1) and Ro(k,2m+2) and has one output Fo(k,2m+1). The 2:1 Mux F(k,2m+2) has two inputs namely Ro(k,2m+1) and Ro(k,2m+2) and has one output Fo(k,2m+2).

The 2:1 Mux YU(k,2m+1) has two inputs namely Ui(k,2m+1) and YUi(k,2m+1) and has one output YUo(k,2m+1). The 2:1 Mux U(k,2m+1) has two inputs namely YUo(k,2m+1) and Fo(k,2m+1) and has one output Uo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely Uo(k,2m+1) and Uo(k,2m+2) and has one output Bo(k,2m+1). The 2:1 Mux B(k,2m+2) has two inputs namely Uo(k,2m+1) and Uo(k,2m+2) and has one output Bo(k,2m+2).

Figure 10F:
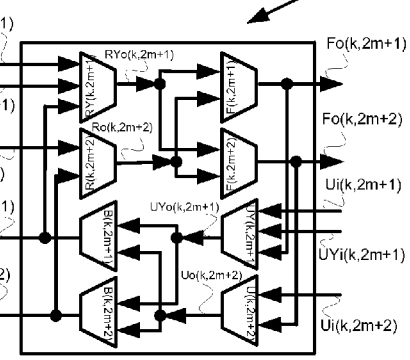
FIG. 10F is a diagram 1000F, in an embodiment of, a stage in a ring of multi-stage hierarchical network corresponding to one block, with delay optimizations.

FIG. 10F illustrates a stage (ring "k", stage "m") 1000F consists of 6 inputs namely Ri(k,2m+1), Ri(k,2m+2), RYi(k,2m+1), Ui(k,2m+1), Ui(k,2m+2), and UYi(k,2m+1); and 4 outputs Bo(k,2m+1), Bo(k,2m+2), Fo(k,2m+1), and Fo(k,2m+2). The stage (ring "k", stage "m") also consists of six 2:1 Muxes namely R(k,2m+2), F(k,2m+1), F(k,2m+2), U(k,2m+2), B(k,2m+1), and B(k,2m+2). The stage (ring "k", stage "m") also consists of two 3:1 Mux namely RY(k,2m+1) and UY(k,2m+1). The 3:1 Mux RY(k,2m+1) has three inputs namely Ri(k,2m+1), RYi(k,2m+1), and Bo(k,2m+1) and has one output RYo(k,2m+1). The 2:1 Mux R(k,2m+2) has two inputs namely Ri(k,2m+2) and Bo(k,2m+2) and has one output Ro(k,2m+2). The 2:1 Mux F(k,2m+1) has two inputs namely RYo(k,2m+1) and Ro(k,2m+2) and has one output Fo(k,2m+1). The 2:1 Mux F(k,2m+2) has two inputs namely RYo(k,2m+1) and Ro(k,2m+2) and has one output Fo(k,2m+2).

The 3:1 Mux UY(k,2m+1) has three inputs namely Ui(k,2m+1), UYi(k,2m+1), and Fo(k,2m+1), and has one output UYo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely UYo(k,2m+1) and Uo(k,2m+2) and has one output Bo(k,2m+1). The 2:1 Mux B(k,2m+2) has two inputs namely UYo(k,2m+1) and Uo(k,2m+2) and has one output Bo(k,2m+2).

Figure 11A:
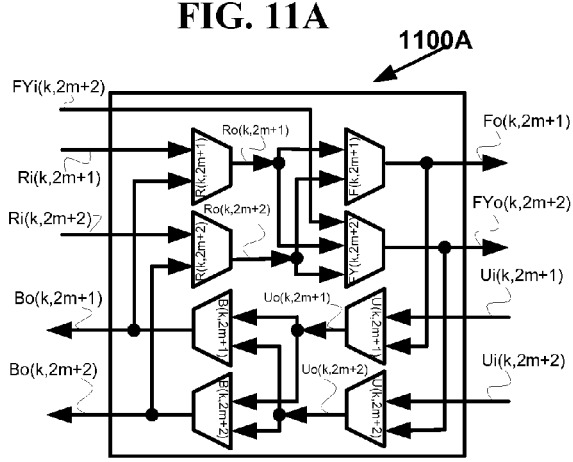
FIG. 11A is a diagram 1100A, in an embodiment of, a stage in a ring of multi-stage hierarchical network corresponding to one block, with delay optimizations.

FIG. 11A illustrates a stage (ring "k", stage "m") 1100A consists of 5 inputs namely Ri(k,2m+1), Ri(k,2m+2), FYi(k,2m+2), Ui(k,2m+1), and Ui(k,2m+2); and 4 outputs Bo(k,2m+1), Bo(k,2m+2), Fo(k,2m+1), and Fo(k,2m+2). The stage (ring "k", stage "m") also consists of seven 2:1 Muxes namely R(k,2m+1), R(k,2m+2), F(k,2m+1), U(k,2m+1), U(k,2m+2), B(k,2m+1), and B(k,2m+2). The stage (ring "k", stage "m") also consists of one 3:1 Mux namely FY(k,2m+2). The 2:1 Mux R(k,2m+1) has two inputs namely Ri(k,2m+1) and Bo(k,2m+1) and has one output Ro(k,2m+1). The 2:1 Mux R(k,2m+2) has two inputs namely Ri(k,2m+2) and Bo(k,2m+2) and has one output Ro(k,2m+2). The 2:1 Mux F(k,2m+1) has two inputs namely Ro(k,2m+1) and Ro(k,2m+2) and has one output Fo(k,2m+1). The 3:1 Mux FY(k,2m+2) has three inputs namely Ro(k,2m+1), Ro(k,2m+2), and FYi(k,2m+2), and has one output FYo(k,2m+2).

The 2:1 Mux U(k,2m+1) has two inputs namely Ui(k,2m+1) and Fo(k,2m+1) and has one output Uo(k,2m+1). The 2:1 Mux U(k,2m+2) has two inputs namely Ui(k,2m+2) and FYo(k,2m+2) and has one output Uo(k,2m+2). The 2:1 Mux B(k,2m+1) has two inputs namely Uo(k,2m+1) and Uo(k,2m+2) and has one output Bo(k,2m+1). The 2:1 Mux B(k,2m+2) has two inputs namely Uo(k,2m+1) and Uo(k,2m+2) and has one output Bo(k,2m+2).

Figure 11B:
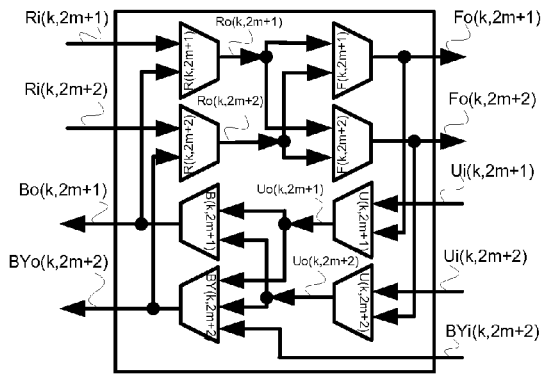
FIG. 11B is a diagram 1100B, in an embodiment of, a stage in a ring of multi-stage hierarchical network corresponding to one block, with delay optimizations.

FIG. 11B illustrates a stage (ring "k", stage "m") 1100B consists of 5 inputs namely Ri(k,2m+1), Ri(k,2m+2), Ui(k,2m+1), Ui(k,2m+2), and BYi(k,2m+2); and 4 outputs Bo(k,2m+1), Bo(k,2m+2), Fo(k,2m+1), and Fo(k,2m+2). The stage (ring "k", stage "m") also consists of seven 2:1 Muxes namely R(k,2m+1), R(k,2m+2), F(k,2m+1), F(k,2m+2), U(k, 2m+1), U(k,2m+2), and B(k,2m+1). The stage (ring "k", stage "m") also consists of one 3:1 Mux namely BY(k,2m+2). The 2:1 Mux R(k,2m+1) has two inputs namely Ri(k,2m+1) and Bo(k,2m+1) and has one output Ro(k,2m+1). The 2:1 Mux R(k,2m+2) has two inputs namely Ri(k,2m+2) and Bo(k,2m+2) and has one output Ro(k,2m+2). The 2:1 Mux F(k,2m+1) has two inputs namely Ro(k,2m+1) and Ro(k,2m+2) and has one output Fo(k,2m+1). The 2:1 Mux F(k,2m+2) has two inputs namely Ro(k,2m+1), and Ro(k,2m+2), and has one output Fo(k,2m+2).

The 2:1 Mux U(k,2m+1) has two inputs namely Ui(k,2m+1) and Fo(k,2m+1) and has one output Uo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely Uo(k,2m+1) and Uo(k,2m+2) and has one output Bo(k,2m+1). The 3:1 Mux BY(k,2m+2) has three inputs namely Uo(k,2m+1), Uo(k,2m+2), and BYi(k,2m+2), and has one output BYo(k,2m+2).

Figure 11C:
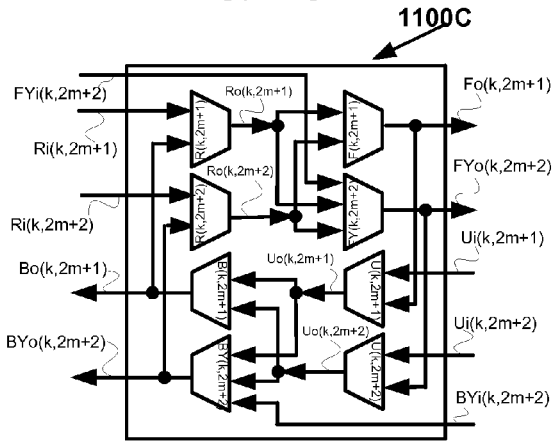
FIG. 11C is a diagram 1100C, in an embodiment of, a stage in a ring of multi-stage hierarchical network corresponding to one block, with delay optimizations.

FIG. 11C illustrates a stage (ring "k", stage "m") 1100C consists of 6 inputs namely Ri(k,2m+1), Ri(k,2m+2), FYi(k,2m+2), Ui(k,2m+1), Ui(k,2m+2), and BYi(k,2m+2); and 4 outputs Bo(k,2m+1), Bo(k,2m+2), Fo(k,2m+1), and Fo(k,2m+2). The stage (ring "k", stage "m") also consists of six 2:1 Muxes namely R(k,2m+1), R(k,2m+2), F(k,2m+1), U(k,2m+1), U(k,2m+2), and B(k,2m+1). The stage (ring "k", stage "m") also consists of two 3:1 Muxes namely FY(k,2m+2) and BY(k,2m+2). The 2:1 Mux R(k,2m+1) has two inputs namely Ri(k,2m+1) and Bo(k,2m+1) and has one output Ro(k,2m+1). The 2:1 Mux R(k,2m+2) has two inputs namely Ri(k,2m+2) and Bo(k,2m+2) and has one output Ro(k,2m+2). The 2:1 Mux F(k,2m+1) has two inputs namely Ro(k,2m+1) and Ro(k,2m+2) and has one output Fo(k,2m+1). The 3:1 Mux FY(k,2m+2) has three inputs namely Ro(k,2m+1), Ro(k,2m+2), and FYi(k,2m+2), and has one output FYo(k,2m+2).

The 2:1 Mux U(k,2m+1) has two inputs namely Ui(k,2m+1) and Fo(k,2m+1) and has one output Uo(k,2m+1). The 2:1 Mux U(k,2m+2) has two inputs namely Ui(k,2m+2) and FYo(k,2m+2) and has one output Uo(k,2m+2). The 2:1 Mux B(k,2m+1) has two inputs namely Uo(k,2m+1) and Uo(k,2m+2) and has one output Bo(k,2m+1). The 3:1 Mux BY(k,2m+2) has three inputs namely Uo(k,2m+1), Uo(k,2m+2), and BYi(k,2m+2) and has one output BYo(k,2m+2).

Figure 12:
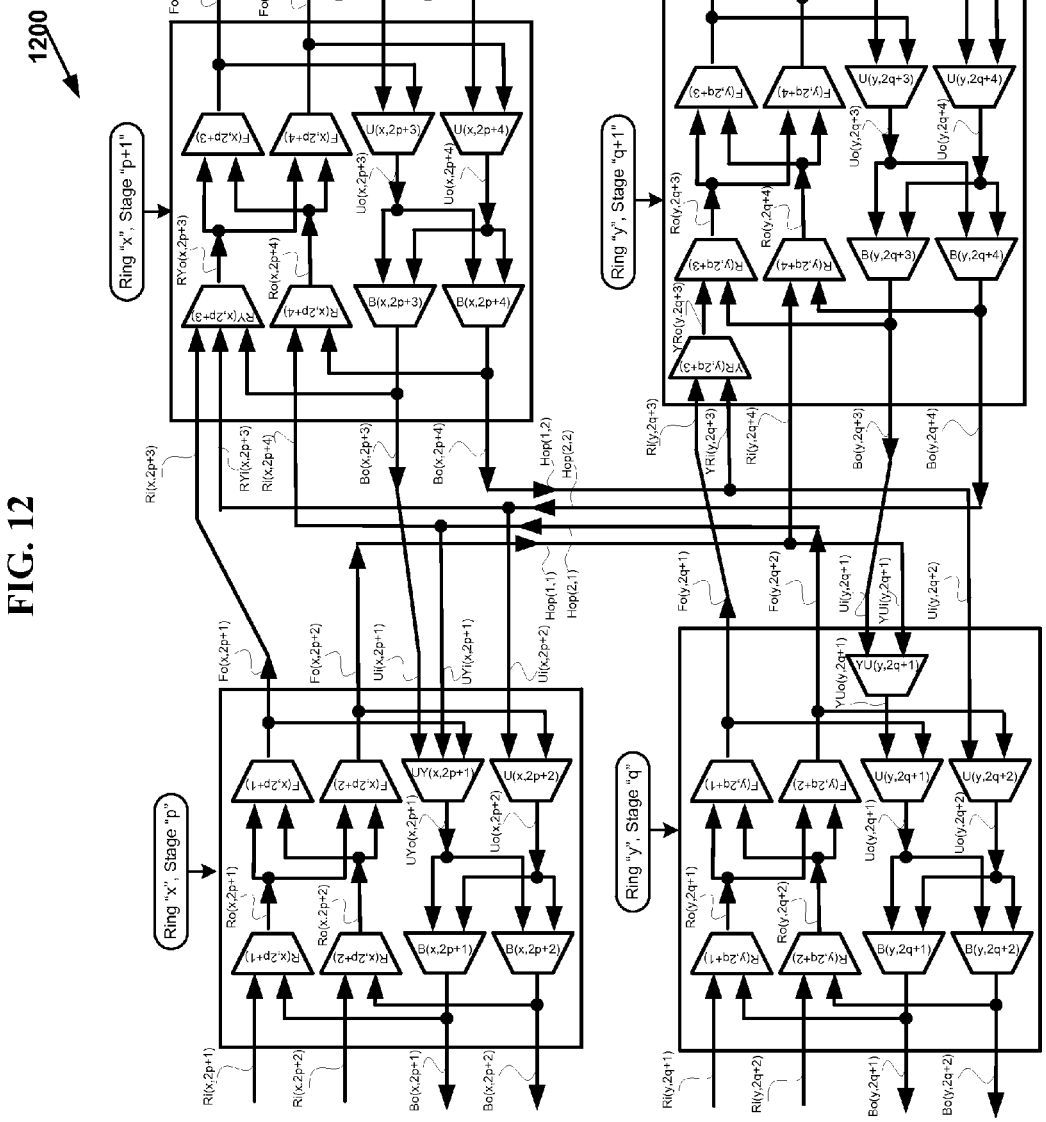
FIG. 12 is a diagram 1200, in an embodiment, all the connections between two successive stages of two different rings in the same block or in two different blocks of a multi-stage hierarchical network with delay optimizations.

Referring to diagram 1200 in FIG. 12, illustrates all the connections between two arbitrary successive stages of a ring namely the stages (ring "x", stage "p") and (ring "x", stage "p+1") and two other arbitrary successive stages of any other ring namely the stages (ring "y", stage "q") and (ring "y", stage "q+1"), of the complete multi-stage hierarchical network $V_{D\text{-}Comb}$ ($N_1$, $N_2$, d, s).

The stage (ring "x", stage "p") consists of 5 inputs namely Ri(x,2p+1), Ri(x,2p+2), Ui(x,2p+1), Ui(x,2p+2), and UYi(x,2p+1); and 4 outputs Bo(x,2p+1), Bo(x,2p+2), Fo(x,2p+1), and Fo(x,2p+2). The stage (ring "x", stage "p") also consists of seven 2:1 Muxes namely R(x,2p+1), R(x,2p+2), F(x,2p+1), F(x,2p+2), U(x,2p+2), B(x,2p+1), and B(x,2p+2). The stage (ring "x", stage "p") also consists of one 3:1 Mux namely UY(x,2p+1). The 2:1 Mux R(x,2p+1) has two inputs namely Ri(x,2p+1) and Bo(x,2p+1) and has one output Ro(x,2p+1). The 2:1 Mux R(x,2p+2) has two inputs namely Ri(x,2p+2) and Bo(x,2p+2) and has one output Ro(x,2p+2). The 2:1 Mux F(x,2p+1) has two inputs namely Ro(x,2p+1) and Ro(x,2p+2) and has one output Fo(x,2p+1). The 2:1 Mux F(x,2p+2) has two inputs namely Ro(x,2p+1) and Ro(x,2p+2) and has one output Fo(x,2p+2).

The 3:1 Mux UY(x,2p+1) has three inputs namely Ui(x,2p+1), UYi(x,2p+1), and Fo(x,2p+1), and has one output UYo(x,2p+1). The 2:1 Mux U(x,2p+2) has two inputs Ui(x,2p+2) and Fo(x,2p+2) and has one output Uo(x,2p+2). The 2:1 Mux B(x,2p+1) has two inputs namely UYo(x,2p+1) and Uo(x,2p+2) and has one output Bo(x,2p+1). The 2:1 Mux B(x,2p+2) has two inputs namely UYo(x,2p+1) and Uo(x,2p+2) and has one output Bo(x,2p+2).

The stage (ring "x", stage "p+1") consists of 5 inputs namely Ri(x,2p+3), Ri(x,2p+4), RYi(x,2p+3), Ui(x,2p+3), and Ui(x,2p+4); and 4 outputs Bo(x,2p+3), Bo(x,2p+4), Fo(x,2p+3), and Fo(x,2p+4). The stage (ring "x", stage "p+1") also consists of seven 2:1 Muxes namely R(x,2p+4), F(x,2p+3), F(x,2p+4), U(x,2p+3), U(x,2p+4), B(x,2p+3), and B(x,2p+4). The stage (ring "x", stage "p+1") also consists of one 3:1 Mux namely RY(x,2p+3). The 3:1 Mux RY(x,2p+3) has three inputs namely Ri(x,2p+3), RYi(x,2p+3), and Bo(x,2p+3), and has one output RYo(x,2p+3). The 2:1 Mux R(x,2p+4) has two inputs namely Ri(x,2p+4) and Bo(x,2p+4) and has one output Ro(x,2p+4). The 2:1 Mux F(x,2p+3) has two inputs namely RYo(x,2p+3) and Ro(x,2p+4) and has one output Fo(x,2p+3). The 2:1 Mux F(x,2p+4) has two inputs namely RYo(x,2p+3) and Ro(x,2p+4) and has one output Fo(x,2p+4).

The 2:1 Mux U(x,2p+3) has two inputs namely Ui(x,2p+3) and Fo(x,2p+3) and has one output Uo(x,2p+3). The 2:1 Mux U(x,2p+4) has two inputs namely Ui(x,2p+4) and Fo(x,2p+4) and has one output Uo(x,2p+4). The 2:1 Mux B(x,2p+3) has two inputs namely Uo(x,2p+3) and Uo(x,2p+4) and has one output Bo(x,2p+3). The 2:1 Mux B(x,2p+4) has two inputs namely Uo(x,2p+3) and Uo(x,2p+4) and has one output Bo(x,2p+4).

The output Fo(x,2p+1) of the stage (ring "x", stage "p") is connected to the input Ri(x,2p+3) of the stage (ring "x", stage "p+1"). And the output Bo(x,2p+3) of the stage (ring "x", stage "p+1") is connected to the input Ui(x,2p+1) of the stage (ring "x", stage "p").

The stage (ring "y", stage "q") consists of 5 inputs namely Ri(y,2q+1), Ri(y,2q+2), Ui(y,2q+1), Ui(y,2q+2), and YUi(y,2q+1); and 4 outputs Bo(y,2q+1), Bo(y,2q+2), Fo(y,2q+1), and Fo(y,2q+2). The stage (ring "y", stage "q") also consists of nine 2:1 Muxes namely R(y,2q+1), R(y,2q+2), F(y,2q+1), F(y,2q+2), YU(y,2q+1), U(y,2q+1), U(y,2q+2), B(y,2q+1), and B(y,2q+2). The 2:1 Mux R(y,2q+1) has two inputs namely Ri(y,2q+1) and Bo(y,2q+1) and has one output Ro(y,2q+1). The 2:1 Mux R(y,2q+2) has two inputs namely Ri(y,2q+2) and Bo(y,2q+2) and has one output Ro(y,2q+2). The 2:1 Mux F(y,2q+1) has two inputs namely Ro(y,2q+1) and Ro(y,2q+2) and has one output Fo(y,2q+1). The 2:1 Mux F(y,2q+2) has two inputs namely Ro(y,2q+1) and Ro(y,2q+2) and has one output Fo(y,2q+2).

The 2:1 Mux YU(y,2q+1) has two inputs namely Ui(y,2q+1) and YUi(y,2q+1) and has one output YUo(y,2q+1). The 2:1 Mux U(y,2q+1) has two inputs namely YUo(y,2q+1) and Fo(y,2q+1) and has one output Uo(y,2q+1). The 2:1 Mux U(y,2q+2) has two inputs namely Ui(y,2q+2) and Fo(y,2q+2) and has one output Uo(y,2q+2). The 2:1 Mux B(y,2q+1) has two inputs namely Uo(y,2q+1) and Uo(y,2q+2) and has one output Bo(y,2q+1). The 2:1 Mux B(y,2q+2) has two inputs namely Uo(y,2q+1) and Uo(y,2q+2) and has one output Bo(y,2q+2).

The stage (ring "y", stage "q+1") consists of 5 inputs namely Ri(y,2q+3), Ri(y,2q+4), YRi(y,2q+3), Ui(y,2q+3), and Ui(y,2q+4); and 4 outputs Bo(y,2q+3), Bo(y,2q+4), Fo(y,2q+3), and Fo(y,2q+4). The stage (ring "y", stage "q+1") also consists of nine 2:1 Muxes namely R(y,2q+3), R(y,2q+4), YR(y,2q+3), F(y,2q+3), F(y,2q+4), U(y,2q+3), U(y,2q+4), B(y,2q+3), and B(y,2q+4). The 2:1 Mux YR(y,2q+3) has two inputs namely Ri(y,2q+3) and YRi(y,2q+3) and has one output YRo(y,2q+3). The 2:1 Mux R(y,2q+3) has two inputs namely YRo(y,2q+3) and Bo(y,2q+3) and has one output Ro(y,2q+3). The 2:1 Mux R(y,2q+4) has two inputs namely Ri(y,2q+4) and Bo(y,2q+4) and has one output Ro(y,2q+4). The 2:1 Mux F(y,2q+3) has two inputs namely Ro(y,2q+3) and Ro(y,2q+4) and has one output Fo(y,2q+3). The 2:1 Mux F(y,2q+4) has two inputs namely Ro(y,2q+3) and Ro(y,2q+4) and has one output Fo(y,2q+4).

The 2:1 Mux U(y,2q+3) has two inputs namely Ui(y,2q+3) and Fo(y,2q+3) and has one output Uo(y,2q+3). The 2:1 Mux U(y,2q+4) has two inputs namely Ui(y,2q+4) and Fo(y,2q+4) and has one output Uo(y,2q+4). The 2:1 Mux B(y,2q+3) has two inputs namely Uo(y,2q+3) and Uo(y,2q+4) and has one output Bo(y,2q+3). The 2:1 Mux B(y,2q+4) has two inputs namely Uo(y,2q+3) and Uo(y,2q+4) and has one output Bo(y,2q+4).

The output Fo(y,2q+1) of the stage (ring "y", stage "q") is connected to the input Ri(y,2q+3) of the stage (ring "y", stage "q+1"). And the output Bo(y,2q+3) of the stage (ring "y", stage "q+1") is connected to the input Ui(y,2q+1) of the stage (ring "y", stage "q").

The output Fo(x,2p+2) of the stage (ring "x", stage "p") is connected via the wire Hop(1,1) to two inputs namely input Ri(y,2q+4) of the stage (ring "y", stage "q+1") and input YUi(y,2q+1) of the stage (ring "y", stage "q"). The output Bo(x,2p+4) of the stage (ring "x", stage "p+1") is connected via the wire Hop(1,2) to two inputs namely input Ui(y,2q+2) of the stage (ring "y", stage "q") and input YRi(y,2q+3) of the stage (ring "y", stage "q+1").

The output Fo(y,2q+2) of the stage (ring "y", stage "q") is connected via the wire Hop(2,1) to two inputs namely input Ri(x,2p+4) of the stage (ring "x", stage "p+1") and input UYi(x,2p+1) of the stage (ring "x", stage "p"). The output Bo(y,2q+4) of the stage (ring "y", stage "q+1") is connected via the wire Hop(2,2) to two inputs namely input Ui(x,2p+2) of the stage (ring "x", stage "p") and input RYi(x,2p+3) of the stage (ring "x", stage "p+1").

Figure 13:
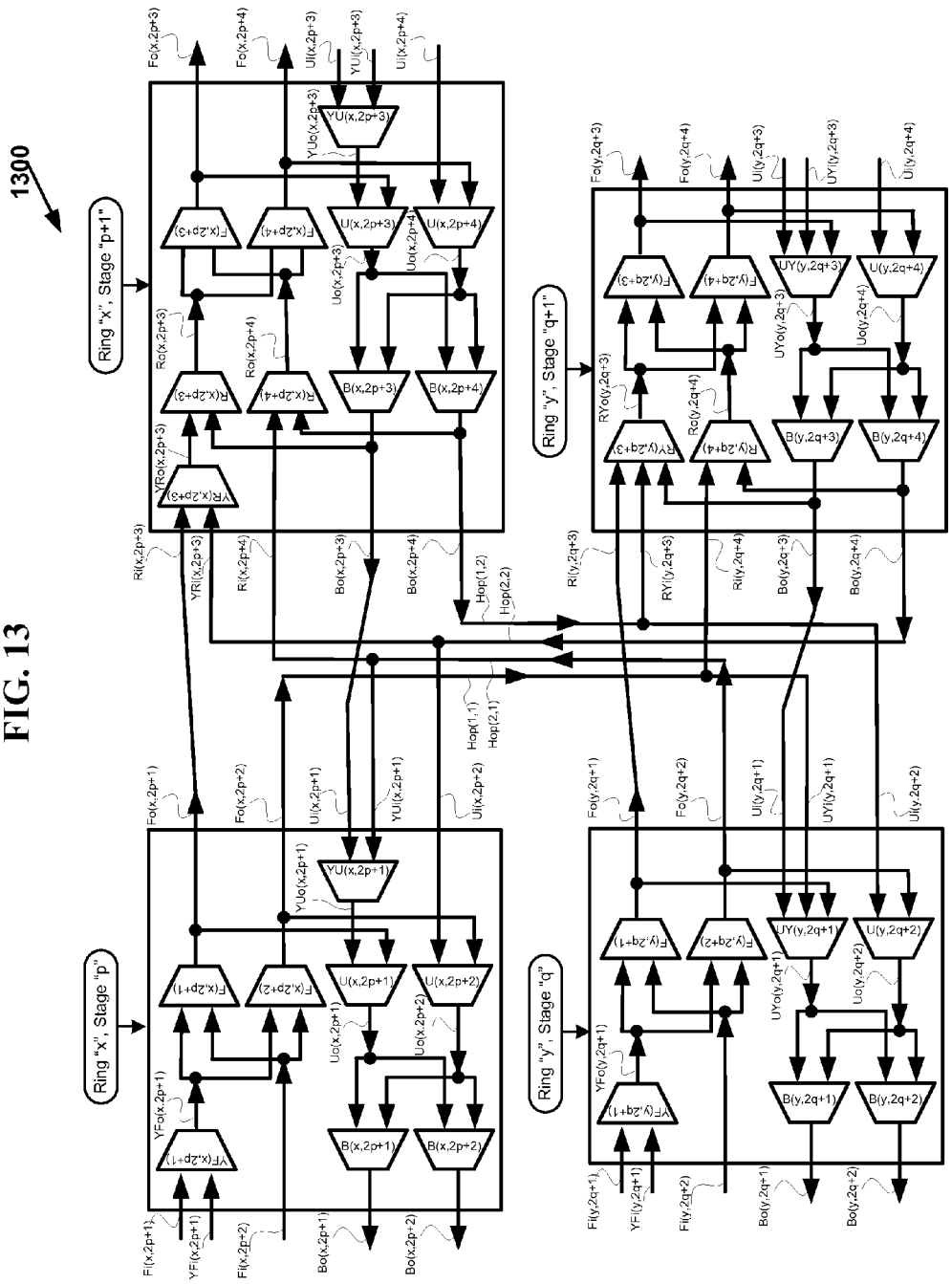
FIG. 13 is a diagram 1300, in one embodiment, all the connections between two successive stages of two different rings in the same block or in two different blocks of a multi-stage hierarchical network with delay optimizations.

Referring to diagram 1300 in FIG. 13, illustrates all the connections between two arbitrary successive stages of a ring namely the stages (ring "x", stage "p") and (ring "x", stage "p+1") and two other arbitrary successive stages of any other ring namely the stages (ring "y", stage "q") and (ring "y", stage "q+1"), of the complete multi-stage hierarchical network $V_{D\text{-}Comb}$ ($N_1$, $N_2$, d, s).

The stage (ring "x", stage "p") consists of 6 inputs namely Fi(x,2p+1), Fi(x,2p+2), YFi(x,2p+1), Ui(x,2p+1), Ui(x,2p+2), and YUi(x,2p+1); and 4 outputs Bo(x,2p+1), Bo(x,2p+2), Fo(x,2p+1), and Fo(x,2p+2). The stage (ring "x", stage "p") also consists of eight 2:1 Muxes namely F(x,2p+1), F(x,2p+2), YF(x,2p+1), U(x,2p+1), U(x,2p+2), YU(x,2p+1), B(x,2p+1), and B(x,2p+2). The 2:1 Mux YF(x,2p+1) has two inputs namely Fi(x,2p+1) and YFi(x,2p+1) and has one output YFo(x,2p+1). The 2:1 Mux F(x,2p+1) has two inputs namely YFo(x,2p+1) and Fi(x,2p+2) and has one output Fo(x,2p+1). The 2:1 Mux F(x,2p+2) has two inputs namely YFo(x,2p+1) and Fi(x,2p+2) and has one output Fo(x,2p+2).

The 2:1 Mux YU(x,2p+1) has two inputs namely Ui(x,2p+1) and YUi(x,2p+1) and has one output YUo(x,2p+1). The 2:1 Mux U(x,2p+1) has two inputs namely YUo(x,2p+1) and Fo(x,2p+1) and has one output Uo(x,2p+1). The 2:1 Mux U(x,2p+2) has two inputs namely Ui(x,2p+2) and Fo(x,2p+2) and has one output Uo(x,2p+2). The 2:1 Mux B(x,2p+1) has two inputs namely Uo(x,2p+1) and Uo(x,2p+2) and has one output Bo(x,2p+1). The 2:1 Mux B(x,2p+2) has two inputs namely Uo(x,2p+1) and Uo(x,2p+2) and has one output Bo(x,2p+2).

The stage (ring "x", stage "p+1") consists of 6 inputs namely Ri(x,2p+3), Ri(x,2p+4), YRi(x,2p+3), Ui(x,2p+3), Ui(x,2p+4), and YUi(x,2p+3); and 4 outputs Bo(x,2p+3), Bo(x,2p+4), Fo(x,2p+3), and Fo(x,2p+4). The stage (ring "x", stage "p+1") also consists of ten 2:1 Muxes namely YR(x,2p+3), R(x,2p+3), R(x,2p+4), F(x,2p+3), F(x,2p+4), YU(x,2p+3), U(x,2p+3), U(x,2p+4), B(x,2p+3), and B(x,2p+4). The 2:1 Mux YR(x,2p+3) has two inputs namely Ri(x,2p+3) and YRi(x,2p+3) and has one output YRo(x,2p+3). The 2:1 Mux R(x,2p+3) has two inputs namely YRo(x,2p+3) and Bo(x,2p+3) and has one output Ro(x,2p+3). The 2:1 Mux R(x,2p+4) has two inputs namely Ri(x,2p+4) and Bo(x,2p+4) and has one output Ro(x,2p+4). The 2:1 Mux F(x,2p+3) has two inputs namely Ro(x,2p+3) and Ro(x,2p+4) and has one output Fo(x,2p+3). The 2:1 Mux F(x,2p+4) has two inputs namely Ro(x,2p+3) and Ro(x,2p+4) and has one output Fo(x,2p+4).

The 2:1 Mux YU(x,2p+3) has two inputs namely Ui(x,2p+3) and YUi(x,2p+3) and has one output YUo(x,2p+3). The 2:1 Mux U(x,2p+3) has two inputs namely YUo(x,2p+3) and Fo(x,2p+3) and has one output Uo(x,2p+3). The 2:1 Mux U(x,2p+4) has two inputs namely Ui(x,2p+4) and Fo(x,2p+4) and has one output Uo(x,2p+4). The 2:1 Mux B(x,2p+3) has two inputs namely Uo(x,2p+3) and Uo(x,2p+4) and has one output Bo(x,2p+3). The 2:1 Mux B(x,2p+4) has two inputs namely Uo(x,2p+3) and Uo(x,2p+4) and has one output Bo(x,2p+4).

The output Fo(x,2p+1) of the stage (ring "x", stage "p") is connected to the input Ri(x,2p+3) of the stage (ring "x", stage "p+1"). And the output Bo(x,2p+3) of the stage (ring "x", stage "p+1") is connected to the input Ui(x,2p+1) of the stage (ring "x", stage "p").

The stage (ring "y", stage "q") consists of 6 inputs namely Fi(y,2q+1), Fi(y,2q+2), YFi(y,2q+1), Ui(y,2q+1), Ui(y,2q+2), and UYi(y,2q+1); and 4 outputs Bo(y,2q+1), Bo(y,2q+2), Fo(y,2q+1), and Fo(y,2q+2). The stage (ring "y", stage "q") also consists of six 2:1 Muxes namely F(y,2q+1), F(y,2q+2), YF(y,2q+1), U(y,2q+2), B(y,2q+1), and B(y,2q+2). The stage (ring "y", stage "q") also consists of one 3:1 Mux namely UY(y,2q+1). The 2:1 Mux YF(y,2q+1) has two inputs namely Fi(y,2q+1) and YFi(y,2q+1) and has one output YFo(y,2q+1). The 2:1 Mux F(y,2q+1) has two inputs namely YFo(y,2q+1) and Fi(y,2q+2) and has one output Fo(y,2q+1). The 2:1 Mux F(y,2q+2) has two inputs namely YFo(y,2q+1) and Fi(y,2q+2) and has one output Fo(y,2q+2).

The 3:1 Mux UY(y,2q+1) has three inputs namely Ui(y,2q+1), UYi(y,2q+1) and Fo(y,2q+1) and has one output UYo(y,2q+1). The 2:1 Mux U(y,2q+2) has two inputs namely Ui(y,2q+2) and Fo(y,2q+2) and has one output Uo(y,2q+2). The 2:1 Mux B(y,2q+1) has two inputs namely UYo(y,2q+1) and Uo(y,2q+2) and has one output Bo(y,2q+1). The 2:1 Mux B(y,2q+2) has two inputs namely UYo(y,2q+1) and Uo(y,2q+2) and has one output Bo(y,2q+2).

The stage (ring "y", stage "q+1") consists of 6 inputs namely Ri(y,2q+3), Ri(y,2q+4), RYi(y,2q+3), Ui(y,2q+3), Ui(y,2q+4), and UYi(y,2q+3); and 4 outputs Bo(y,2q+3), Bo(y,2q+4), Fo(y,2q+3), and Fo(y,2q+4). The stage (ring "y", stage "2q+1") also consists of six 2:1 Muxes namely R(y,2q+4), F(y,2q+3), F(y,2q+4), U(y,2q+4), B(y,2q+3), and B(y,2q+4). The stage (ring "y", stage "2q+1") also consists of two 3:1 Mux namely RY(y,2q+3) and UY(y,2q+3). The 3:1 Mux RY(y,2q+3) has three inputs namely Ri(y,2q+3), RYi(y,2q+3), and Bo(y,2q+3) and has one output RYo(y,2q+3). The 2:1 Mux R(y,2q+4) has two inputs namely Ri(y,2q+4) and Bo(y,2q+4) and has one output Ro(y,2q+4). The 2:1 Mux F(y,2q+3) has two inputs namely RYo(y,2q+3) and Ro(y,2q+4) and has one output Fo(y,2q+3). The 2:1 Mux F(y,2q+4) has two inputs namely RYo(y,2q+3) and Ro(y,2q+4) and has one output Fo(y,2q+4).

The 3:1 Mux UY(y,2q+3) has three inputs namely Ui(y,2q+3), UYi(y,2q+3), and Fo(y,2q+3), and has one output UYo(y,2q+3). The 2:1 Mux U(y,2q+4) has two inputs namely Ui(y,2q+4) and Fo(y,2q+4) and has one output Uo(y,2q+4). The 2:1 Mux B(y,2q+3) has two inputs namely UYo(y,2q+3) and Uo(y,2q+4) and has one output Bo(y,2q+3). The 2:1 Mux B(y,2q+4) has two inputs namely UYo(y,2q+3) and Uo(y,2q+4) and has one output Bo(y,2q+4).

The output Fo(y,2q+1) of the stage (ring "y", stage "q") is connected to the input Ri(y,2q+3) of the stage (ring "y", stage "q+1"). And the output Bo(y,2q+3) of the stage (ring "y", stage "q+1") is connected to the input Ui(y,2q+1) of the stage (ring "y", stage "q").

The output Fo(x,2p+2) of the stage (ring "x", stage "p") is connected via the wire Hop(1,1) to two inputs namely input Ri(y,2q+4) of the stage (ring "y", stage "q+1") and input UYi(y,2q+1) of the stage (ring "y", stage "q"). The output Bo(x,2p+4) of the stage (ring "x", stage "p+1") is connected via the wire Hop(1,2) to two inputs namely input Ui(y,2q+2) of the stage (ring "y", stage "q") and input RYi(y,2q+3) of the stage (ring "y", stage "q+1").

The output Fo(y,2q+2) of the stage (ring "y", stage "q") is connected via the wire Hop(2,1) to two inputs namely input Ri(x,2p+4) of the stage (ring "x", stage "p+1") and input YUi(x,2p+1) of the stage (ring "x", stage "p"). The output Bo(y,2q+4) of the stage (ring "y", stage "q+1") is connected via the wire Hop(2,2) to two inputs namely input Ui(x,2p+2) of the stage (ring "x", stage "p") and input YRi(x,2p+3) of the stage (ring "x", stage "p+1").

Figure 14:
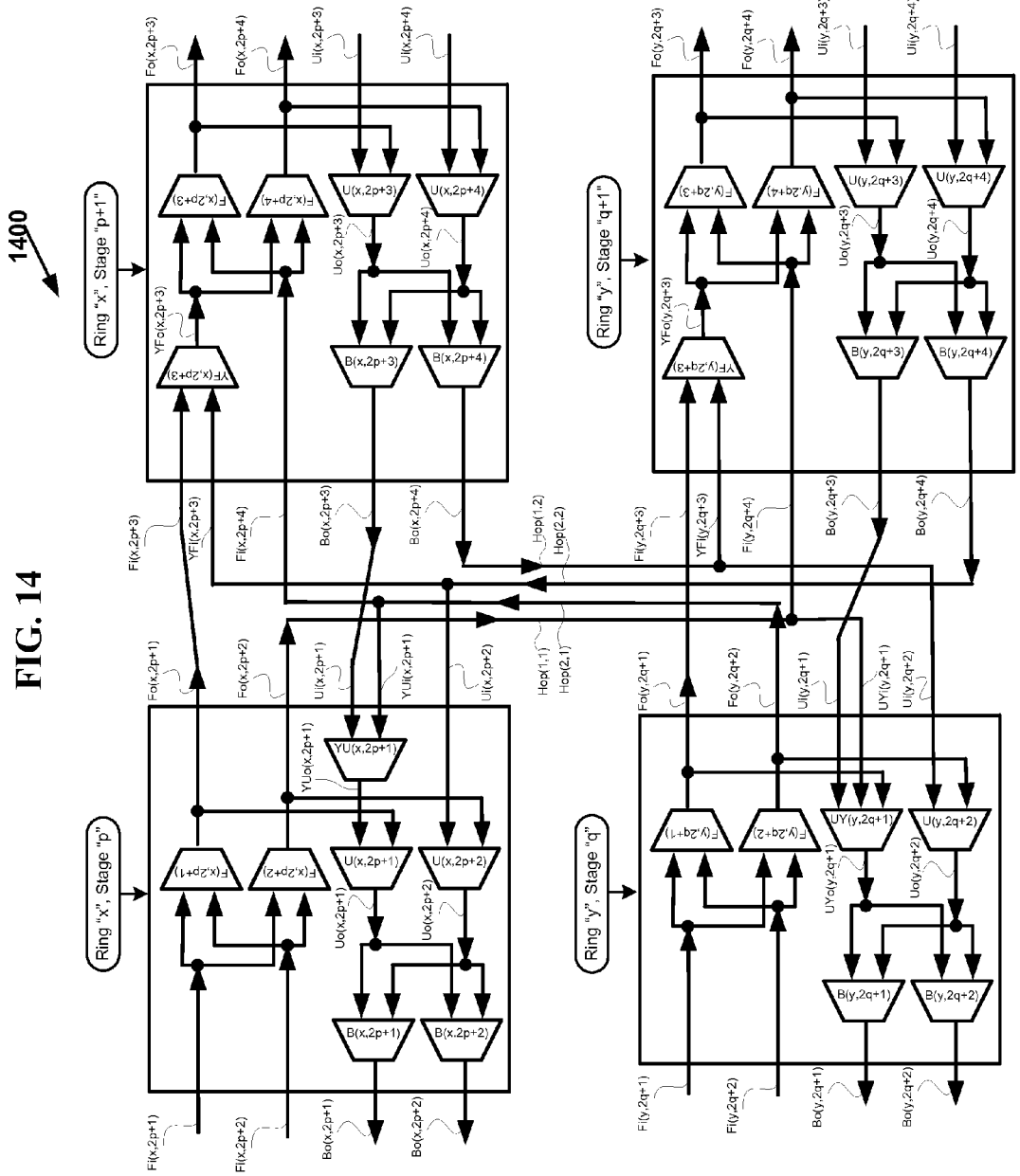
FIG. 14 is a diagram 1400, in an embodiment of, all the connections between two successive stages of two different rings in the same block or in two different blocks of a multi-stage hierarchical network with delay optimizations.
Figure 15:
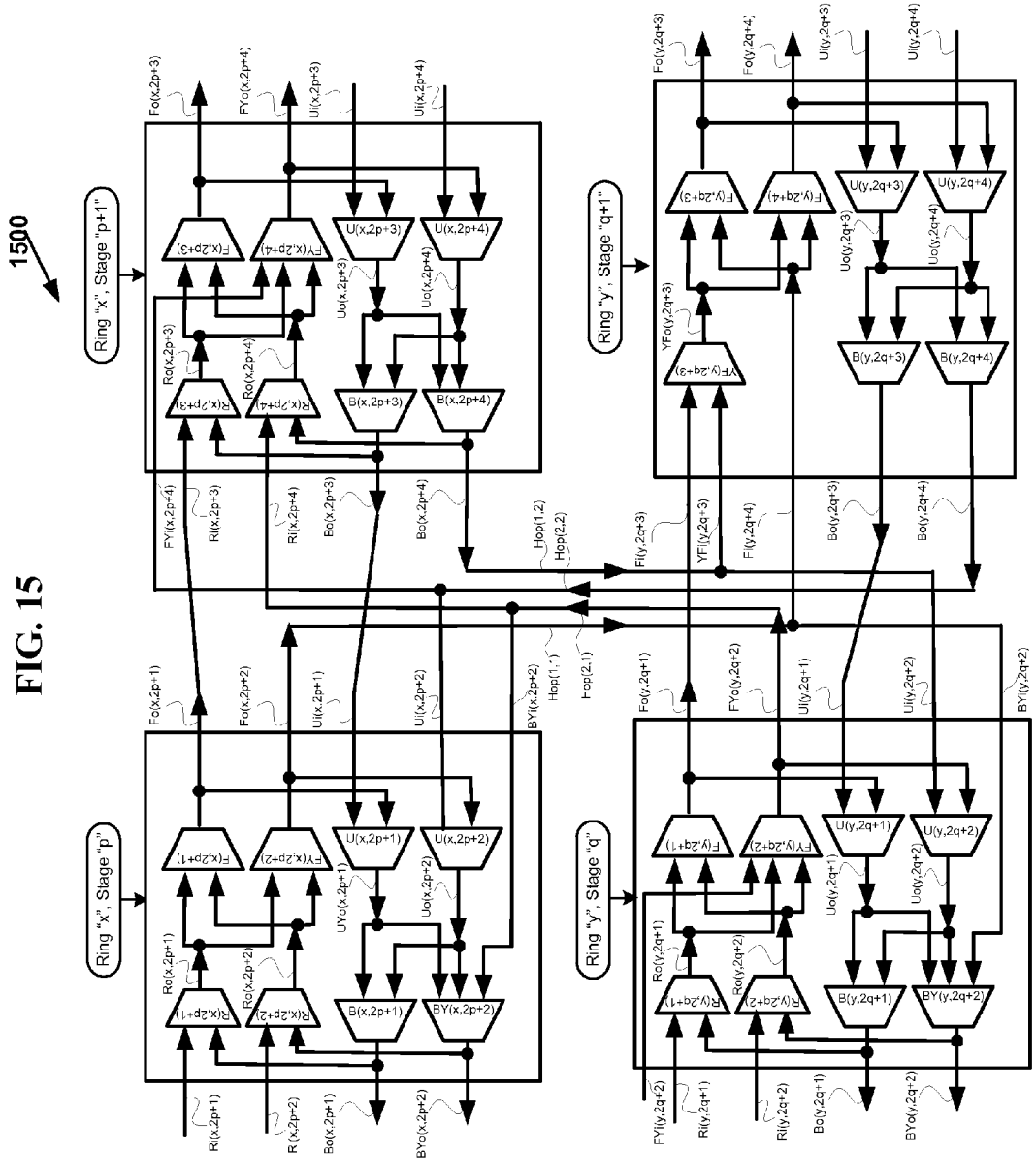
FIG. 15 is a diagram 1500, in an embodiment of, all the connections between two successive stages of two different rings in the same block or in two different blocks of a multi-stage hierarchical network with delay optimizations.

Referring to diagram 1400 in FIG. 14, illustrates all the connections between two arbitrary successive stages of a ring namely the stages (ring "x", stage "p") and (ring "x", stage "p+1") and two other arbitrary successive stages of any other ring namely the stages (ring "y", stage "q") and (ring "y", stage "q+1"), of the complete multi-stage hierarchical network $V_{D\text{-}Comb}$ ($N_1$, $N_2$, d, s).

The stage (ring "x", stage "p") consists of 5 inputs namely Fi(x,2p+1), Fi(x,2p+2), YUi(x,2p+1), Ui(x,2p+1), and Ui(x,2p+2); and 4 outputs Bo(x,2p+1), Bo(x,2p+2), Fo(x,2p+1), and Fo(x,2p+2). The stage (ring "x", stage "p") also consists of seven 2:1 Muxes namely F(x,2p+1), F(x,2p+2), YF(x,2p+1), U(x,2p+1), U(x,2p+2), B(x,2p+1), and B(x,2p+2). The 2:1 Mux F(x,2p+1) has two inputs namely Fi(x,2p+1) and Fi(x,2p+2) and has one output Fo(x,2p+1). The 2:1 Mux F(x,2p+2) has two inputs namely Fi(x,2p+1) and Fi(x,2p+2) and has one output Fo(x,2p+2).

The 2:1 Mux YU(x,2p+1) has two inputs namely Ui(x,2p+1) and YUi(x,2p+1) and has one output YUo(x,2p+1). The 2:1 Mux U(x,2p+1) has two inputs namely YUo(x,2p+1) and Fo(x,2p+1) and has one output Uo(x,2p+1). The 2:1 Mux U(x,2p+2) has two inputs namely Ui(x,2p+2) and Fo(x,2p+2) and has one output Uo(x,2p+2). The 2:1 Mux B(x,2p+1) has two inputs namely Uo(x,2p+1) and Uo(x,2p+2) and has one output Bo(x,2p+1). The 2:1 Mux B(x,2p+2) has two inputs namely Uo(x,2p+1) and Uo(x,2p+2) and has one output Bo(x,2p+2).

The stage (ring "x", stage "p+1") consists of 5 inputs namely Fi(x,2p+3), Fi(x,2p+4), YFi(x,2p+3), Ui(x,2p+3), and Ui(x,2p+4); and 4 outputs Bo(x,2p+3), Bo(x,2p+4), Fo(x,2p+3), and Fo(x,2p+4). The stage (ring "x", stage "p+1") also consists of seven 2:1 Muxes namely YF(x,2p+3), F(x,2p+3), F(x,2p+4), U(x,2p+3), U(x,2p+4), B(x,2p+3), and B(x,2p+4). The 2:1 Mux YF(x,2p+3) has two inputs namely Fi(x,2p+3) and YFi(x,2p+3) and has one output YFo(x,2p+3). The 2:1 Mux F(x,2p+3) has two inputs namely YFo(x,2p+3) and Fi(x,2p+4) and has one output Fo(x,2p+3). The 2:1 Mux F(x,2p+4) has two inputs namely YFo(x,2p+3) and Fi(x,2p+4) and has one output Fo(x,2p+4).

The 2:1 Mux U(x,2p+3) has two inputs namely Ui(x,2p+3) and Fo(x,2p+3) and has one output Uo(x,2p+3). The 2:1 Mux U(x,2p+4) has two inputs namely Ui(x,2p+4) and Fo(x,2p+4) and has one output Uo(x,2p+4). The 2:1 Mux B(x,2p+3) has two inputs namely Uo(x,2p+3) and Uo(x,2p+4) and has one output Bo(x,2p+3). The 2:1 Mux B(x,2p+4) has two inputs namely Uo(x,2p+3) and Uo(x,2p+4) and has one output Bo(x,2p+4).

The output Fo(x,2p+1) of the stage (ring "x", stage "p") is connected to the input Fi(x,2p+3) of the stage (ring "x", stage "p+1"). And the output Bo(x,2p+3) of the stage (ring "x", stage "p+1") is connected to the input Ui(x,2p+1) of the stage (ring "x", stage "p").

The stage (ring "y", stage "q") consists of 5 inputs namely Fi(y,2q+1), Fi(y,2q+2), UYi(y,2q+1), Ui(y,2q+1), and Ui(y,2q+2); and 4 outputs Bo(y,2q+1), Bo(y,2q+2), Fo(y,2q+1), and Fo(y,2q+2). The stage (ring "y", stage "q") also consists of five 2:1 Muxes namely F(y,2q+1), F(y,2q+2), U(y,2q+2), B(y,2q+1), and B(y,2q+2). The stage (ring "y", stage "q") also consists of one 3:1 Mux namely UY(y,2q+1). The 2:1 Mux F(y,2q+1) has two inputs namely Fi(y,2q+1) and Fi(y,2q+2) and has one output Fo(y,2q+1). The 2:1 Mux F(y,2q+2) has two inputs namely Fi(y,2q+1) and Fi(y,2q+2) and has one output Fo(y,2q+2).

The 3:1 Mux UY(y,2q+1) has three inputs namely Ui(y,2q+1), UYi(y,2q+1) and Fo(y,2q+1) and has one output UYo(y,2q+1). The 2:1 Mux U(y,2q+2) has two inputs namely Ui(y,2q+2) and Fo(y,2q+2) and has one output Uo(y,2q+2). The 2:1 Mux B(y,2q+1) has two inputs namely UYo(y,2q+1) and Uo(y,2q+2) and has one output Bo(y,2q+1). The 2:1 Mux B(y,2q+2) has two inputs namely UYo(y,2q+1) and Uo(y,2q+2) and has one output Bo(y,2q+2).

The stage (ring "y", stage "q+1") consists of 5 inputs namely Fi(y,2q+3), Fi(y,2q+4), YFi(y,2q+3), Ui(y,2q+3), and Ui(y,2q+4); and 4 outputs Bo(y,2q+3), Bo(y,2q+4), Fo(y,2q+3), and Fo(y,2q+4). The stage (ring "y", stage "q+1") also consists of seven 2:1 Muxes namely YF(y,2q+3), F(y,2q+3), F(y,2q+4), U(y,2q+3), U(y,2q+4), B(y,2q+3), and B(y,2q+4). The 2:1 Mux YF(y,2q+3) has two inputs namely Fi(y,2q+3) and YFi(y,2q+3) and has one output YFo(y,2q+3). The 2:1 Mux F(y,2q+3) has two inputs namely YFo(y,2q+3) and Fi(y,2q+4) and has one output Fo(y,2q+3). The 2:1 Mux F(y,2q+4) has two inputs namely YFo(y,2q+3) and Fi(y,2q+4) and has one output Fo(y,2q+4).

The 2:1 Mux U(y,2q+3) has two inputs namely Ui(y,2q+3) and Fo(y,2q+3) and has one output Uo(y,2q+3). The 2:1 Mux U(y,2q+4) has two inputs namely Ui(y,2q+4) and Fo(y,2q+4) and has one output Uo(y,2q+4). The 2:1 Mux B(y,2q+3) has two inputs namely Uo(y,2q+3) and Uo(y,2q+4) and has one output Bo(y,2q+3). The 2:1 Mux B(y,2q+4) has two inputs namely Uo(y,2q+3) and Uo(y,2q+4) and has one output Bo(y,2q+4).

The output Fo(y,2q+1) of the stage (ring "y", stage "q") is connected to the input Fi(y,2q+3) of the stage (ring "y", stage "q+1"). And the output Bo(y,2q+3) of the stage (ring "y", stage "q+1") is connected to the input Ui(y,2q+1) of the stage (ring "y", stage "q").

The output Fo(x,2p+2) of the stage (ring "x", stage "p") is connected via the wire Hop(1,1) to two inputs namely input Fi(y,2q+4) of the stage (ring "y", stage "q+1") and input UYi(y,2q+1) of the stage (ring "y", stage "q"). The output Bo(x,2p+4) of the stage (ring "x", stage "p+1") is connected via the wire Hop(1,2) to two inputs namely input Ui(y,2q+2) of the stage (ring "y", stage "q") and input YFi(y,2q+3) of the stage (ring "y", stage "q+1").

The output Fo(y,2q+2) of the stage (ring "y", stage "q") is connected via the wire Hop(2,1) to two inputs namely input Fi(x,2p+4) of the stage (ring "x", stage "p+1") and input YUi(x,2p+1) of the stage (ring "x", stage "p"). The output Bo(y,2q+4) of the stage (ring "y", stage "q+1") is connected via the wire Hop(2,2) to two inputs namely input Ui(x,2p+2) of the stage (ring "x", stage "p") and input YFi(x,2p+3) of the stage (ring "x", stage "p+1").

Referring to diagram 1500 in FIG. 15, illustrates all the connections between two arbitrary successive stages of a ring namely the stages (ring "x", stage "p") and (ring "x", stage "p+1") and two other arbitrary successive stages of any other ring namely the stages (ring "y", stage "q") and (ring "y", stage "q+1"), of the complete multi-stage hierarchical network $V_{D-Comb}$ ($N_1$, $N_2$, d, s).

The stage (ring "x", stage "p") consists of 5 inputs namely Ri(x,2p+1), Ri(x,2p+2), Ui(x,2p+1), Ui(x,2p+2), and BYi(x,2p+2); and 4 outputs Bo(x,2p+1), Bo(x,2p+2), Fo(x,2p+1), and Fo(x,2p+2). The stage (ring "x", stage "p") also consists of seven 2:1 Muxes namely R(x,2p+1), R(x,2p+2), F(x,2p+1), F(x,2p+2), U(x,2p+1), U(x,2p+2), and B(x,2p+1). The stage (ring "x", stage "p") also consists of one 3:1 Mux namely BY(x,2p+2). The 2:1 Mux R(x,2p+1) has two inputs namely Ri(x,2p+1) and Bo(x,2p+1) and has one output Ro(x,2p+1). The 2:1 Mux R(x,2p+2) has two inputs namely Ri(x,2p+2) and Bo(x,2p+2) and has one output Ro(x,2p+2). The 2:1 Mux F(x,2p+1) has two inputs namely Ro(x,2p+1) and Ro(x,2p+2) and has one output Fo(x,2p+1). The 2:1 Mux F(x,2p+2) has two inputs namely Ro(x,2p+1), and Ro(x,2p+2), and has one output Fo(x,2p+2).

The 2:1 Mux U(x,2p+1) has two inputs namely Ui(x,2p+1) and Fo(x,2p+1) and has one output Uo(x,2p+1). The 2:1 Mux U(x,2p+2) has two inputs namely Ui(x,2p+2) and Fo(x,2p+2) and has one output Uo(x,2p+2). The 2:1 Mux B(x,2p+1) has two inputs namely Uo(x,2p+1) and Uo(x,2p+2) and has one output Bo(x,2p+1). The 3:1 Mux BY(x,2p+2) has three inputs namely Uo(x,2p+1), Uo(x,2p+2), and BYi(x,2p+2), and has one output BYo(x,2p+2).

The stage (ring "x", stage "p+1") consists of 5 inputs namely Ri(x,2p+3), Ri(x,2p+4), FYi(x,2p+4), Ui(x,2p+3), and Ui(x,2p+4); and 4 outputs Bo(x,2p+3), Bo(x,2p+4), Fo(x,2p+3), and Fo(x,2p+4). The stage (ring "x", stage "p+1") also consists of seven 2:1 Muxes namely R(x,2p+3), R(x,2p+4), F(x,2p+3), U(x,2p+3), U(x,2p+4), B(x,2p+3), and B(x,2p+4). The stage (ring "x", stage "p+1") also consists of one 3:1 Mux namely FY(x,2p+4). The 2:1 Mux R(x,2p+3) has two inputs namely Ri(x,2p+3) and Bo(x,2p+3) and has one output Ro(x,2p+3). The 2:1 Mux R(x,2p+4) has two inputs namely Ri(x,2p+4) and Bo(x,2p+4) and has one output Ro(x,2p+4). The 2:1 Mux F(x,2p+3) has two inputs namely Ro(x,2p+3) and Ro(x,2p+4) and has one output Fo(x,2p+3). The 3:1 Mux FY(x,2p+4) has three inputs namely Ro(x,2p+3), Ro(x,2p+4), and FYi(x,2p+4), and has one output FYo(x,2p+4).

The 2:1 Mux U(x,2p+3) has two inputs namely Ui(x,2p+3) and Fo(x,2p+3) and has one output Uo(x,2p+3). The 2:1 Mux U(x,2p+4) has two inputs namely Ui(x,2p+4) and FYo(x,2p+4) and has one output Uo(x,2p+4). The 2:1 Mux B(x,2p+3) has two inputs namely Uo(x,2p+3) and Uo(x,2p+4) and has one output Bo(x,2p+3). The 2:1 Mux B(x,2p+4) has two inputs namely Uo(x,2p+3) and Uo(x,2p+4) and has one output Bo(x,2p+4).

The output Fo(x,2p+1) of the stage (ring "x", stage "p") is connected to the input Ri(x,2p+3) of the stage (ring "x", stage "p+1"). And the output Bo(x,2p+3) of the stage (ring "x", stage "p+1") is connected to the input Ui(x,2p+1) of the stage (ring "x", stage "p").

The stage (ring "y", stage "q") consists of 6 inputs namely Ri(y,2q+1), Ri(y,2q+2), FYi(y,2q+2), Ui(y,2q+1), Ui(y,2q+2), and BYi(y,2q+2); and 4 outputs Bo(y,2q+1), Bo(y,2q+2), Fo(y,2q+1), and Fo(y,2q+2). The stage (ring "y", stage "q") also consists of six 2:1 Muxes namely R(y,2q+1), R(y,2q+2), F(y,2q+1), U(y,2q+1), U(y,2q+2), and B(y,2q+1). The stage (ring "y", stage "q") also consists of two 3:1 Muxes namely FY(y,2q+2) and BY(y,2q+2). The 2:1 Mux R(y,2q+1) has two inputs namely Ri(y,2q+1) and Bo(y,2q+1) and has one output Ro(y,2q+1). The 2:1 Mux R(y,2q+2) has two inputs namely Ri(y,2q+2) and Bo(y,2q+2) and has one output Ro(y,2q+2). The 2:1 Mux F(y,2q+1) has two inputs namely Ro(y,2q+1) and Ro(y,2q+2) and has one output Fo(y,2q+1). The 3:1 Mux FY(y,2q+2) has three inputs namely Ro(y,2q+1), Ro(y,2q+2), and FYi(y,2q+2), and has one output FYo(y,2q+2).

The 2:1 Mux U(y,2q+1) has two inputs namely Ui(y,2q+1) and Fo(y,2q+1) and has one output Uo(y,2q+1). The 2:1 Mux U(y,2q+2) has two inputs namely Ui(y,2q+2) and FYo(y,2q+2) and has one output Uo(y,2q+2). The 2:1 Mux B(y,2q+1) has two inputs namely Uo(y,2q+1) and Uo(y,2q+2) and has one output Bo(y,2q+1). The 3:1 Mux BY(y,2q+2) has three inputs namely Uo(y,2q+1), Uo(y,2q+2), and BYi(y,2q+2) and has one output BYo(y,2q+2).

The stage (ring "y", stage "q+1") consists of 5 inputs namely Fi(y,2q+3), Fi(y,2q+4), YFi(y,2q+3), Ui(y,2q+3), and Ui(y,2q+4); and 4 outputs Bo(y,2q+3), Bo(y,2q+4), Fo(y,2q+3), and Fo(y,2q+4). The stage (ring "y", stage "q+1") also consists of seven 2:1 Muxes namely YF(y,2q+3), F(y,2q+3), F(y,2q+4), U(y,2q+3), U(y,2q+4), B(y,2q+3), and B(y,2q+4). The 2:1 Mux YF(y,2q+3) has two inputs namely Fi(y,2q+3) and YFi(y,2q+3) and has one output YFo(y,2q+3). The 2:1 Mux F(y,2q+3) has two inputs namely YFo(y,2q+3) and Fi(y,2q+4) and has one output Fo(y,2q+3). The 2:1 Mux F(y,2q+4) has two inputs namely YFo(y,2q+3) and Fi(y,2q+4) and has one output Fo(y,2q+4).

The 2:1 Mux U(y,2q+3) has two inputs namely Ui(y,2q+3) and Fo(y,2q+3) and has one output Uo(y,2q+3). The 2:1 Mux U(y,2q+4) has two inputs namely Ui(y,2q+4) and Fo(y,2q+4) and has one output Uo(y,2q+4). The 2:1 Mux B(y,2q+3) has two inputs namely Uo(y,2q+3) and Uo(y,2q+4) and has one output Bo(y,2q+3). The 2:1 Mux B(y,2q+4) has two inputs namely Uo(y,2q+3) and Uo(y,2q+4) and has one output Bo(y,2q+4).

The output Fo(y,2q+1) of the stage (ring "y", stage "q") is connected to the input Fi(y,2q+3) of the stage (ring "y", stage "q+1"). And the output Bo(y,2q+3) of the stage (ring "y", stage "q+1") is connected to the input Ui(y,2q+1) of the stage (ring "y", stage "q").

The output Fo(x,2p+2) of the stage (ring "x", stage "p") is connected via the wire Hop(1,1) to two inputs namely input Fi(y,2q+4) of the stage (ring "y", stage "q+1") and input BYi(y,2q+1) of the stage (ring "y", stage "q"). The output Bo(x,2p+4) of the stage (ring "x", stage "p+1") is connected via the wire Hop(1,2) to two inputs namely input Ui(y,2q+2) of the stage (ring "y", stage "q") and input YFi(y,2q+3) of the stage (ring "y", stage "q+1").

The output Fo(y,2q+2) of the stage (ring "y", stage "q") is connected via the wire Hop(2,1) to two inputs namely input Ri(x,2p+4) of the stage (ring "x", stage "p+1") and input BYi(x,2p+1) of the stage (ring "x", stage "p"). The output Bo(y,2q+4) of the stage (ring "y", stage "q+1") is connected via the wire Hop(2,2) to two inputs namely input Ui(x,2p+2) of the stage (ring "x", stage "p") and input YFi(x,2p+4) of the stage (ring "x", stage "p+1").

In accordance with the current invention, either partial multi-stage hierarchical network $V_{D\text{-}Comb}$ ($N_1$, $N_2$, d, s) 100A of FIG. 1A or partial multi-stage hierarchical network $V_{D\text{-}Comb}$ ($N_1$, $N_2$, d, s) 100B of FIG. 1B, corresponding to a block of 2D-grid of blocks 800 of FIG. 8, using any one of the embodiments of 200A-200E of FIGS. 2A-2E, 900A-900E of FIGS. 9A-9E, 1000A-1000F of FIGS. 10A-10F, 1100A-1100C of FIGS. 11A-11C to implement a stage of a ring of the multi-stage hierarchical network, by using the hop wire connection chart 700 of FIG. 7 and the hop wire connections between two arbitrary successive stages in two different rings of the same block or two different rings of different blocks described in diagram 700 of FIG. 7 may be any one of the embodiments of either the diagrams 300A of FIG. 3A, 300B of FIG. 3B, 400 of FIG. 4, 500 of FIG. 5, 600 of FIG. 6, 1200 of FIG. 12, 1300 of FIG. 13, 1400 of FIGS. 14, and 1500 of FIG. 15 is very efficient in the reduction of the die size, power consumption, and highly optimized for lower wire/path delay for higher performance for practical routing applications to particularly to set up broadcast, unicast and multicast connections. In general in accordance with the current invention, where $N_1$ and $N_2$ of the complete multi-stage hierarchical network $V_{D\text{-}Comb}$ ($N_1$, $N_2$, d, s) may be arbitrarily large in size and also the 2D-grid size 800 may also be arbitrarily large in size in terms of both the number of rows and number of columns.

1) Programmable Integrated Circuit Embodiments

All the embodiments disclosed in the current invention are useful in programmable integrated circuit applications. FIG. 16A2 illustrates the detailed diagram 1600A2 for the implementation of the diagram 1600A1 in programmable integrated circuit embodiments. Each crosspoint is implemented by a transistor coupled between the corresponding inlet link and outlet link, and a programmable cell in programmable integrated circuit embodiments. Specifically crosspoint CP(1,1) is implemented by transistor C(1,1) coupled between inlet link IL1 and outlet link OL1, and programmable cell P(1,1); crosspoint CP(1,2) is implemented by transistor C(1, 2) coupled between inlet link IL1 and outlet link OL2, and programmable cell P(1,2); crosspoint CP(2,1) is implemented by transistor C(2,1) coupled between inlet link IL2 and outlet link OL1, and programmable cell P(2,1); and crosspoint CP(2,2) is implemented by transistor C(2,2) coupled between inlet link IL2 and outlet link OL2, and programmable cell P(2,2).

If the programmable cell is programmed ON, the corresponding transistor couples the corresponding inlet link and outlet link. If the programmable cell is programmed OFF, the corresponding inlet link and outlet link are not connected. For example if the programmable cell P(1,1) is programmed ON, the corresponding transistor C(1,1) couples the corresponding inlet link IL1 and outlet link OL1. If the programmable cell P(1,1) is programmed OFF, the corresponding inlet link IL1 and outlet link OL1 are not connected. In volatile programmable integrated circuit embodiments the programmable cell may be an SRAM (Static Random Address Memory) cell. In non-volatile programmable integrated circuit embodiments the programmable cell may be a Flash memory cell. Also the programmable integrated circuit embodiments may implement field programmable logic arrays (FPGA) devices, or programmable Logic devices (PLD), or Application Specific Integrated Circuits (ASIC) embedded with programmable logic circuits or 3D-FPGAs.

FIG. 16A2 also illustrates a buffer B1 on inlet link IL2. The signals driven along inlet link IL2 are amplified by buffer B1. Buffer B1 can be inverting or non-inverting buffer. Buffers such as B1 are used to amplify the signal in links which are usually long.

In other embodiments all the d*d switches described in the current invention are also implemented using muxes of different sizes controlled by SRAM cells or flash cells etc.

2) One-Time Programmable Integrated Circuit Embodiments

All the embodiments disclosed in the current invention are useful in one-time programmable integrated circuit applications. FIG. 16A3 illustrates the detailed diagram 1600A3 for the implementation of the diagram 1600A1 in one-time programmable integrated circuit embodiments. Each crosspoint is implemented by a via coupled between the corresponding inlet link and outlet link in one-time programmable integrated circuit embodiments. Specifically crosspoint CP(1,1) is implemented by via V(1,1) coupled between inlet link IL1 and outlet link OL1; crosspoint CP(1,2) is implemented by via V(1,2) coupled between inlet link IL1 and outlet link OL2; crosspoint CP(2,1) is implemented by via V(2,1) coupled between inlet link IL2 and outlet link OL1; and crosspoint CP(2,2) is implemented by via V(2,2) coupled between inlet link IL2 and outlet link OL2.

If the via is programmed ON, the corresponding inlet link and outlet link are permanently connected which is denoted by thick circle at the intersection of inlet link and outlet link. If the via is programmed OFF, the corresponding inlet link and outlet link are not connected which is denoted by the absence of thick circle at the intersection of inlet link and outlet link. For example in the diagram 1600A3 the via V(1,1) is programmed ON, and the corresponding inlet link IL1 and outlet link OL1 are connected as denoted by thick circle at the intersection of inlet link IL1 and outlet link OL1; the via V(2,2) is programmed ON, and the corresponding inlet link IL2 and outlet link OL2 are connected as denoted by thick circle at the intersection of inlet link IL2 and outlet link OL2; the via V(1,2) is programmed OFF, and the corresponding inlet link IL1 and outlet link OL2 are not connected as denoted by the absence of thick circle at the intersection of inlet link IL1 and outlet link OL2; the via V(2,1) is programmed OFF, and the corresponding inlet link IL2 and outlet link OL1 are not connected as denoted by the absence of thick circle at the intersection of inlet link IL2 and outlet link OL1. One-time programmable integrated circuit embodiments may be anti-fuse based programmable integrated circuit devices or mask programmable structured ASIC devices.

3) Integrated Circuit Placement and Route Embodiments

All the embodiments disclosed in the current invention are useful in Integrated Circuit Placement and Route applications, for example in ASIC backend Placement and Route tools. FIG. 16A4 illustrates the detailed diagram 1600A4 for the implementation of the diagram 1600A1 in Integrated Circuit Placement and Route embodiments. In an integrated circuit since the connections are known a-priori, the switch and crosspoints are actually virtual. However the concept of virtual switch and virtual crosspoint using the embodiments disclosed in the current invention reduces the number of required wires, wire length needed to connect the inputs and outputs of different netlists and the time required by the tool for placement and route of netlists in the integrated circuit.

Each virtual crosspoint is used to either to hardwire or provide no connectivity between the corresponding inlet link and outlet link. Specifically crosspoint CP(1,1) is implemented by direct connect point DCP(1,1) to hardwire (i.e., to permanently connect) inlet link IL1 and outlet link OL1 which is denoted by the thick circle at the intersection of inlet link IL1 and outlet link OL1; crosspoint CP(2,2) is implemented by direct connect point DCP(2,2) to hardwire inlet link IL2 and outlet link OL2 which is denoted by the thick circle at the intersection of inlet link IL2 and outlet link OL2. The diagram 1600A4 does not show direct connect point DCP(1,2) and direct connect point DCP(1,3) since they are not needed and in the hardware implementation they are eliminated. Alternatively inlet link IL1 needs to be connected to outlet link OL1 and inlet link IL1 does not need to be connected to outlet link OL2. Also inlet link IL2 needs to be connected to outlet link OL2 and inlet link IL2 does not need to be connected to outlet link OL1. Furthermore in the example of the diagram 1600A4, there is no need to drive the signal of inlet link IL1 horizontally beyond outlet link OL1 and hence the inlet link IL1 is not even extended horizontally until the outlet link OL2. Also the absence of direct connect point DCP(2,1) illustrates there is no need to connect inlet link IL2 and outlet link OL1.

In summary in integrated circuit placement and route tools, the concept of virtual switches and virtual cross points is used during the implementation of the placement & routing algorithmically in software, however during the hardware implementation cross points in the cross state are implemented as hardwired connections between the corresponding inlet link and outlet link, and in the bar state are implemented as no connection between inlet link and outlet link.

3) More Application Embodiments

All the embodiments disclosed in the current invention are also useful in the design of SoC interconnects, Field programmable interconnect chips, parallel computer systems and in time-space-time switches.

Numerous modifications and adaptations of the embodiments, implementations, and examples described herein will be apparent to the skilled artisan in view of the disclosure.

What is claimed is:

1. A programmable integrated circuit comprising a plurality of programmable logic blocks and a network, and
    said each plurality of programmable logic blocks comprising a plurality of inlet links and a plurality of outlet links; and
    said network further comprising a plurality of subnetworks, with each said subnetwork coupled with one of said plurality of programmable logic blocks; and
    said plurality of subnetworks coupled with said plurality of programmable logic blocks arranged in a two-dimensional grid of rows and columns; and
    said each subnetwork comprising r rings, and said each ring comprising $y_r$ stages, where $r \geq 1$; $y_r \geq 1$; and
    Said each stage comprising a switch of size $d_i \times d_o$, where $d_i \geq 2$ and $d_o \geq 2$ and each said switch of size $d_i \times d_o$ having $d_i$ incoming links and $d_o$ outgoing links; and
    said each switch comprising a plurality of multiplexers, and said each multiplexer is of size p:1 where p>1; and
    Said outlet links are connecting to one or more of the said incoming links of any said switch of any stage of any ring of said coupled subnetwork, and said inlet links are connecting from one of said outgoing links of any said switch of any stage of any ring of said coupled subnetwork; and
    Said incoming links and outgoing links in each said switch in said each stage of said each subnetwork comprising a plurality of forward connecting links connecting from switches in lower stage to switches in the immediate succeeding higher stage in the same ring, and also comprising a plurality of backward connecting links connecting from switches in higher stage to switches in the immediate preceding lower stage in the same ring; and
    Said forward connecting links comprising a plurality of straight links connecting from a switch in a stage of a ring in a subnetwork to a switch in another stage of the same ring in the same subnetwork and also comprising a plurality of cross links connecting from a switch in a stage of a ring in a subnetwork to a switch in another stage of another ring in the same subnetwork or to a switch in another stage of another ring in a different subnetwork, and
    Said backward connecting links comprising a plurality of straight links connecting from a switch in a stage of a ring in a subnetwork to a switch in another stage of the same ring in the same subnetwork and also comprising a plurality of cross links connecting from a switch in a stage of a ring in a subnetwork to a switch in another stage of another ring the same subnetwork or to a switch in another stage of another ring in a different subnetwork, and
    Said plurality of multiplexers in one or more said stages are connected so that said one or more forward connecting links are fed back into said one or more backward connecting links through one or more said multiplexers, and also said plurality of multiplexers in one or more said stages are connected so that one or more said backward connecting links are fed back into one or more said forward connecting links through one or more said multiplexers; and
    Said cross links between switches of stages of rings between any two different subnetworks are connecting as either vertical links only, or horizontal links only, or both vertical links and horizontal links.

2. The programmable integrated circuit of claim 1 wherein said each subnetwork with its said rings is replicable in both said rows and said columns of the two-dimensional grid, or
    Said each subnetwork with said horizontal links and said vertical links connecting from and said horizontal links and said vertical links connecting to is replicable in both said rows and said columns of the two-dimensional grid, or
    Said each subnetwork with both its said rings, and said horizontal links and said vertical links connecting from and said horizontal links and said vertical links connecting to is replicable in both said rows and said columns of the two-dimensional grid.

3. The programmable integrated circuit of claim 1 wherein one or more paths from either one of said each inlet links in a said subnetwork or from one of said each horizontal link or vertical link connected from another said subnetwork to one of said each outlet links in the same said subnetwork or to one of said each horizontal link or vertical link connected to another said subnetwork crosses more than one said multiplexers and possibly a large number of said multiplexers.

4. The programmable integrated circuit of claim 1, wherein said horizontal cross links between switches in any two corresponding said stages are substantially of equal length and said vertical cross links between switches in any two corresponding said stages are substantially of equal length in the entire two-dimensional grid of rows and columns.

5. The programmable integrated circuit of claim 1, wherein said horizontal cross links between switches in any two corresponding said stages are substantially of an arbitrary hop length and said vertical cross links between switches in any two corresponding said stages are substantially of an arbitrary hop length.

6. The programmable integrated circuit of claim 1, wherein said horizontal cross links are connected between switches in any two arbitrary corresponding said stages and said vertical cross links are connected between switches in any two arbitrary corresponding said stages.

7. The programmable integrated circuit of claim 1, wherein said one or more horizontal cross link is connected from one of said switch in one of said subnetwork and connecting to more than one switches in one or more said different subnetworks, and said one or more vertical cross link is connected from one of said switch in one of said subnetwork and connecting to more than one switches in one or more said different subnetworks.

8. The programmable integrated circuit of claim 1, wherein said horizontal cross links and vertical cross links are implemented on two or more metal layers.

9. The programmable integrated circuit of claim 1, wherein said each multiplexer is programmable by an SRAM cell or a Flash Cell.

10. The programmable integrated circuit of claim 1, wherein said each plurality of programmable logic blocks comprise a plurality of look-up-tables having at least two inputs.

11. The programmable integrated circuit of claim 1, wherein said each plurality of programmable logic blocks comprise a plurality of processors, or memory, or an arbitrary hardware circuit.

12. The programmable integrated circuit of claim 1, wherein said straight links connecting from switches in each said subnetwork are connecting to switches in the same said subnetwork; and said cross links are connecting as vertical or horizontal or diagonal links between two different said subnetworks.

13. The programmable integrated circuit of claim 1, wherein said plurality of forward connecting links use a plurality of buffers to amplify signals driven through them and said plurality of backward connecting links use a plurality of buffers to amplify signals driven through them; and said buffers are either inverting or non-inverting buffers.

14. The programmable integrated circuit of claim 1, wherein some of said stages of a ring in a subnetwork comprising a switch of size $(d_i+m) \times (d_o+n)$, where $d_i \geq 2$, $d_o \geq 2$, $m \geq 0$, $n \geq 0$ and hence each such switch having $d_i+m$ incoming links and $d_o+n$ outgoing links.

15. The programmable integrated circuit of claim 1, wherein said subnetwork are partitioned as a plurality of independent sub-subnetworks or alternatively said sub-subnetworks have no interconnections between any two of them.

16. The programmable integrated circuit of claim 1, wherein one or more of said stages of any said ring in any said subnetwork comprising six 2:1 multiplexers, or eight 2:1 multiplexers, or four 3:1 multiplexers, or four 4:1 multiplexers.

17. The programmable integrated circuit of claim 1, wherein said switches of size $d_i \times d_o$ are either fully populated or partially populated.

18. The programmable integrated circuit of claim 1, wherein said plurality of logic blocks and said routing network is implemented in a 3D integrated circuit device.

19. A network comprising a plurality of subnetworks placed in a two dimensional grid of rows and columns, and said each subnetwork is placed at an intersection of said each row and said each column; and said each subnetwork further connected to one or more said other subnetworks placed in its row by a plurality of external hop wires wherein said each plurality of external hop wires connect said each subnetwork to said each other subnetwork with hop-length greater than or equal to one wherein hop length is hereinafter is one more than the number of subnetworks between said each subnetwork and said other subnetwork; and said each subnetwork further connected to one or more said other subnetworks placed in its column by a plurality of external hop wires wherein said each plurality of external hop wires connect said each subnetwork to said each other subnetwork with hop-length greater than or equal to one; and said each subnetwork comprising a plurality of inlet links and a plurality of outlet links; and said each subnetwork comprising a plurality of rings, said each ring comprising a plurality of stages, said each stage comprising a plurality of multiplexers, said each multiplexer is of size d:1 where d>1; and wherein each input for each said multiplexers in a said stage in a said ring in a said subnetwork is connected from an output of one of said other multiplexers in one of said other stages in its own said ring, or is connected from an output of one of said other multiplexers in one of said other stages in a different said ring in its own said subnetwork, or is connected from an output of said other multiplexers in said same stage, or is connected from one of said plurality of inlet links from its own said subnetwork, or is connected from one of said external hop wires which are connected from said other subnetworks; and each output for each said multiplexers in a said stage in a said ring in a said subnetwork is connected to an input of one of said other multiplexers in one of said other stages in its own said ring, or is connected to an input of one of said other multiplexers in one of said other stages in a different said ring in its own said subnetwork, or is connected to an input of said other multiplexers in said same stage, or is connected to one of said plurality of outlet links in its own said subnetwork, or is connected to one of said external hop wires which are connected to said other subnetworks; and so that one or more paths from either one of said each inlet links in a said subnetwork or from one of said each external hop wire connected from another said subnetwork to one of said each outlet links in the same said subnetwork or to one of said each external hop wire connected to another said subnetwork crosses more than one said multiplexers and possibly a large number of said multiplexers; and said each subnetwork with its said rings is replicable in both said rows and said columns of the two-dimensional grid, or said each subnetwork with said external hop wires connecting from and said external hop wires connecting to is replicable in both said rows and said columns of the two-dimensional grid, or said each subnetwork with both said rings, and said external hop wires connecting from and said external hop wires connecting to is replicable in both said rows and said columns of the two-dimensional grid.

20. The network of claim 19, wherein said one or more external hop wire is connected from one of said switch in one of said subnetwork and connecting to more than one switches in one or more said different subnetworks in the same row, and said one or more external hop wire is connected from one of said switch in one of said subnetwork and connecting to more than one switches in one or more said different subnetworks in the same column.

\* \* \* \* \*